US010927232B2

(12) United States Patent
Kawamura et al.

(10) Patent No.: US 10,927,232 B2
(45) Date of Patent: Feb. 23, 2021

(54) POLYAMIDE RESIN COMPOSITION, METHOD FOR PRODUCING POLYAMIDE RESIN COMPOSITION, AND MOLDED ARTICLE

(71) Applicant: ASAHI KASEI KABUSHIKI KAISHA, Tokyo (JP)

(72) Inventors: Tomoyo Kawamura, Tokyo (JP); Masashi Okamoto, Tokyo (JP); Yasukazu Shikano, Tokyo (JP); Katsushi Watanabe, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 90 days.

(21) Appl. No.: 15/551,716

(22) PCT Filed: Jan. 26, 2016

(86) PCT No.: PCT/JP2016/052197
§ 371 (c)(1),
(2) Date: Aug. 17, 2017

(87) PCT Pub. No.: WO2016/132829
PCT Pub. Date: Aug. 25, 2016

(65) Prior Publication Data
US 2018/0030236 A1 Feb. 1, 2018

(30) Foreign Application Priority Data
Feb. 20, 2015 (JP) .............................. JP2015-032126

(51) Int. Cl.
*C08K 3/20* (2006.01)
*C08K 5/17* (2006.01)
*C08K 5/49* (2006.01)
*C08L 77/00* (2006.01)
*C08L 101/00* (2006.01)
*C08K 5/13* (2006.01)
*C08K 7/14* (2006.01)
*C08K 3/22* (2006.01)
*C08K 3/26* (2006.01)
*C08K 3/105* (2018.01)
*C08K 5/132* (2006.01)

(52) U.S. Cl.
CPC ............... *C08K 3/20* (2013.01); *C08K 3/105* (2018.01); *C08K 3/22* (2013.01); *C08K 3/26* (2013.01); *C08K 5/13* (2013.01); *C08K 5/132* (2013.01); *C08K 5/17* (2013.01); *C08K 5/49* (2013.01); *C08K 7/14* (2013.01); *C08L 77/00* (2013.01); *C08L 101/00* (2013.01)

(58) Field of Classification Search
CPC . C08K 3/105; C08K 3/22; C08K 3/20; C08K 3/26; C08K 5/132; C08K 5/17; C08K 5/49; C08K 7/14
See application file for complete search history.

(56) References Cited

U.S. PATENT DOCUMENTS

| 5,929,200 A | 7/1999 | Pagilagan |
| 2005/0027050 A1 | 2/2005 | Monsheimer et al. |
| 2006/0155034 A1 | 7/2006 | Gijsman et al. |
| 2008/0146717 A1 | 6/2008 | Narusawa et al. |
| 2008/0146718 A1 | 6/2008 | Gijsman et al. |
| 2009/0069471 A1 | 3/2009 | Terada et al. |
| 2009/0143520 A1 | 6/2009 | Elia et al. |
| 2010/0028580 A1 | 2/2010 | Palmer et al. |
| 2011/0028628 A1 | 2/2011 | Martens et al. |
| 2011/0039080 A1 | 2/2011 | Hashimoto et al. |
| 2013/0150517 A1 | 6/2013 | Tarbit et al. |
| 2013/0217813 A1 | 8/2013 | Lee et al. |
| 2013/0327434 A1 | 12/2013 | Kawai |
| 2014/0275385 A1 | 9/2014 | Gijsman et al. |
| 2016/0152826 A1 | 6/2016 | Kawamura et al. |

FOREIGN PATENT DOCUMENTS

| AU | 2011226220 A1 | 9/2012 |
| CN | 1590078 A | 3/2005 |
| CN | 101163746 A | 4/2008 |
| CN | 103073879 A | 5/2013 |
| CN | 103492487 A | 1/2014 |
| EP | 3037478 A1 | 6/2016 |

(Continued)

OTHER PUBLICATIONS

JP-2000003809_Jan. 2000_English Translation.*
JP-2011140621_Jul. 2011_English Translation.*
JP-2006225593 to Aramaki. Aug. 2006_English Translation.*
European Search Report issued with respect to Application No. 16752218.4, dated Jan. 5, 2018.
International Search Report from Patent Application No. PCT/JP2016/052197, dated Mar. 22, 2016.
International Preliminary Report on Patentability from Patent Application No. PCT/JP2016/052197.

Primary Examiner — Michael L Leonard
(74) Attorney, Agent, or Firm — Greenblum & Bernstein, P.L.C.

(57) ABSTRACT

The present invention provides a polyamide resin composition including (A) a polyamide resin, (B) an alkali metal compound and/or an alkaline earth metal compound, and (C) one or more compounds selected from following (C1) to (C4): (C1) a salt of one or more metal elements selected from the group consisting of groups 3, 4, 11, 13, and 14 of periodic table, (C2) at least one organic heat stabilizer selected from the group consisting of a hindered phenol compound, a hindered amine compound, and an organic phosphorus compound, and (C3) a crystalline thermoplastic resin having a lower melting point than that of the component (A) and/or an amorphous thermoplastic resin having a lower Vicat softening point than that of the component (A), and (C4) an acid.

29 Claims, No Drawings

(56) References Cited

FOREIGN PATENT DOCUMENTS

| | | | | |
|---|---|---|---|---|
| JP | S49116151 A | 11/1974 | | |
| JP | H03152162 A | 6/1991 | | |
| JP | H04028762 A | 1/1992 | | |
| JP | H07145315 A | 6/1995 | | |
| JP | H07179753 A | 7/1995 | | |
| JP | H108502548 A | 3/1996 | | |
| JP | H08311332 A | 11/1996 | | |
| JP | H109512839 A | 12/1997 | | |
| JP | 2000003809 | * | 1/2000 | ............... C08K 3/08 |
| JP | 2002138194 A | 5/2002 | | |
| JP | 2003-335939 | 11/2003 | | |
| JP | 2004091778 A | 3/2004 | | |
| JP | 2005206662 A | 8/2005 | | |
| JP | 2005281616 A | 10/2005 | | |
| JP | 2006225593 A | * | 8/2006 | ............... C08L 77/00 |
| JP | 2006225593 A | 8/2006 | | |
| JP | 2006316244 A | 11/2006 | | |
| JP | 2006528260 A | 12/2006 | | |
| JP | 2007246580 A | 9/2007 | | |
| JP | 2007246581 A | 9/2007 | | |
| JP | 2007246583 A | 9/2007 | | |
| JP | 2008007563 A | 1/2008 | | |
| JP | 2008527127 A | 7/2008 | | |
| JP | 2008527129 A | 7/2008 | | |
| JP | 2011505463 A | 2/2011 | | |
| JP | 2011140621 A | * | 7/2011 | |
| JP | 2011140621 A | 7/2011 | | |
| JP | 2011529993 A | 12/2011 | | |
| JP | 2013501095 A | 1/2013 | | |
| JP | 2013119571 A | 6/2013 | | |
| JP | 2013521393 A | 6/2013 | | |
| JP | 2013534549 A | 9/2013 | | |
| JP | 2014012773 A | 1/2014 | | |
| JP | 2014-503003 | 2/2014 | | |
| JP | 2015034222 A | 2/2015 | | |
| JP | S59-043065 A | 4/2018 | | |
| WO | 1994019394 A1 | 9/1994 | | |
| WO | 2009107394 A1 | 9/2009 | | |
| WO | 2012115147 A1 | 8/2012 | | |
| WO | 2014/203606 A1 | 12/2014 | | |

\* cited by examiner

POLYAMIDE RESIN COMPOSITION, METHOD FOR PRODUCING POLYAMIDE RESIN COMPOSITION, AND MOLDED ARTICLE

TECHNICAL FIELD

The present invention relates to a polyamide resin composition, a method for producing a polyamide resin composition, and a molded article.

BACKGROUND ART

Polyamide resins are excellent in strength, heat resistance, and chemical resistance and is excellent in specific gravity, i.e., has a smaller specific gravity than that of metals. Therefore, the polyamide resins have heretofore been used as alternative materials for metals in automobile mechanical parts, etc.

Particularly, members around engines are required to have durability in a high-temperature environment. Therefore, various polyamide resin compositions excellent in heat aging resistance have been proposed (see e.g., Patent Literatures 1 and 2).

In the present specification, the "heat aging resistance" refers to resistance to so-called thermal oxidation, by which a molded article can maintain practically sufficient mechanical characteristics and has only a little color change when left for a long time in an air atmosphere under high-temperature conditions equal to or lower than the melting point with the shape of the molded article maintained.

In recent years, the downsizing of automobiles has been practiced as one approach for improvement in fuel efficiency. As a result, automobile engine room parts tend to have a higher density, and engine rooms tend to have a higher internal ambient temperature.

In addition, higher powers have been imparted to engines with superchargers for improvement in fuel efficiency. Along with this, engine rooms tend to have an increasingly higher ambient temperature.

Thus, there has been a demand for polyamide resins having heat aging resistance over a long period under higher-temperature conditions than ever. Specifically, there has been a growing demand for durable materials that can maintain practically sufficient mechanical characteristics and have only a little color change even when used for a long time under high-temperature conditions of 150° C. to 230° C.

A technique which involves adding a copper compound (an oxide or a salt of copper) to polyamide resins is known as a technique for improving the heat aging resistance of polyamide resins.

Likewise, a technique which involves mixing a copper compound and iron oxide with 2 types of polyamide resins differing in melting point (see e.g., Patent Literature 3), a technique which involves mixing a trace element iron with polyamide resin (see e.g., Patent Literature 4), and a technique which involves mixing a fine dispersed metal powder with polyamide resin (see e.g., Patent Literature 5) are disclosed as techniques for improving the heat aging resistance.

Meanwhile, techniques relating to a polyamide resin composition supplemented with sodium aluminate and a method for producing the same are disclosed (see e.g., Patent Literatures 6 to 15). The polyamide resin composition supplemented with sodium aluminate has heretofore been known to have excellent heat retention stability.

The "heat retention stability" refers to characteristics by which the resin is less decomposed and deteriorated when the polyamide resin composition is kept at a temperature equal to or higher than the melting point and is thereby in a melted state, and consequently, reduction in mechanical physical properties or color change of the polyamide resin composition caused by the action of keeping it at the temperature equal to or higher than the melting point is suppressed.

Aluminic acid metal salts have heretofore been known to be added to polyamide resins, mainly, for the purpose of, for example, suppressing increase in yellowness or suppressing thermal decomposition.

Also, a technique which involves supplementing a polyamide resin with a resin having a lower melting point and a heat stabilizer is disclosed (see e.g., Patent Literature 3).

CITATION LIST

Patent Literature

Patent Literature 1: National Publication of International Patent Application No. 2013-501095
Patent Literature 2: National Publication of International Patent Application No. 2013-521393
Patent Literature 3: National Publication of International Patent Application No. 2008-527129
Patent Literature 4: National Publication of International Patent Application No. 2006-528260
Patent Literature 5: National Publication of International Patent Application No. 2008-527127
Patent Literature 6: Japanese Patent Laid-Open No. 2005-206662
Patent Literature 7: Japanese Patent Laid-Open No. 2004-91778
Patent Literature 8: Japanese Patent Laid-Open No. 49-116151
Patent Literature 9: Japanese Patent Laid-Open No. 2008-7563
Patent Literature 10: Japanese Patent Laid-Open No. 2006-316244
Patent Literature 11: Japanese Patent Laid-Open No. 2005-281616
Patent Literature 12: Japanese Patent Laid-Open No. 2007-246580
Patent Literature 13: Japanese Patent Laid-Open No. 2007-246581
Patent Literature 14: Japanese Patent Laid-Open No. 2007-246583
Patent Literature 15: Japanese Patent Laid-Open No. 2006-225593

SUMMARY OF INVENTION

Technical Problem

The techniques described in Patent Literatures 1 to 15, however, have failed to yield a polyamide resin composition having a high level of heat aging resistance. Thus, there has been a demand for a polyamide resin composition that satisfies the requirements for heat aging resistance over a long period under high-temperature conditions.

Furthermore, there is the possibility that, for example, automobile engine room parts are exposed to water vapor in air or a flying liquid containing moisture, such as LLC (long-life coolant). Therefore, materials for such parts are required to have a high level of heat aging resistance.

Thus, an object of the present invention is to provide, in light of the aforementioned problems of the conventional techniques, a polyamide resin composition excellent in heat aging resistance and a molded article thereof.

Solution to Problem

The present inventors have conducted diligent studies to attain the object and consequently completed the present invention by finding that a polyamide resin composition comprising a polyamide resin, a predetermined amount of an alkali metal compound and/or an alkaline earth metal compound (except for an aluminic acid metal salt, a halide of an alkali metal, and a halide of an alkaline earth metal), and a predetermined compound has a high level of heat aging resistance, i.e., can effectively suppress oxidative degradation at the melting point or less.

Specifically, the present invention is as follows:

[1]
A polyamide resin composition comprising:
(A) a polyamide resin;
(B) an alkali metal compound and/or an alkaline earth metal compound (except for an aluminic acid metal salt, a halide of an alkali metal, and a halide of an alkaline earth metal); and
(C) at least one or more compounds selected from the group consisting of following (C1) to (C4):
(C1) a salt of one or more metal elements selected from the group consisting of groups 3, 4, 11, 13, and 14 of periodic table,
(C2) at least one organic heat stabilizer selected from the group consisting of a hindered phenol compound, a hindered amine compound, and an organic phosphorus compound,
(C3) a crystalline thermoplastic resin having a lower melting point than that of the component (A) and/or an amorphous thermoplastic resin having a lower Vicat softening point than that of the component (A), and
(C4) an acid,
wherein a content of the component (B) is 0.03 to 20 parts by mass based on 100 parts by mass in total of the component (A) and the component (C3), and
the components (C1) to (C3) have following respective contents when selected as a component contained therein:
component (C1): 0.001 to 0.05 parts by mass in terms of an amount of a metal element based on 100 parts by mass in total of the component (A) and the component (C3),
component (C2): 0.8 to 20 parts by mass based on 100 parts by mass in total of the component (A) and the component (C3), and
component (C3): 1 to 50 parts by mass based on 100 parts by mass in total of the component (A) and the component (C3).

[2]
The polyamide resin composition according to [1], wherein the compound (C) is a combination of at least two or more components selected from the group consisting of the components (C1) to (C4).

[3]
The polyamide resin composition according to [1], wherein the compound (C) is a combination of at least three or more components selected from the group consisting of the components (C1) to (C4).

[4]
The polyamide resin composition according to any one of [1] to [3], wherein the polyamide resin (A) is at least one selected from following group (A-1): (A-1) polyamide 46, polyamide 66, polyamide 610, polyamide 612, polyamide 6T, polyamide 9T, polyamide 6I, and copolymerized polyamide containing these polyamide resins as constituents.

[5]
The polyamide resin composition according to any one of [1] to [4], wherein the polyamide resin composition has a number-average molecular weight (Mn) of 10,000 or more.

[6]
The polyamide resin composition according to any one of [1] to [5], wherein the polyamide resin (A) is a polyamide resin having a melting point of 240° C. or more.

[7]
The polyamide resin composition according to any one of [1] to [6], wherein the polyamide resin (A) is polyamide 66.

[8]
The polyamide resin composition according to any one of [1] to [7], wherein the component (B) is an alkali metal compound.

[9]
The polyamide resin composition according to any one of [1] to [8], wherein the component (B) is a carbonate or a bicarbonate of an alkali metal.

[10]
The polyamide resin composition according to any one of [1] to [9], further comprising (D) an inorganic filler except for an alkali metal compound and/or an alkaline earth metal compound.

[11]
The polyamide resin composition according to [10], wherein
a content of the component (D) is 10 to 250 parts by mass based on 100 parts by mass in total of the component (A) and the component (C3).

[12]
The polyamide resin composition according to [10] or [11], wherein the inorganic filler (D) except for an alkali metal compound and/or an alkaline earth metal compound is a glass fiber, and the glass fiber comprises a copolymer containing a carboxylic anhydride-containing unsaturated vinyl monomer and an unsaturated vinyl monomer other than the carboxylic anhydride-containing unsaturated vinyl monomer as constitutional units, as a portion of a component that is applied to a surface of the glass fiber.

[13]
The polyamide resin composition according to any one of [1] to [12], wherein the component (C) comprises at least the component (C1).

[14]
The polyamide resin composition according to any one of [1] to [13], wherein the component (C1) is a copper salt.

[15]
The polyamide resin composition according to any one of [1] to [14], wherein a content of the component (C1) is 0.003 to 0.05 parts by mass in terms of an amount of a metal element based on 100 parts by mass in total of the component (A) and the component (C3).

[16]
The polyamide resin composition according to any one of [1] to [15], wherein a mass ratio (B)/(C1) of the component (B) to the component (C1) is 1 or more.

[17]
The polyamide resin composition according to any one of [13] to [16], further comprising (C1-2) a halide of an alkali metal and/or a halide of an alkaline earth metal.

[18]
The polyamide resin composition according to [17], wherein a molar ratio of a halogen element of the component (C1-2) to a metal element of the component (C1) (halogen element/metal element) is 2 to 50.

[19]

The polyamide resin composition according to any one of [1] to [18], wherein the component (C) comprises at least the component (C2).

[20]

The polyamide resin composition according to any one of [1] to [19], wherein the component (C2) is a hindered phenol compound.

[21]

The polyamide resin composition according to [19] or [20], wherein a content of the component (C2) is 1 to 10 parts by mass based on 100 parts by mass in total of the component (A) and the component (C3).

[22]

The polyamide resin composition according to any one of [1] to [21], wherein a component (C) comprises at least the component (C3).

[23]

The polyamide resin composition according to any one of [1] to [22], wherein a content of the component (C3) is 5 to 50 parts by mass based on 100 parts by mass in total of the component (A) and the component (C3).

[24]

The polyamide resin composition according to any one of [1] to [23], wherein the component (C3) is a polyamide resin having a melting point of lower than 240° C.

[25]

The polyamide resin composition according to any one of [1] to [24], wherein the component (C3) is polyamide 6.

[26]

The polyamide resin composition according to any one of [1] to [24], wherein the component (C3) is a polyamide resin in which a ratio of number of carbon atoms to number of nitrogen atoms (C/N) contained in the component (C3) is 7 or more and 20 or less.

[27]

The polyamide resin composition according to any one of [1] to [26], wherein the component (C) contains at least the component (C4).

[28]

The polyamide resin composition according to any one of [1] to [26], wherein an alkalinity value of the alkali metal compound and/or the alkaline earth metal compound (B) (except for an aluminic acid metal salt, a halide of an alkali metal, and a halide of an alkaline earth metal) and an acid value of the acid (C4) included in 100 parts by mass in total of the component (A) and the component (C3) satisfy a condition of following (formula 1):

$$0 < X \leq 5 \qquad \text{(Formula 1)}$$

wherein X=(alkalinity value of the alkali metal compound and/or the alkaline earth metal compound (B) (except for an aluminic acid metal salt, a halide of an alkali metal, and a halide of an alkaline earth metal) included in 100 parts by mass in total of the component (A) and the component (C3))/(acid value of the acid (C4) included in 100 parts by mass in total of the component (A) and the component (C3)).

[29]

The polyamide resin composition according to any one of [1] to [28], wherein an alkalinity value of the alkali metal compound and/or the alkaline earth metal compound (B) (except for an aluminic acid metal salt, a halide of an alkali metal, and a halide of an alkaline earth metal) and a sum of an acid value of the acid (C4) and an acid value of a terminal carboxyl group of the polyamide resin (A) included in 100 parts by mass in total of the component (A) and the component (C3) satisfy a condition of following (formula 2):

$$0 < Y \leq 3 \qquad \text{(Formula 2)}$$

wherein Y=(alkalinity value of the alkali metal compound and/or the alkaline earth metal compound (B) (except for an aluminic acid metal salt, a halide of an alkali metal, and a halide of an alkaline earth metal) included in 100 parts by mass in total of the component (A) and the component (C3))/(acid value of the acid (C4)+acid value of the terminal carboxyl group of the polyamide resin (A) included in 100 parts by mass in total of the component (A) and the component (C3)).

[30]

The polyamide resin composition according to any one of [1] to [29], wherein the component (C4) is an organic acid.

[31]

The polyamide resin composition according to any one of [1] to [30], wherein a molecular weight (Mn) of the acid (C4) is $50 \leq Mn \leq 1000$.

[32]

The polyamide resin composition according to any one of [1] to [31], wherein the acid (C4) is a compound having a carboxyl group.

[33]

The polyamide resin composition according to any one of [1] to [32], wherein the polyamide resin composition has weight-average molecular weight/number-average molecular weight (Mw/Mn) of 2.0 or more, and has Mw/Mn of 3.0 or more after aging at 120° C. for 1000 hours.

[34]

The polyamide resin composition according to any one of [1] to [33], wherein in GPC-MALS-VISCO analysis, a molecule having a molecular weight of 100,000 or more has a structure with one or more branch points, and the molecule having a molecular weight of 100,000 or more contains a carboxylic anhydride functional group.

[35]

The polyamide resin composition according to any one of [1] to [34], wherein the acid (C4) comprises a carboxylic anhydride-containing unsaturated vinyl monomer as a component constituting the main chain, and the acid (C4) has 0° C.<Tg.

[36]

The polyamide resin composition according to [35], wherein the acid (C4) is a copolymer of olefin and maleic anhydride.

[37]

The polyamide resin composition according to any one of [1] to [36], wherein the acid (C4) has been added to the polyamide resin (A) by melt kneading.

[38]

The polyamide resin composition according to any one of [1] to [37], wherein an amount of decrease in mass is 10% or less when the polyamide resin composition is left at 300° C. for 1 hour in an inert gas atmosphere.

[39]

A method for producing the polyamide resin composition according to any one of [1] to [38], comprising a step of:

adding the acid (C4) to the polyamide resin (A) by melt kneading.

[40]

The method for producing the polyamide resin composition according to [39], wherein the method comprises a step of adding the acid (C4) in a form of a master batch.

[41]

The polyamide resin composition according to any one of [1] to [38], wherein the alkali metal compound and/or the alkaline earth metal compound (B) (except for an aluminic acid metal salt, a halide of an alkali metal, and a halide of an alkaline earth metal) has been added to the polyamide resin (A) by melt kneading.

[42]

A molded article comprising the polyamide resin composition according to any one of [1] to [38] and [41].

[43]

A method for producing the polyamide resin composition according to any one of [1] to [38] and [41], comprising a step of:

adding the alkali metal compound and/or the alkaline earth metal compound (B) (except for an aluminic acid metal salt, a halide of an alkali metal, and a halide of an alkaline earth metal) to the polyamide resin (A) by melt kneading.

[44]

The method for producing the polyamide resin composition according to any one of [39], [40], and [43], wherein the method comprises a step of adding the alkali metal compound and/or the alkaline earth metal compound (B) (except for an aluminic acid metal salt, a halide of an alkali metal, and a halide of an alkaline earth metal) in a form of a master batch.

[45]

The method for producing the polyamide resin composition according to any one of [39], [40], [43], and [44], wherein the method comprises a step of adding the alkali metal compound and/or the alkaline earth metal compound (B) (except for an aluminic acid metal salt, a halide of an alkali metal, and a halide of an alkaline earth metal) and the acid (C4) in a form of a same master batch.

[46]

Use of a polyamide resin composition for producing a molded article excellent in heat aging resistance and a physical property during water absorption comprising:

(A) a polyamide resin;
(B) an alkali metal compound and/or an alkaline earth metal compound (except for an aluminic acid metal salt, a halide of an alkali metal, and a halide of an alkaline earth metal); and
(C4) an acid.

Advantageous Effects of Invention

The present invention can provide a polyamide resin composition excellent in heat aging resistance and a molded article thereof.

DESCRIPTION OF EMBODIMENTS

Hereinafter, a mode for carrying out the present invention (hereinafter, simply referred to as the "present embodiment") will be described in detail.

The present embodiment described below is given merely for the purpose of illustrating the present invention and is not intended to limit the present invention by the contents described below. The present invention can be appropriately changed or modified without departing from the spirit thereof.

[Polyamide Resin Composition]

The polyamide resin composition of the present embodiment comprises:

(A) a polyamide resin;
(B) an alkali metal compound and/or an alkaline earth metal compound (except for an aluminic acid metal salt, a halide of an alkali metal, and a halide of an alkaline earth metal); and
(C) at least one or more compounds selected from the group consisting of following (C1) to (C4):
(C1) a salt of one or more metal elements selected from the group consisting of groups 3, 4, 11, 13, and 14 of periodic table,
(C2) at least one organic heat stabilizer selected from the group consisting of a hindered phenol compound, a hindered amine compound, and an organic phosphorus compound,
(C3) a crystalline thermoplastic resin having a lower melting point than that of the component (A) and/or an amorphous thermoplastic resin having a lower Vicat softening point than that of the component (A), and
(C4) an acid, wherein a content of the component (B) is 0.03 to 20 parts by mass based on 100 parts by mass in total of the component (A) and the component (C3), and the components (C1) to (C3) have following respective contents when selected as a component contained therein:

component (C1): 0.001 to 0.05 parts by mass in terms of an amount of a metal element based on 100 parts by mass in total of the component (A) and the component (C3), component (C2): 0.8 to 20 parts by mass based on 100 parts by mass in total of the component (A) and the component (C3), and component (C3): 1 to 50 parts by mass based on 100 parts by mass in total of the component (A) and the component (C3).

The polyamide resin composition of the present embodiment having the aforementioned composition exerts excellent heat aging resistance.

Hereinafter, each constituent of the polyamide resin composition according to the present embodiment will be described in detail.

((A) Polyamide Resin)

The polyamide resin composition of the present embodiment contains (A) a polyamide resin (hereinafter, also referred to as a "component (A)"). The "polyamide resin" is a polymer having amide bonds (—NHCO—) in the main chain.

Examples of the polyamide resin include, but are not limited to, a polyamide resin obtained by the condensation polymerization of a diamine and a dicarboxylic acid, a polyamide resin obtained by the ring-opening polymerization of a lactam, a polyamide resin obtained by the self-condensation of an aminocarboxylic acid, and a copolymer obtained by the copolymerization of two or more types of monomers constituting these polyamide resins.

Only one of these polyamide resins may be used alone as the polyamide resin (A), or two or more thereof may be used in combination.

Hereinafter, the starting materials for the polyamide resin will be described.

<Diamine>

Examples of the diamine include, but are not limited to, aliphatic diamines, alicyclic diamines, and aromatic diamines.

Examples of the aliphatic diamines include, but are not limited to: linear saturated aliphatic diamines each having 2 to 20 carbon atoms such as ethylenediamine, propylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, and tridecamethylenediamine; and branched saturated aliphatic diamines each having 3 to 20 carbon atoms such as 2-methylpentamethylenediamine (also referred to as 2-methyl-1,5-diaminopentane), 2,2,4-trimethylhexamethylenediamine, 2,4,4-trimethylhexamethylenediamine, 2-methyloctamethylenediamine, and 2,4-dimethyloctamethylenediamine. Examples of the branched saturated aliphatic diamines include diamines having a substituent branched from the main chain.

Examples of the alicyclic diamines include, but are not limited to, 1,4-cyclohexanediamine, 1,3-cyclohexanediamine, and 1,3-cyclopentanediamine.

Examples of the aromatic diamines include, but are not limited to, m-xylylenediamine, p-xylylenediamine, m-phenylenediamine, o-phenylenediamine, and p-phenylenediamine.

<Dicarboxylic Acid>

Examples of the dicarboxylic acid include, but are not limited to, aliphatic dicarboxylic acids, alicyclic dicarboxylic acids, and aromatic dicarboxylic acids.

Examples of the aliphatic dicarboxylic acids include, but are not limited to, linear or branched saturated aliphatic dicarboxylic acids each having 3 to 20 carbon atoms such as malonic acid, dimethylmalonic acid, succinic acid, 2,2-dimethylsuccinic acid, 2,3-dimethylglutaric acid, 2,2-diethylsuccinic acid, 2,3-diethylglutaric acid, glutaric acid, 2,2-dimethylglutaric acid, adipic acid, 2-methyladipic acid, trimethyladipic acid, pimelic acid, suberic acid, azelaic acid, sebacic acid, dodecanedioic acid, tetradecanedioic acid, hexadecanedioic acid, octadecanedioic acid, eicosanedioic acid, and diglycolic acid.

Examples of the alicyclic dicarboxylic acids include, but are not limited to, alicyclic dicarboxylic acids such as 1,4-cyclohexanedicarboxylic acid, 1,3-cyclohexanedicarboxylic acid, and 1,3-cyclopentanedicarboxylic acid.

The number of carbon atoms in the alicyclic structure of each alicyclic dicarboxylic acid is not particularly limited and is preferably 3 to 10, more preferably 5 to 10, from the viewpoint of the balance between the water absorbability and the degree of crystallinity of the resulting polyamide resin.

The alicyclic dicarboxylic acid may be unsubstituted or may have a substituent.

Examples of the substituent include, but are not limited to, alkyl groups each having 1 to 4 carbon atoms such as a methyl group, an ethyl group, a n-propyl group, an isopropyl group, a n-butyl group, an isobutyl group, and a tert-butyl group.

Examples of the aromatic dicarboxylic acids include, but are not limited to, aromatic dicarboxylic acids each having 8 to 20 carbon atoms unsubstituted or substituted by a substituent.

Examples of the substituent include, but are not limited to, alkyl groups each having 1 to 6 carbon atoms, aryl groups each having 6 to 12 carbon atoms, arylalkyl groups each having 7 to 20 carbon atoms, halogen groups such as a chloro group and a bromo group, alkylsilyl groups each having 3 to 10 carbon atoms, sulfonic acid groups, and groups which are salts (e.g., sodium salt) thereof.

Examples of the aromatic dicarboxylic acids include, but are not limited to, terephthalic acid, isophthalic acid, naphthalenedicarboxylic acid, 2-chloroterephthalic acid, 2-methylterephthalic acid, 5-methylisophthalic acid, and 5-sodium sulfoisophthalic acid.

The dicarboxylic acids may further include trivalent or higher polyvalent carboxylic acids such as trimellitic acid, trimesic acid, and pyromellitic acid without impairing the object of the present embodiment.

Only one of these diamines or dicarboxylic acids may be used alone, or two or more thereof may be used in combination.

<Lactam>

Examples of the lactam include, but are not limited to, butyrolactam, pivalolactam, ε-caprolactam, caprylolactam, enantholactam, undecanolactam, and laurolactam (dodecanolactam).

Among them, ε-caprolactam, laurolactam, or the like is preferred, and ε-caprolactam is more preferred, from the viewpoint of tenacity.

<Aminocarboxylic Acid>

Examples of the aminocarboxylic acid include, but are not limited to, compounds obtained by the ring-opening of the aforementioned lactam (ω-aminocarboxylic acid, α,ω-aminocarboxylic acid, etc.).

The aminocarboxylic acid is preferably a linear or branched saturated aliphatic carboxylic acid having 4 to 14 carbon atoms substituted at the ω position by an amino group from the viewpoint of enhancing the degree of crystallinity. Examples thereof include, but are not limited to, 6-aminocaproic acid, 11-aminoundecanoic acid, and 12-aminododecanoic acid.

Another example of the aminocarboxylic acid includes aromatic aminocarboxylic acids such as p-aminomethylbenzoic acid.

Examples of the aforementioned polyamide resin (A) include, but are not limited to, polyamide resins such as polyamide 4 (poly-α-pyrrolidone), polyamide 6 (polycaproamide), polyamide 11 (polyundecanamide), polyamide 12 (polydodecanamide), polyamide 46 (polytetramethylene adipamide), polyamide 56 (polypentamethylene adipamide), polyamide 66 (polyhexamethylene adipamide), polyamide 610 (polyhexamethylene sebacamide), polyamide 612 (polyhexamethylene dodecamide), polyamide 116 (polyundecamethylene adipamide), polyamide TMHT (trimethylhexamethylene terephthalamide), polyamide 6T (polyhexamethylene terephthalamide), polyamide 2Me-5T (poly-2-methylpentamethylene terephthalamide), polyamide 9T (polynonamethylene terephthalamide), polyamide 2Me-8T (poly-2-methyloctamethylene terephthalamide), polyamide 6I (polyhexamethylene isophthalamide), polyamide 6C (polyhexamethylene cyclohexane dicarboxamide), polyamide 2Me-5C (poly-2-methylpentamethylene cyclohexane dicarboxamide), polyamide 9C (polynonamethylene cyclohexane dicarboxamide), polyamide 2Me-8C (poly-2-methyloctamethylene cyclohexane dicarboxamide), polyamide PACM12 (polybis(4-aminocyclohexyl)methane dodecamide), polyamide dimethyl PACM12 (polybis(3-methylaminocyclohexyl)methane dodecamide, polyamide MXD6 (poly-m-xylylene adipamide), polyamide 10T (polydecamethylene terephthalamide), polyamide 11T (polyundecamethylene terephthalamide), polyamide 12T (polydodecamethylene terephthalamide), polyamide 10C (polydecamethylene cyclohexane dicarboxamide), polyamide 11C (polyundecamethylene cyclohexane dicarboxamide), and polyamide 12C (polydodecamethylene cyclohexane dicarboxamide).

The symbol "Me" represents a methyl group.

The polyamide resin (A) in the polyamide resin composition of the present embodiment is preferably polyamide 46 (polytetramethylene adipamide), polyamide 66 (polyhexamethylene adipamide), polyamide 610, polyamide 612, polyamide 6T (polyhexamethylene terephthalamide), polyamide 9T (polynonamethylene terephthalamide), or polyamide 6I (polyhexamethylene isophthalamide) or copolymerized polyamide containing these polyamide resins as constituents, from the viewpoint of heat aging resistance and mechanical physical properties.

The amount of MXD (m-xylylenediamine) as the monomer diamine for the polyamide resin (A) in the polyamide resin composition of the present embodiment is preferably less than 70% by mol, more preferably less than 50% by mol, further preferably less than 30% by mol, from the viewpoint of heat aging resistance.

Particularly, the polyamide resin (A) is preferably polyamide 66 from the viewpoint of improvement in the heat aging resistance of the polyamide resin composition of the present embodiment.

The melting point of the polyamide resin (A) used in the polyamide resin composition of the present embodiment is not particularly limited and is preferably 200° C. or more, more preferably 210° C. or more, further preferably 240° C. or more.

The melting point of the polyamide resin (A) is set to a value equal to or higher than the lower limit described above, whereby the polyamide resin composition of the present embodiment tends to have improved heat resistance.

The melting point of the polyamide resin (A) according to the present embodiment is not particularly limited and is preferably 340° C. or less. The melting point of the polyamide resin (A) is set to a value equal to or less than the upper limit described above, whereby the thermal decomposition or degradation of the polyamide resin composition of the present embodiment during melt processing tends to be able to be effectively suppressed.

The melting point of the polyamide resin (A) can be measured according to JIS-K7121. For example, Diamond DSC manufactured by PerkinElmer Inc. can be used as a measurement apparatus. Specifically, the melting point of the polyamide resin (A) can be measured by a method described in Examples mentioned later.

The melting point of the polyamide resin (A) can be controlled by adjusting monomers constituting the polyamide.

The content of the polyamide resin (A) used in the polyamide resin composition of the present embodiment is preferably 33% by mass or more and 95% by mass or less, more preferably 50% by mass or more and 75% by mass or less, in the polyamide resin composition.

The polyamide resin composition of the present embodiment containing the polyamide resin (A) in the aforementioned range tends to be excellent in strength, heat resistance, chemical resistance, specific gravity, etc.

The relative viscosity in sulfuric acid of the polyamide resin (A) used in the polyamide resin composition of the present embodiment is preferably 1.8 or more and 3.0 or less, more preferably 2.2 or more and 2.8 or less.

The relative viscosity in sulfuric acid is 1.8 or more, whereby the resulting polyamide resin composition tends to have better mechanical physical properties. Also, the relative viscosity in sulfuric acid is 3.0 or less, whereby the resulting polyamide resin composition tends to have better flowability and appearance.

The relative viscosity in sulfuric acid can be controlled by the adjustment of a pressure during polymerization process for the polyamide resin (A).

The relative viscosity in sulfuric acid can be measured by a method that abides by JIS K6920. Specifically, the relative viscosity in sulfuric acid can be measured by a method described in Examples mentioned later.

In the present embodiment, an end-capping agent for molecular weight adjustment can be further added during the polymerization of the monomers of the polyamide resin (A). This end-capping agent is not particularly limited, and any of those known in the art can be used.

Examples of the end-capping agent include, but are not limited to, monocarboxylic acids, monoamines, acid anhydrides such as phthalic anhydride, monoisocyanates, monoacid halides, monoesters, and monoalcohols.

Among them, a monocarboxylic acid or a monoamine is preferred from the viewpoint of the heat stability of the polyamide resin (A).

Only one of these end-capping agents may be used alone, or two or more thereof may be used in combination.

The monocarboxylic acids that can be used as the end-capping agent can be any monocarboxylic acid having reactivity with an amino group. Examples thereof include, but are not limited to: aliphatic monocarboxylic acids such as formic acid, acetic acid, propionic acid, butyric acid, valeric acid, caproic acid, caprylic acid, lauric acid, tridecylic acid, myristic acid, palmitic acid, stearic acid, pivalic acid, and isobutyric acid; alicyclic monocarboxylic acids such as cyclohexanecarboxylic acid; and aromatic monocarboxylic acids such as benzoic acid, toluic acid, α-naphthalenecarboxylic acid, β-naphthalenecarboxylic acid, methylnaphthalenecarboxylic acid, and phenylacetic acid.

Only one of these monocarboxylic acids may be used alone, or two or more thereof may be used in combination.

The monoamines that can be used as the end-capping agent can be any monoamine having reactivity with a carboxyl group. Examples thereof include, but are not limited to: aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; and aromatic monoamines such as aniline, toluidine, diphenylamine, and naphthylamine.

Only one of these monoamines may be used alone, or two or more thereof may be used in combination.

Examples of the acid anhydrides that can be used as the end-capping agent include, but are not limited to, phthalic anhydride, maleic anhydride, benzoic anhydride, acetic anhydride, and hexahydrophthalic anhydride.

Only one of these acid anhydrides may be used alone, or two or more thereof may be used in combination.

Examples of the monoisocyanates that can be used as the end-capping agent include, but are not limited to, phenyl isocyanate, tolyl isocyanate, dimethylphenyl isocyanate, cyclohexyl isocyanate, butyl isocyanate, and naphthyl isocyanate.

Only one of these monoisocyanates may be used alone, or two or more thereof may be used in combination.

Examples of the monoacid halides that can be used as the end-capping agent include, but are not limited to, halogen-substituted monocarboxylic acids of monocarboxylic acids such as benzoic acid, diphenylmethanecarboxylic acid, diphenylsulfonecarboxylic acid, diphenyl sulfoxide carboxylic acid, diphenyl sulfide carboxylic acid, diphenyl ether carboxylic acid, benzophenonecarboxylic acid, biphenylcarboxylic acid, α-naphthalenecarboxylic acid, β-naphthalenecarboxylic acid, and anthracenecarboxylic acid.

Only one of these monoacid halides may be used alone, or two or more thereof may be used in combination.

Examples of the monoesters that can be used as the end-capping agent include, but are not limited to, glycerin monopalmitate, glycerin monostearate, glycerin monobehenate, glycerin monomontanate, pentaerythritol monopalmitate, pentaerythritol monostearate, pentaerythritol monobehenate, pentaerythritol monomontanate, sorbitan monopalmitate, sorbitan monostearate, sorbitan monobehenate, sorbitan monomontanate, sorbitan dimontanate, sorbitan trimontanate, sorbitol monopalmitate, sorbitol monostearate, sorbitol monobehenate, sorbitol tribehenate, sorbitol monomontanate, and sorbitol dimontanate.

Only one of these monoesters may be used alone, or two or more thereof may be used in combination.

Examples of the monoalcohols that can be used as the end-capping agent include, but are not limited to, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, eicosanol, docosanol, tricosanol, tetracosanol, hexacosanol, heptacosanol, octacosanol, and triacontanol (all of which include linear and branched alcohols), oleyl alcohol, behenyl alcohol, phenol, cresol (o-, m-, and p-forms), biphenol (o-, m-, and p-forms), 1-naphthol, and 2-naphthol.

Only one of these monoalcohols may be used alone, or two or more thereof may be used in combination.

((B) Alkali Metal Compound and/or Alkaline Earth Metal Compound)

The polyamide resin composition of the present embodiment contains (B) an alkali metal compound and/or an alkaline earth metal compound (except for an aluminic acid metal salt, a halide of an alkali metal, and a halide of an alkaline earth metal) (hereinafter, also referred to as a "component (B)").

Examples of the alkali metal compound and/or the alkaline earth metal compound (B) include, but are not limited to, a carbonate of an alkali metal and/or an alkaline earth metal, a bicarbonate of an alkali metal, and a hydroxide of an alkali metal and/or an alkaline earth metal.

Examples of the carbonate of an alkali metal and/or an alkaline earth metal include, but are not limited to, sodium carbonate, potassium carbonate, magnesium carbonate, and calcium carbonate. Only one of these alkali metal and/or alkaline earth metal carbonates may be used alone, or two or more thereof may be used in combination.

Examples of the bicarbonate of an alkali metal include, but are not limited to, sodium bicarbonate and potassium bicarbonate. Only one of these alkali metal bicarbonates may be used alone, or two or more thereof may be used in combination.

Examples of the hydroxide of an alkali metal and/or an alkaline earth metal include, but are not limited to, sodium hydroxide, magnesium hydroxide, potassium hydroxide, and calcium hydroxide. Only one of these alkali metal and/or alkaline earth metal hydroxides may be used alone, or two or more thereof may be used in combination.

In the polyamide resin composition of the present embodiment, the component (B) is preferably an alkali metal compound from the viewpoint of heat aging resistance.

Also, the component (B) is preferably a carbonate or a bicarbonate of an alkali metal from the viewpoint of heat aging resistance.

The polyamide resin composition of the present embodiment contains 0.03 part by mass or more and 20 parts by mass or less of the alkali metal compound and/or the alkaline earth metal compound (B) (except for an aluminic acid metal salt, a halide of an alkali metal, and a halide of an alkaline earth metal) based on 100 parts by mass in total of the component (A) and the component (C3) which are thermoplastic resin components, from the viewpoint of obtaining favorable heat aging resistance and initial strength.

The content of the component (B) is preferably 0.1 parts by mass or more and 20 parts by mass or less, more preferably 0.6 parts by mass or more and 20 parts by mass or less, further preferably 0.6 parts by mass or more and 5 parts by mass or less, still further preferably 0.8 parts by mass or more and 5 parts by mass or less, based on 100 parts by mass in total of the component (A) and the component (C3).

In the polyamide resin composition of the present embodiment, the content of component (B) particles having a particle size of 1 μm or more in the component (B) is preferably 20% by mass or less, more preferably 15% by mass or less, further preferably 10% by mass or less, still further preferably 5% by mass or less.

The content of the component (B) having a particle size of 1 μm or more is 20% by mass or less in the whole component (B), whereby the polyamide resin composition of the present embodiment produces excellent heat aging resistance.

In this context, the particle size of the component (B) is a particle size of a component (B) present in the polyamide resin composition of the present embodiment.

The particle size of the component (B) in the polyamide resin composition can be measured, for example, by dissolving the polyamide resin composition in formic acid and measuring the particle size using a laser diffraction particle size distribution apparatus.

For controlling the content of component (B) particles having a particle size of 1 μm or more in the whole component (B) to 20% by mass or less as described above, it is effective to mix the component (B) with the component (A) in a state having a small amount of moisture.

Examples of such a method include a method which involves melt-kneading the component (B) with the component (A) using an extruder.

On the other hand, if the component (B) is involved in a state having a large amount of moisture, for example, in the condensation polymerization step for the component (A), the particle size of the component (B) might be increased. Specifically, it is preferred to isolate the component (A) after the completion of the polymerization step for the component (A), and mix the component (A) with the component (B) at the stage of melt-kneading, which is the step of producing the polyamide resin composition.

((C) At Least One Compound Selected from Group Consisting of Following (C1), (C2), (C3), and (C4))

The polyamide resin composition of the present embodiment contains, as a component (C), at least one or more compounds selected from the group consisting of following (C1) to (C4):

(C1) a salt of one or more metal elements selected from the group consisting of groups 3, 4, 11, 13, and 14 of periodic table, (C2) at least one organic heat stabilizer selected from the group consisting of a hindered phenol compound, a hindered amine compound, and an organic phosphorus compound, (C3) a crystalline thermoplastic resin having a lower melting point than that of the component (A) and/or an amorphous thermoplastic resin having a lower Vicat softening point than that of the component (A), and (C4) an acid.

Only one of these compounds (C1), (C2), (C3), and (C4) may be used alone as the component (C), or two or more thereof may be used in combination. Two or more thereof are preferably used in combination from the viewpoint of improvement in the heat aging resistance of the polyamide resin composition of the present embodiment, and three or more thereof are more preferably used in combination.

<(C1) Salt of One or More Metal Elements Selected from Group Consisting of Groups 3, 4, 11, 13, and 14 of Periodic Table>

The polyamide resin composition of the present embodiment preferably contains (C1) a salt of one or more metal elements selected from the group consisting of groups 3, 4, 11, 13, and 14 of periodic table (hereinafter, also referred to as a component (C1) or simply as (C1)).

The salt of one or more metal elements selected from the group consisting of groups 3, 4, 11, 13, and 14 of periodic table is not particularly limited as long as the salt is a salt of metal element(s) belonging to these groups.

The salt (C1) of one or more metal elements selected from the group consisting of groups 3, 4, 11, 13, and 14 of periodic table is preferably a copper salt from the viewpoint of further improving heat aging resistance.

Examples of the copper salt include, but are not limited to, copper halides (copper iodide, copper(I) bromide, copper(II) bromide, copper(I) chloride, etc.), copper acetate, copper propionate, copper benzoate, copper adipate, copper terephthalate, copper isophthalate, copper salicylate, copper nicotinate, and copper stearate, and copper complex salts containing copper coordinated with chelating agents such as ethylenediamine and ethylenediaminetetraacetic acid.

Only one of these copper salts may be used alone, or two or more thereof may be used in combination.

Among the copper salts listed above, one or more selected from the group consisting of copper iodide, copper(I) bromide, copper(II) bromide, copper(I) chloride, and copper acetate are preferred, and copper iodide and/or copper acetate are more preferred.

In the case of using the copper salt as the component (C1), the resulting polyamide resin composition is excellent in heat aging resistance and can effectively suppress the metal corrosion of a screw or cylinder portion during extrusion (hereinafter, also simply referred to as "metal corrosion").

The content of the component (C1) in the polyamide resin composition of the present embodiment when the (C1) is selected as a component contained therein is 0.001 to 0.05 part by mass as the content based on the metal element in the (C1) based on 100 parts by mass in total of the component (A) and the component (C3) which are thermoplastic resins.

The content based on the metal element is more preferably 0.003 to 0.05 part by mass, further preferably 0.005 to 0.03 part by mass, based on 100 parts by mass in total of the component (A) and the component (C3).

In the case of particularly using the copper salt as the component (C1), the content of the metal element of the copper salt in the polyamide resin composition of the present embodiment is preferably 0.001 to 0.05 parts by mass, more preferably 0.003 to 0.05 parts by mass, further preferably 0.005 to 0.03 parts by mass, based on 100 parts by mass in total of the component (A) and the component (C3) which are thermoplastic resins. Within the aforementioned range, heat aging resistance can be further improved while copper deposition or metal corrosion can be effectively suppressed.

The polyamide resin composition of the present embodiment preferably contains 1 part by mass or more of the alkali metal compound and/or the alkaline earth metal compound (B) (except for an aluminic acid metal salt, a halide of an alkali metal, and a halide of an alkaline earth metal) based on 1 part by mass of the salt (C1) of one or more metal elements selected from the group consisting of groups 3, 4, 11, 13, and 14 of periodic table, i.e., the mass ratio of the component (B) to the component (C1) ((B)/(C1)) is 1 or more, from the viewpoint of improvement in heat aging resistance.

The content of the component (B) based on 1 part by mass of the component (C1) is more preferably 5 parts by mass or more and 500 parts by mass or less, further preferably 15 parts by mass or more and 500 parts by mass or less, still further preferably 25 parts by mass or more and 500 parts by mass or less, still further preferably 35 parts by mass or more and 500 parts by mass or less, particularly preferably 45 parts by mass or more and 500 parts by mass or less, from the viewpoint of better heat aging resistance and productivity.

<(C1-2) Halide of Alkali Metal and/or Halide of Alkaline Earth Metal>

The polyamide resin composition of the present embodiment preferably contains (C1-2) a halide of an alkali metal and/or a halide of an alkaline earth metal (hereinafter, also referred to as a component (C1-2) or simply as (C1-2)), from the viewpoint of improvement in heat aging resistance.

Examples of the halide of an alkali metal and/or the halide of an alkaline earth metal include, but are not limited to, potassium iodide, potassium bromide, potassium chloride, sodium iodide, and sodium chloride, and mixtures thereof.

Among them, potassium iodide and/or potassium bromide are preferred, and potassium iodide is more preferred, from the viewpoint of improvement in heat aging resistance and the suppression of metal corrosion.

The content of the component (C1-2) in the polyamide resin composition of the present embodiment is preferably 0.05 to 5 parts by mass, more preferably 0.2 to 2 parts by mass, based on 100 parts by mass in total of the component (A) and the component (C3) which are thermoplastic resins.

When the content of the component (C1-2) falls within the aforementioned range, heat aging resistance can be further improved while copper deposition or metal corrosion can be effectively suppressed.

Only one of these components (C1) and components (C1-2) may be used alone, or two or more thereof may be used in combination.

Among others, the copper salt used as the component (C1) and the halide of an alkali metal and/or the halide of an alkaline earth metal used as the component (C1-2) are preferably combined and used as a mixture, from the viewpoint of further improving heat aging resistance.

The component (C1-2) is a component that is used in combination with the component (C1) and is different from the component (C1).

The molar ratio of the halogen element of the component (C1-2) to the metal element of the component (C1) (halogen element/metal element) is preferably 2 to 50, more preferably 2 to 40, further preferably 5 to 30.

Within the aforementioned range, heat aging resistance can be further improved.

<(C2) At Least One Organic Heat Stabilizer Selected from Group Consisting of Hindered Phenol Compound, Hindered Amine Compound, and Organic Phosphorus Compound>

The polyamide resin composition of the present embodiment preferably contains (C2) at least one organic heat stabilizer selected from the group consisting of a hindered phenol compound, a hindered amine compound, and an organic phosphorus compound (hereinafter, also referred to as a component (C2) or simply as (C2)).

[Hindered Phenol Compound]

Examples of the hindered phenol compound as the component (C2) include, but are not limited to, N,N'-hexamethylenebis[3-(3,5-di-tert-butyl-4-hydroxyphenyl)propanamide], triethylene glycol-bis[3-(3-t-butyl-5-methyl-4-hydroxyphenyl) propionate, 4,4'-butylidenebis(3-methyl-6-t-butylphenol), 1,6-hexanediol-bis[3-(3,5-di-t-butyl-4-hydroxyphenyl) propionate, 2,4-bis-(n-octylthio)-6-(4-hydroxy-3,5-di-t-butylanilino)-1,3,5-triazine, pentaerythrityl-tetrakis[3-(3,5-di-t-butyl-4-hydroxyphenyl) propionate], 2,2-thio-diethylenebis[3-(3,5-di-t-butyl-4-hydroxyphenyl) propionate], octadecyl-3-(3,5-di-t-butyl-4-hydroxyphenyl) propionate, 2,2-thiobis(4-methyl-6-1-butylphenol), N,N'-hexamethylenebis(3,5-di-t-butyl-4-hydroxy-hydroxynenamide), 3,5-di-t-butyl-4-hydroxybenzylphosphonate-diethyl ester, 1,3,5-trimethyl-2,4,6-tris (3,5-di-butyl-4-hydroxybenzyl)benzene, ethyl calcium bis (3,5-di-t-butyl-4-hydroxybenzylsulfonate, tris-(3,5-di-t-butyl-4-hydroxybenzyl)-isocyanurate, 2,6-di-t-butyl-p-cresol, butylated hydroxyanisole, 2,6-di-t-butyl-4-ethylphenol, stearyl-β-(3,5-di-t-butyl-4-hydroxyphenyl) propionate, 2,2'-methylenebis-(4-methyl-6-t-butylphenol), 2,2'-methylene-bis-(4-ethyl-6-t-butylphenol), 4,4'-thiobis-(3-methyl-6-t-butylphenol), octylated diphenylamine, 2,4-bis[(octylthio)methyl]-o-cresol, isooctyl-3-(3,5-di-t-butyl-4-hydroxyphenyl) propionate, 4,4'-butylidenebis(3-methyl-6-t-butylphenol, 3,9-bis[1,1-dimethyl-2-[β-(3-t-butyl-4-hydroxy-5-methylphenyl)propionyloxy]ethyl]2,4,8,10-tetraoxaspiro[5,5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis-(4'-hydroxy-3'-t-butylphenyl)butyric acid] glycol ester, 1,3,5-tris(3',5'-di-t-butyl-4'-hydroxybenzyl)-sec-triazine-2,4,6-(1H,3H,5H) trione, and d-α-tocopherol.

Only one of these hindered phenol compounds may be used alone, or two or more thereof may be used in combination.

[Hindered Amine Compound]

Examples of the hindered amine compound as the component (C2) include, but are not limited to, succinic acid/dimethyl-1-(2-hydroxyethyl)-4-hydroxy-2,2,6,6-tetramethylpiperidine polycondensates, poly[{6-(1,1,3,3,-tetramethylbutyl)amino-1,3,5-triazine-2,4-diyl}{(2,2,6,6,-tetramethyl-4-piperidyl)imino}hexamethylene{(2,2,6,6,-tetramethyl-4-piperidyl)imino}], bis(1,2,2,6,6-pentamethyl-4-piperidyl) 2-(3,5-di-t-butyl-4-hydroxybenzyl)-2-n-butylmalonate, tetrakis(2,2,6,6-tetramethyl-4-piperidyl)1,2,3,4-butane tetracarboxylate, bis-2,2,6,6-tetramethyl-4-piperidyl-sebacate, bis(1,2,2,6,6-pentamethyl-4-piperidyl) sebacate, methyl(1,2,2,6,6-pentamethyl-4-piperidyl) sebacate, 1-[2-[3-(3,5-di-t-butyl-4-hydroxyphenyl)propionyloxy]ethyl]-4-[3-(3,5-t-butyl-hydroxyphenyl)propionyloxy] 2,2,6,6-tetramethylpiperidine, and 4-bezoyloxy-2,2,6,6-tetramethylpiperidine.

Only one of these hindered amine compounds may be used alone, or two or more thereof may be used in combination.

[Organic Phosphorus Compound]

Examples of the organic phosphorus compound as the component (C2) include, but are not limited to, tetrakis(2,4-di-t-butylphenyl)-4,4'-biphenylene phosphonite, bis(2,6-di-t-butyl-4-methylphenyl)pentaerythritol-di-phosphite, 2,2-methylenebis(4,6-di-t-butylphenyl)octyl phosphite, triphenylphosphite, tris(2,4-di-t-butylphenyl)phosphite, diphenyl isodecyl phosphite, phenyl diisodecyl phosphite, 4,4-butylidene-bis(3-methyl-6-t-butylphenyl-di-tridecyl) phosphite, cyclic neopentanetetraylbis(octadecylphosphite), cyclic neopentanetetraylbis(2,6-di-t-butyl-4-methylphenyl) phosphite, tris(nonylphenyl)phosphite, diisodecyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene.

Only one of these organic heat stabilizers may be used alone as at least one organic heat stabilizer selected from the group consisting of a hindered phenol compound, a hindered amine compound, and an organic phosphorus compound, or two or more thereof may be used in combination.

Among the organic heat stabilizers listed above as the component (C2), a hindered phenol compound is preferred, and N,N'-hexamethylenebis[3-(3,5-di-tert-butyl-4-hydroxyphenyl)propanamide] is more preferred.

In the case of using the hindered phenol compound, the resulting polyamide resin composition produces better heat aging resistance.

The polyamide resin composition of the present embodiment contains 0.8 to 20 parts by mass of the at least one organic heat stabilizer (C2) selected from the group consisting of a hindered phenol compound, a hindered amine compound, and an organic phosphorus compound based on 100 parts by mass of the thermoplastic resins (the total of the component (A) and the component (C3)) when the component (C2) is selected as a component contained therein, from the viewpoint of heat aging resistance and productivity.

The content of the (C2) is preferably 1 part by mass or more and 10 parts by mass or less, more preferably 1.5 parts by mass or more and 10 parts by mass or less, further preferably 2.5 parts by mass or more and 10 parts by mass or less, still further preferably 4 parts by mass or more and 10 parts by mass or less, still further preferably 6 parts by mass or more and 10 parts by mass or less, based on 100 parts by mass in total of the component (A) and the component (C3).

((C3) Crystalline Thermoplastic Resin Having Lower Melting Point than that of the Polyamide Resin (A) and/or Amorphous Thermoplastic Resin Having Lower Vicat Softening Point than that of the Polyamide Resin (A))

The polyamide resin composition of the present embodiment preferably contains (C3) a crystalline thermoplastic resin having a lower melting point than that of the polyamide resin (A) and/or an amorphous thermoplastic resin having a lower Vicat softening point than that of the polyamide resin (A) (hereinafter, also referred to as a "component (C3)").

Examples of the component (C3) include a crystalline thermoplastic resin having a lower melting point than that of the component (A) and an amorphous thermoplastic resin having a lower Vicat softening point than that of the component (A) as mentioned later, and thermoplastic elastomers.

Examples of the component (C3) include, but are not limited to, polyolefin resins such as polyethylene and polypropylene, thermoplastic polyester resins, polyphenylene ethers, polyamide resins, polylactic acid resins, polystyrene, polyvinyl chloride, acrylic resins, polycarbonate resins, polyacetal resins, and fluorine resins such as polytetrafluoroethylene.

The component (C3) is preferably a crystalline thermoplastic resin having a lower melting point than that of the component (A) from the viewpoint of the initial strength of the polyamide resin composition of the present embodiment. For example, a polyamide resin or a thermoplastic polyester resin is preferably used, and a polyamide resin is more preferred.

Only one of these thermoplastic resins may be used as the component (C3), or two or more thereof may be used in combination.

The content of the component (C3) in the polyamide resin composition when the component (C3) is selected as a component contained therein is 1 to 50 parts by mass based on 100 parts by mass in total of the component (A) and the component (C3) which are thermoplastic resins. Within the aforementioned range, rigidity under high-temperature conditions can be maintained while high heat aging resistance can be exerted.

The content of the component (C3) in the polyamide resin composition is preferably 5 parts by mass or more and 50 parts by mass or less, more preferably 10 parts by mass or more and 40 parts by mass or less, further preferably 15 parts by mass or more and 35 parts by mass or less, based on 100 parts by mass in total of the component (A) and the component (C3) from the viewpoint of the balance between high-temperature rigidity and heat aging resistance.

A polyamide resin having a melting point of lower than 240° C. is preferably used as the component (C3), and a polyamide resin having a melting point of lower than 230° C. is more preferably used, from the viewpoint of improvement in heat aging resistance.

Likewise, polyamide 6 and/or a polyamide resin in which the ratio of the number of carbon atoms to the number of nitrogen atoms (C/N) contained therein is 7 or more and 20 or less are more preferably used as the component (C3) from the viewpoint of improvement in heat aging resistance. Examples of the polyamide resin in which the ratio of the number of carbon atoms to the number of nitrogen atoms (C/N) contained therein is 7 or more and 20 or less include, but are not limited to, PA610 and PA612.

When the thermoplastic resin used as the component (C3) is amorphous, its Vicat softening point is lower than that of the aforementioned polyamide resin (A) from the viewpoint of improvement in heat aging resistance. The Vicat softening point of the component (C3) is preferably 235° C. or less, more preferably 230° C. or less, further preferably 220° C. or less.

Examples of the thermoplastic polyester resin that can be used as the component (C3) include, but are not limited to, polyethylene terephthalate resins and polybutylene terephthalate resins.

The component (C3) is preferably, as mentioned above, a polyamide resin in which the ratio of the number of carbon atoms to the number of nitrogen atoms (C/N) contained in the component (C3) is 7 or more and 20 or less from the viewpoint of improvement in heat aging resistance.

The ratio of the number of carbon atoms to the number of nitrogen atoms (C/N) is preferably 7 or more and 18 or less, more preferably 8 or more and 16 or less.

The ratio of the number of carbon atoms to the number of nitrogen atoms (C/N) contained in the component (C3) can be controlled within the aforementioned numerical value by adjusting monomers constituting the polyamide resin.

The melting point of the thermoplastic resin (C3) can be measured according to JIS-K7121.

For example, Diamond DSC manufactured by PerkinElmer Inc. can be used as a measurement apparatus.

The Vicat softening point of the thermoplastic resin (C3) can be measured according to JIS-K7206.

The method for calculating the content of the component (C3) will be described.

For example, when the content of the component (A) in the polyamide resin composition is 80 kg and the content of the component (C3) therein is 20 kg, the content of the component (C3) is 20 kg based on 100 kg of the thermoplastic resin components (the total of the component (A) and the component (C3)). In the present specification, this is indicated by containing 20 parts by mass of the component (C3) based on 100 parts by mass of the thermoplastic resin components (the total of the component (A) and the component (C3)).

(Acid (C4))

The polyamide resin composition of the present embodiment preferably contains (C4) an acid.

The acid as the component (C4) may be an organic acid or an inorganic acid. An organic acid is preferably used as the acid (C4) from the viewpoint of the appearance of a molded article.

Examples of the organic acid include, but are not limited to, compounds having a carboxyl group, a sulfo group, a hydroxy group, a thiol group, or an enol group.

Only one of these acids (C4) may be used alone, or two or more thereof may be used in combination.

<Compound having Carboxyl Group>

Examples of the compound having a carboxyl group as the acid (C4) include, but are not limited to, acetic acid, propanoic acid, butanoic acid, pentanoic acid, hexanoic acid, heptanoic acid, octanoic acid, nonanoic acid, decanoic acid, dodecanoic acid, tetradecanoic acid, hexadecanoic acid, heptadecanoic acid, octadecanoic acid, benzoic acid, oxalic acid, cyclohexanedicarboxylic acid, isophthalic acid, terephthalic acid, 1,3,5-benzenetrycarboxylic acid, adipic acid, dodecanedioic acid, citric acid, tartaric acid, ethylenediaminetetraacetic acid, ethylenediaminetetraacetic acid disodium salt, and gluconic acid.

Only one of these compounds may be used alone, or two or more thereof may be used in combination.

Among the compounds having a carboxyl group listed above, a compound having a plurality of carboxyl groups in one molecule is preferred, such as cyclohexanedicarboxylic acid, isophthalic acid, terephthalic acid, trimellitic acid, trimellitic anhydride, 1,3,5-tetrabenzenetetracarboxylic acid, 1,2,4-cyclohexanetricarboxylic acid, adipic acid, dodecanedioic acid, citric acid, tartaric acid, ethylenediaminetetraacetic acid, or ethylenediaminetetraacetic acid disodium salt.

In the case of using the compound having a carboxyl group, the obtained polyamide resin composition has better physical properties during water absorption.

Meanwhile, the present inventors have found that the addition of sodium acetate is not effective for improving physical properties during water absorption, as compared with the addition of other carboxylic acids including the carboxylic acids listed above. This is probably because the addition of sodium acetate, which has already been in the form of sodium salt, does not exert effects as carboxylic acid.

<Compound having Sulfo Group>

Examples of the compound having a sulfo group as the acid (C4) include, but are not limited to, methanesulfonic acid, benzenesulfonic acid, p-toluenesulfonic acid, fluorosulfonic acid, and derivatives thereof.

Only one of these compounds may be used alone, or two or more thereof may be used in combination.

<Compound having Hydroxy Group>

Examples of the compound having a hydroxy group as the acid (C4) include, but are not limited to, cyclohexanol, decanol, decanediol, dodecanol, dodecanediol, pentaerythritol, dipentaerythritol, tripentaerythritol, di-trimethylolpropane, D-mannitol, D-sorbitol, xylitol, phenol, and derivatives thereof.

Only one of these compounds may be used alone, or two or more thereof may be used in combination.

In the polyamide resin composition of the present embodiment, the acid (C4) is preferably a compound having a carboxyl group from the viewpoint of physical properties during water absorption and productivity.

In the polyamide resin composition of the present embodiment, the acid (C4) is preferably an aromatic carboxylic acid compound from the viewpoint of productivity.

Examples thereof include, but are not limited to, isophthalic acid, terephthalic acid, trimellitic acid, and 1,3,5-tetrabenzenetetracarboxylic acid.

In the polyamide resin composition of the present embodiment, the molecular weight (Mn) of the acid (C4) is preferably 50≤Mn≤1000 from the viewpoint of physical properties during water absorption and productivity.

The molecular weight (Mn) of the acid (C4) is more preferably 100≤Mn≤700, further preferably 100≤Mn≤500.

The acid (C4) preferably comprises a carboxylic anhydride-containing unsaturated vinyl monomer as a component constituting the main chain and has a glass transition temperature Tg exceeding 0° C., from the viewpoint of the high-temperature physical properties of the polyamide resin composition of the present embodiment.

When the component (C) comprises a carboxylic anhydride-containing unsaturated vinyl monomer as a component constituting the main chain, the glass transition temperature is preferably 60° C.<Tg.

The component (C) having 60° C.<Tg is more highly effective for improving the high-temperature physical properties of the polyamide resin composition of the present embodiment. From a similar viewpoint, the glass transition temperature is more preferably 60° C.<Tg<200° C.

The Tg of the component (C) can be measured according to JIS-K7121 at a rate of temperature increase of 20° C./min using Diamond-DSC manufactured by PerkinElmer Inc.

When the acid (C4) comprises a carboxylic anhydride-containing unsaturated vinyl monomer as a component constituting the main chain, the carboxylic anhydride-containing unsaturated vinyl monomer is only required to have a glass transition temperature Tg exceeding 0° C. The acid (C4) is particularly preferably a copolymer of olefin and maleic anhydride.

Examples of the acid (C4) include, but are not limited to, ethylene-maleic anhydride copolymers, propylene-maleic anhydride copolymers, butadiene-maleic anhydride copolymers, styrene-maleic anhydride copolymers, and acrylonitrile-maleic anhydride copolymers.

Among them, an ethylene-maleic anhydride copolymer is preferred from the viewpoint of improvement in the high-temperature physical properties of the polyamide resin composition of the present embodiment.

When the acid (C4) comprises a carboxylic anhydride-containing unsaturated vinyl monomer as a component constituting the main chain, the weight-average molecular weight of the acid (C4) is preferably 600,000 or less, more preferably 10,000 or more and 600,000 or less, further preferably 10,000 or more and 400,000 or less.

When the acid (C4) comprises a carboxylic anhydride-containing unsaturated vinyl monomer as a component constituting the main chain, the acid (C4) having a weight-average molecular weight of 10,000 or more exhibits improved heat stability and can suppress decomposition or the like in the step of extruding the polyamide resin composition of the present embodiment.

The acid (C4) having a weight-average molecular weight of 600,000 or less exerts favorable dispersibility in the polyamide resin composition and tends to improve the vibration fatigue resistance of the polyamide resin composition.

When the acid (C4) has a weight-average molecular weight of 400,000 or less, the obtained polyamide resin composition tends to be able to have better vibration fatigue resistance.

In the present specification, the weight-average molecular weight can be determined by gel permeation chromatography (GPC).

When the acid (C4) comprises a carboxylic anhydride-containing unsaturated vinyl monomer as a component constituting the main chain, the acid value of the acid (C4) is preferably 0.1 or more, more preferably 0.2 or more.

When the acid (C4) comprises a carboxylic anhydride-containing unsaturated vinyl monomer as a component constituting the main chain, the acid value is preferably 0.5 or less.

The acid (C4) having an acid value of 0.1 or more and 0.5 or less tends to be more highly effective for improving the vibration fatigue resistance of the polyamide resin composition of the present embodiment.

In the present specification, the acid value of the acid (C4) can be determined according to JIS K0070 by measuring mg of potassium hydroxide necessary for neutralizing an acid, per g of the acid (C4).

In the polyamide resin composition of the present embodiment, an alkalinity value of the alkali metal compound and/or the alkaline earth metal compound (B) (except for an aluminic acid metal salt, a halide of an alkali metal, and a halide of an alkaline earth metal) included in 100 parts by mass of the thermoplastic resins (the total of the component (A) and the component (C3)) based on the acid value of the acid (C4) included in 100 parts by mass of the thermoplastic resins (the total of the component (A) and the component (C3)): (X) preferably satisfies following (formula 1) from the viewpoint of physical properties during water absorption and productivity:

$$0 < X \leq 5 \quad \text{(Formula 1)}$$

wherein X=(alkalinity value of the alkali metal compound and/or the alkaline earth metal compound (B) (except for an aluminic acid metal salt, a halide of an alkali metal, and a halide of an alkaline earth metal) included in 100 parts by mass of the thermoplastic resins (the total of the component (A) and the component (C3)))/(acid value of the acid (C4) included in 100 parts by mass of the thermoplastic resins (the total of the component (A) and the component (C3))).

In the polyamide resin composition of the present embodiment, the (formula 1) is more preferably $0 < X \leq 3$, further preferably $0 < X \leq 2$, still further preferably $0 < X \leq 1$.

The acid value of the acid (C4) included in 100 parts by mass of the thermoplastic resins (the total of the component (A) and the component (C3)) is defined on the basis of JIS K0070.

Specifically, the acid value is mg of potassium hydroxide necessary for neutralizing free fatty acids, resin acids, and the like contained in 1 g of a sample.

The alkalinity value of the alkali metal compound and/or the alkaline earth metal compound (B) (except for an aluminic acid metal salt, a halide of an alkali metal, and a halide of an alkaline earth metal) included in 100 parts by mass of the thermoplastic resins (the total of the component (A) and the component (C3)) is defined on the basis of JIS K0070.

Specifically, the alkalinity value is mg of potassium hydroxide necessary for neutralizing acetic acid bonded to a hydroxy group when 1 g of a sample is acetylated.

The phrase "included in 100 parts by mass of the thermoplastic resins (the total of the component (A) and the component (C3))" means when the thermoplastic resins (the total of the component (A) and the component (C3)) in the polyamide resin composition of the present embodiment are defined as 100 parts by mass. The (formula 1) is calculated in consideration of the content of the component (B) and the content of the component (C4) in the case where the amount of the thermoplastic resins (the total of the component (A) and the component (C3)) is 100 parts by mass in common.

In the polyamide resin composition of the present embodiment, the alkalinity value of the alkali metal compound and/or the alkaline earth metal compound (B) (except for an aluminic acid metal salt, a halide of an alkali metal, and a halide of an alkaline earth metal) included in 100 parts by mass of the thermoplastic resins (the total of the component (A) and the component (C3)) based on the sum of the acid value of the acid (C4) and the acid value of the terminal carboxyl group of the polyamide resin (A) included in 100 parts by mass of the thermoplastic resins (the total of the component (A) and the component (C3)): (Y) preferably satisfies following (formula 2) from the viewpoint of physical properties during water absorption and productivity:

$$0 < Y \leq 3 \quad \text{(Formula 2)}$$

wherein Y=(alkalinity value of the alkali metal compound and/or the alkaline earth metal compound (B) (except for an aluminic acid metal salt, a halide of an alkali metal, and a halide of an alkaline earth metal) included in 100 parts by mass of the thermoplastic resins (the total of the component (A) and the component (C3)))/(acid value of the acid (C4)+ acid value of the terminal carboxyl group of the polyamide resin (A) included in 100 parts by mass of the thermoplastic resins (the total of the component (A) and the component (C3))).

In the polyamide resin composition of the present embodiment, the (formula 2) is more preferably $0 < Y \leq 2$, further preferably $0 < X \leq 1.5$, still further preferably $0 < Y \leq 1.2$.

The phrase "included in 100 parts by mass of the thermoplastic resins (the total of the component (A) and the component (C3))" means when the thermoplastic resins (the total of the component (A) and the component (C3)) in the polyamide resin composition of the present embodiment are defined as 100 parts by mass. The (formula 2) is calculated in consideration of the alkalinity value of the component (B), the acid value of the acid (C4), and the acid value of the terminal carboxyl group of the polyamide resin (A) in the case where the amount of the thermoplastic resins (the total of the component (A) and the component (C3)) is 100 parts by mass in common.

The relationship between the acid (C4) and a carboxylic acid or an end-capping agent in the component (A) will be complemented.

The carboxylic acid used as a starting material monomer or an end-capping agent in the polyamide resin (A) is incorporated in a polymer for its purposes. Specifically, the carboxylic acid is covalently bonded in a polymer chain.

On the other hand, in the present specification, the acid (C4) is an organic acid component having a carboxylic acid functional group that is not covalently bonded with a polymer, for its purposes.

When the carboxylic acid used as a starting material monomer or an end-capping agent in the polyamide resin (A) and the carboxylic acid used as the acid (C4) are identical components, the carboxylic acid used as a starting material monomer or an end-capping agent in the polyamide resin (A) refers to a carboxylic acid covalently bonded in a polymer chain, and the carboxylic acid used as the acid (C4) refers to a carboxylic acid that is not covalently bonded with a polymer.

In the case of using a carboxylic acid as a starting material monomer or an end-capping agent in the polyamide resin (A), those skilled in the art generally recognize that this carboxylic acid is covalently bonded in a polymer chain.

A polyamide resin is caused by an intended operation to contain more than a trace amount of a carboxylic acid as impurities in a state that is not covalently bonded in a polymer chain. Those skilled in the art generally recognize that for this purpose, composition and a production method need to be devised.

In short, conventional use of a carboxylic acid as a starting material for a polyamide resin composition does not mean that the carboxylic acid as the acid (C4) is accidentally contained as intended by the invention of the present application.

The above description relates to an organic acid, specifically, an organic acid having 1 to 3 carboxylic acid functional groups in one molecule, which may be used as a carboxylic acid or an end-capping agent in the component (A).

On the other hand, an organic acid molecule having 4 or more carboxylic acid functional groups in one molecule exerts the effects of the present invention even if some of the carboxylic acid functional groups are covalently bonded with the polyamide resin.

In short, the organic acid having 1 to 3 carboxylic acid functional groups in one molecule cannot sufficiently exert the effects of the present invention if some of the carboxylic acid functional groups are covalently bonded with the polyamide resin. By contrast, the organic acid having 4 or more carboxylic acid functional groups in one molecule exerts the effects of the present invention even if some of the carboxylic acid functional groups are covalently bonded with the polyamide resin.

The present inventors believe that this is because, even if some of the 4 or more carboxylic acid functional groups contained in one molecule are covalently bonded with polyamide, the remaining carboxylic acid functional groups that are not covalently bonded contribute to the effects of the present invention.

The aforementioned covalent bond of the organic acid with the polymer of the polyamide resin (A) can be confirmed by use of an approach, for example, nuclear magnetic resonance (NMR) or IR, though the approach is not limited thereto.

The acid (C4) may be added to the polyamide resin (A) at any timing of polymerization or melt kneading.

The acid (C4) is preferably added during melt kneading from the viewpoint of improvement in the productivity and physical properties during water absorption of the polyamide resin composition of the present embodiment.

((D) Inorganic Filler Except for Alkali Metal Compound and/or Alkaline Earth Metal Compound)

The polyamide resin composition of the present embodiment preferably contains (D) an inorganic filler except for an alkali metal compound and/or an alkaline earth metal compound (hereinafter, also referred to as an inorganic filler (D) or a component (D)).

The content of the component (D) is preferably 10 parts by mass or more and 250 parts by mass or less, more preferably 10 parts by mass or more and 150 parts by mass or less, further preferably 15 parts by mass or more and 100 parts by mass or less, based on 100 parts by mass of the thermoplastic resin components (the total of the component (A) and the component (C3)).

Within the aforementioned range, the polyamide resin composition of the present embodiment tends to have better flowability and appearance characteristics.

Examples of (D) the inorganic filler except for an alkali metal compound and/or an alkaline earth metal compound include, but are not limited to, glass fibers, carbon fibers, calcium silicate fibers, potassium titanate fibers, aluminum borate fibers, glass flakes, talc, kaolin, mica, hydrotalcite, calcium carbonate, zinc carbonate, zinc oxide, calcium monohydrogen phosphate, wollastonite, silica, zeolite, alumina, boehmite, aluminum hydroxide, titanium oxide, silicon oxide, magnesium oxide, calcium silicate, sodium aluminosilicate, magnesium silicate, ketjen black, acetylene black, farness black, carbon nanotubes, graphite, yellow copper, copper, silver, aluminum, nickel, iron, calcium fluoride, mica isinglass, montmorillonite, swellable fluorine mica, and apatite.

Among them, glass fibers having a circular or non-circular cross section, glass flakes, talc (magnesium silicate), mica, kaolin, wollastonite, titanium oxide, calcium phosphate, calcium carbonate, or calcium fluoride is preferred from the viewpoint of enhancing the strength and rigidity of the polyamide resin composition of the present embodiment.

Glass fibers, wollastonite, talc, mica, or kaolin is more preferred, and glass fibers are further preferred.

One or more of these inorganic fillers may be used alone as the component (D), or two or more thereof may be used in combination.

The glass fibers or the carbon fibers further preferably have a number-average fiber diameter of 3 to 30 μm, a weight-average fiber length of 100 to 750 μm, and a weight-average fiber length/number-average fiber diameter aspect ratio (a value obtained by dividing the weight-average fiber length by the number-average fiber diameter) of 10 to 100 from the viewpoint that excellent mechanical characteristics can be imparted to the polyamide resin composition.

The wollastonite preferably has a number-average fiber diameter of 3 to 30 μm, a weight-average fiber length of 10 to 500 μm, and a weight-average fiber length/number-average fiber diameter aspect ratio of 3 to 100 from the viewpoint that excellent mechanical characteristics can be imparted to the polyamide resin composition of the present embodiment.

The talc, the mica, or the kaolin preferably has a number-average fiber diameter of 0.1 to 3 μm from the viewpoint that excellent mechanical characteristics can be imparted to the polyamide resin composition of the present embodiment.

In this context, the number-average fiber diameter and the weight-average fiber length described in the present specification can be determined as follow.

Specifically, the polyamide resin composition is placed in an electric furnace, and the organic matter contained therein is incinerated. For example, 100 or more filaments of the inorganic filler (D) are arbitrarily selected from the residue and observed by SEM. Their fiber diameters are measured, and an average value can be calculated to determine the number-average fiber diameter.

Also, the fiber lengths are measured using a SEM photograph taken at a magnification of ×1000, and the weight-average fiber length can be determined according to a predetermined formula (Weight-average fiber length=Σ(I=1→n) (Fiber length of the nth fiber)$^2$/Σ(I=1→n) (Fiber length of the nth fiber), wherein n represents the number of measured fibers).

The inorganic filler (D) may be surface-treated with a silane coupling agent or the like.

Examples of the silane coupling agent include, but are not limited to: aminosilanes such as γ-aminopropyltriethoxysilane, γ-aminopropyltrimethoxysilane, and N-β-(aminoethyl)-y-aminopropylmethyldimethoxysilane; mercaptosilanes such as γ-mercaptopropyltrimethoxysilane and γ-mercaptopropyltriethoxysilane; epoxysilanes; and vinylsilanes.

Only one of these silane coupling agents may be used alone, or two or more thereof may be used in combination. Among the silane coupling agents, an aminosilane is more preferred from the viewpoint of affinity for resins.

In the case of using the glass fibers as the inorganic filler (D), the glass fibers preferably further contain a sizing agent.

The sizing agent is a component that is applied to the surface of the glass fibers.

Examples of the sizing agent include copolymers containing a carboxylic anhydride-containing unsaturated vinyl monomer and an unsaturated vinyl monomer other than the carboxylic anhydride-containing unsaturated vinyl monomer as constitutional units, epoxy compounds, polycarbodiimide compounds, polyurethane resins, acrylic acid homopolymers, copolymers of acrylic acid and an additional copolymerizable monomer, and salts thereof with primary, secondary, and tertiary amines.

Only one of these sizing agents may be used alone, or two or more thereof may be used in combination.

Among them, a copolymer containing a carboxylic anhydride-containing unsaturated vinyl monomer and an unsaturated vinyl monomer other than the carboxylic anhydride-containing unsaturated vinyl monomer as constitutional units, an epoxy compound, a polycarbodiimide compound, or a polyurethane resin, or a combination thereof is preferred, and a copolymer containing a carboxylic anhydride-containing unsaturated vinyl monomer and an unsaturated vinyl monomer other than the carboxylic anhydride-containing unsaturated vinyl monomer as constitutional units is more preferred, from the viewpoint of the mechanical strength of the polyamide resin composition of the present embodiment.

Examples of the carboxylic anhydride-containing unsaturated vinyl monomer in the copolymer containing a carboxylic anhydride-containing unsaturated vinyl monomer and an unsaturated vinyl monomer other than the carboxylic anhydride-containing unsaturated vinyl monomer as constitutional units include, but are not limited to, maleic anhydride, itaconic anhydride, and citraconic anhydride. Among them, maleic anhydride is preferred.

On the other hand, the unsaturated vinyl monomer other than the carboxylic anhydride-containing unsaturated vinyl monomer refers to an unsaturated vinyl monomer that is different from the carboxylic anhydride-containing unsaturated vinyl monomer.

Examples of the unsaturated vinyl monomer other than the carboxylic anhydride-containing unsaturated vinyl monomer include, but are not limited to, styrene, α-methylstyrene, ethylene, propylene, butadiene, isoprene, chloroprene, 2,3-dichlorobutadiene, 1,3-pentadiene, cyclooctadiene, methyl methacrylate, methyl acrylate, ethyl acrylate, and ethyl methacrylate. Among them, styrene or butadiene is preferred.

Among their combinations, one or more selected from the group consisting of a copolymer of maleic anhydride and butadiene, a copolymer of maleic anhydride and ethylene, and a copolymer of maleic anhydride and styrene, and mixtures thereof are more preferred.

The copolymer containing a carboxylic anhydride-containing unsaturated vinyl monomer and an unsaturated vinyl monomer other than the carboxylic anhydride-containing unsaturated vinyl monomer as constitutional units preferably has a weight-average molecular weight of 2,000 or more from the viewpoint of improvement in the flowability of the polyamide resin composition of the present embodiment. The weight-average molecular weight is more preferably 2,000 to 1,000,000. In the present specification, the weight-average molecular weight can be measured by GPC (gel permeation chromatography).

Examples of the epoxy compound include, but are not limited to: aliphatic epoxy compounds such as ethylene oxide, propylene oxide, butene oxide, pentene oxide, hexene oxide, heptene oxide, octene oxide, nonene oxide, decene oxide, undecene oxide, dodecene oxide, pentadecene oxide, and eicosene oxide; alicyclic epoxy compounds such as glycidol, epoxypentanol, 1-chloro-3,4-epoxybutane, 1-chloro-2-methyl-3,4-epoxybutane, 1,4-dichloro-2,3-epoxybutane, cyclopentene oxide, cyclohexene oxide, cycloheptene oxide, cyclooctene oxide, methylcyclohexene oxide, vinylcyclohexene oxide, and epoxidized cyclohexene methyl alcohol; terpene-based epoxy compounds such as pinene oxide; aromatic epoxy compounds such as styrene oxide, p-chlorostyrene oxide, and m-chlorostyrene oxide; epoxidized soybean oil; and epoxidized flaxseed oil.

The polycarbodiimide compound is a compound containing one or more carbodiimide groups (—N═C═N—), i.e., a compound obtained by the condensation of carbodiimide compounds.

The degree of condensation for the polycarbodiimide compound is preferably 1 to 20, more preferably 1 to 10. When the degree of condensation falls within the range of 1 to 20, a favorable aqueous solution or aqueous dispersion is obtained. When the degree of condensation falls within the range of 1 to 10, a more favorable aqueous solution or aqueous dispersion is obtained.

The polycarbodiimide compound is preferably a polycarbodiimide compound partially having a polyol segment. The polycarbodiimide compound partially having a polyol segment is easily solubilized and can be used more preferably as the sizing agent for the glass fibers or the carbon fibers.

The polycarbodiimide compound, i.e., the compound containing various carbodiimide groups (—N═C═N—) as described above, is obtained by the decarboxylation reaction of a diisocyanate compound in the presence of a carbodiimidization catalyst known in the art such as 3-methyl-1-phenyl-3-phospholene-1-oxide.

An aromatic diisocyanate, an aliphatic diisocyanate, or an alicyclic diisocyanate, or a mixture thereof can be used as the diisocyanate compound.

Examples of the diisocyanate compound include, but are not limited to, 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, 2,6-diisopropylphenyl diisocyanate, and 1,3,5-triisopropylbenzene-2,4-diisocyanate.

These diisocyanate compounds are carbodiimidized to obtain carbodiimide compounds having two isocyanate groups at their ends. Of them, dicyclohexylmethane diisocyanate can be preferably used from the viewpoint of improvement in reactivity.

Alternatively, a polycarbodiimide compound having one isocyanate group at the end is obtained by, for example, a method which involves carbodiimidizing monoisocyanate compounds in equimolar amounts or a method which involves reacting a monoisocyanate compound with a polyalkylene glycol monoalkyl ether in equimolar amounts to form an urethane bond Examples of the monoisocyanate compound include, but are not limited to, hexyl isocyanate, phenyl isocyanate, and cyclohexyl isocyanate.

Examples of the polyalkylene glycol monoalkyl ether include, but are not limited to, polyethylene glycol monomethyl ether and polyethylene glycol monoethyl ether.

The polyurethane resin can be any of those generally used as the sizing agent. Examples thereof include, but are not limited to, polyurethane resins synthesized from an isocyanate such as m-xylylene diisocyanate (XDI), 4,4'-methylenebis(cyclohexyl isocyanate) (HMDI), or isophorone diisocyanate (IPDI), and a polyester-based or polyether-based diol.

The acrylic acid homopolymers (polyacrylic acids) preferably have a weight-average molecular weight of 1,000 to 90,000, more preferably 1,000 to 25,000, from the viewpoint of affinity for resins.

Examples of the "additional copolymerizable monomer" constituting the copolymers of acrylic acid and an additional copolymerizable monomer include, but are not limited to, one or more selected from acrylic acid, maleic acid, methacrylic acid, vinylacetic acid, crotonic acid, isocrotonic acid, fumaric acid, itaconic acid, citraconic acid, and mesaconic acid (except for the case where the additional copolymerizable monomer is acrylic acid alone) among monomers having a hydroxy group and/or a carboxyl group.

Of these monomers, one or more ester monomers are preferably used.

The aforementioned polymer (including both of the homopolymer and the copolymer) of acrylic acid may be in the form of a salt.

Examples of the salt of the acrylic acid polymer include, but are not limited to, primary, secondary, and tertiary amines.

Specific examples thereof include triethylamine, triethanolamine, and glycine.

The degree of neutralization is set to preferably 20 to 90%, more preferably 40 to 60%, from the viewpoint of improvement in the stability of a mixed solution with other agents used in combination therewith (silane coupling agent, etc.) or reduction in amine odor.

The weight-average molecular weight of the acrylic acid polymer that forms a salt is not particularly limited and is preferably in the range of 3,000 to 50,000. The weight-average molecular weight is preferably 3,000 or more from the viewpoint of improvement in glass fiber or carbon fiber sizing properties and is preferably 50,000 or less from the viewpoint of improvement in the mechanical characteristics of the polyamide resin composition of the present embodiment.

Examples of the method for treating the glass fibers or the carbon fibers with various sizing agents mentioned above include a method which involves applying each of the aforementioned sizing agents to the glass fibers or the carbon fibers using a method known in the art such as a roller-type applicator in the step of producing the glass fibers or the carbon fibers known in the art, and drying the fiber strand thus produced for continuous reaction.

The fiber strand may be used directly as a roving or may be used as a chopped glass strand through a further cutting step.

The sizing agent is preferably applied (added) at a solid fraction corresponding to 0.2 to 3% by mass, more preferably 0.3 to 2% by mass, based on 100% by mass of the glass fibers or the carbon fibers. The amount of the sizing agent added is preferably 0.2% by mass or more in terms of a solid fraction based on 100% by mass of the glass fibers or the carbon fibers from the viewpoint of maintaining the bundling of the glass fibers or the carbon fibers. On the other hand, the amount of the sizing agent added is preferably 3% by mass or less from the viewpoint of improvement in the heat stability of the polyamide resin composition of the present embodiment.

The drying of the strand may be carried out after the cutting step, or the cutting step may be carried out after the drying of the strand.

(Additional Component that may be Contained in Polyamide Resin Composition)

The polyamide resin composition of the present embodiment may further contain an additional component, if necessary, without impairing the effects of the present invention in addition to the aforementioned component (A) to component (D).

Examples of the additional component include, but are not limited to, ultraviolet absorbers, light degradation inhibitors, plasticizers, lubricants, mold release agents, nucleating agents, flame retardants, colorants, staining agents, pigments, and other thermoplastic resins.

In this context, these additional components largely differ in their properties. Therefore, their preferred contents that hardly impair the effects of the present embodiment vary among these components. Those skilled in the art can readily set the respective preferred contents of these additional components.

[Characteristics of Polyamide Resin Composition]

(Number-Average Molecular Weight (Mn) of Polyamide Resin Composition)

The number-average molecular weight (Mn) of the polyamide resin composition of the present embodiment is preferably 10000 or more from the viewpoint of mechanical physical properties and heat aging resistance. The number-average molecular weight of the polyamide resin composition is more preferably 12000 or more, further preferably 15000 or more.

In the present specification, the number-average molecular weight can be determined by gel permeation chromatography (GPC) using the polyamide resin composition as an assay sample and hexafluoroisopropanol (HFIP) as a solvent, and substantially corresponds to the number-average molecular weight of the polyamide resin (A) in the polyamide resin composition, or the polyamide resin (A) including components covalently bonded in the polyamide resin (A).

For adjusting the number-average molecular weight (Mn) of the polyamide resin composition of the present embodiment to the aforementioned range, a method is preferably utilized which involves kneading the alkali metal compound and/or the alkaline earth metal compound (B) (except for an aluminic acid metal salt, a halide of an alkali metal, and a halide of an alkaline earth metal) in a melted state of the polyamide resin (A) using a single-screw or multiple-screw extruder.

For adjusting the number-average molecular weight (Mn) of the polyamide resin composition of the present embodiment to the aforementioned range, a method is also preferably utilized which involves kneading the acid (C4) in a melted state of the polyamide resin (A) using a single-screw or multiple-screw extruder.

For adjusting the number-average molecular weight (Mn) of the polyamide resin composition of the present embodiment to the aforementioned range, a method is more preferably utilized which involves kneading the alkali metal compound and/or the alkaline earth metal compound (B) (except for an aluminic acid metal salt, a halide of an alkali metal, and a halide of an alkaline earth metal) and the acid (C4) in a melted state of the polyamide resin (A) using a single-screw or multiple-screw extruder.

(Molecular Weight Distribution (Mw/Mn) of Polyamide Resin Composition)

The polyamide resin composition of the present embodiment preferably has Mw/Mn of 2.0 or more and has Mw/Mn of 3.0 or more after heat aging at 120° C. for 1000 hours.

The Mw/Mn before the heat aging is more preferably 2.2 or more, further preferably 2.4 or more.

The Mw/Mn after the heat aging at 120° C. for 1000 hours is more preferably 3.2 or more, further preferably 3.4 or more.

When the Mw/Mn before the heat aging and the Mw/Mn after the heat aging fall their respective aforementioned ranges, the obtained polyamide resin composition is excellent in heat aging resistance.

The Mw and Mn of the polyamide resin composition can be measured by GPC and can specifically be measured by a method described in Examples mentioned later.

For adjusting the Mw/Mn of the polyamide resin composition of the present embodiment to 2.0 or more, it is effective to add the aforementioned "organic acid that comprises a carboxylic anhydride-containing unsaturated vinyl monomer as a component constituting the main chain and has a glass transition temperature Tg exceeding 0° C." as the acid (C4).

Also, the addition of the aforementioned "organic acid that comprises a carboxylic anhydride-containing unsaturated vinyl monomer as a component constituting the main chain and has a glass transition temperature Tg exceeding 0° C." is a method suitable for adjusting the Mw/Mn after heat aging at 120° C. for 1000 hours to 3.0 or more.

(Measurement of Degree of Branching of Polyamide Resin Composition by GPC-MALS-VISCO)

For the polyamide resin composition of the present embodiment, it is preferred that, in GPC-MALS-VISCO analysis, a contained molecule having a molecular weight of 100,000 or more should have a structure with one or more branch points, and the molecule having a molecular weight of 100,000 or more should contain a carboxylic anhydride functional group.

The number of branch points in the structure of the molecule having a molecular weight of 100,000 or more is determined by GPC-MALS-VISCO analysis mentioned later.

In the GPC-MALS-VISCO analysis, specifically, the number of branch points is calculated on the basis of trifunctional random branching theory after measurement using an apparatus for GPC-MALS-VISCO measurement set to conditions given below.

The contained molecule having the aforementioned structure is effective for obtaining the polyamide resin composition of the present embodiment that is excellent in heat aging resistance and also excellent in mechanical physical properties during water absorption.

The molecule having a molecular weight of 100,000 or more, contained in the polyamide resin composition of the present embodiment preferably has a structure with two or more branch points and more preferably has a structure with three or more branch points.

<Apparatus for GPC-MALS-VISCO Measurement>
Apparatus: gel permeation chromatograph-multi-angle laser light scattering photometer
Configuration
Pump: MODEL 1100 manufactured by Agilent Technologies, Inc
Detector: differential refractometer Optilab rEX manufactured by Wyatt Technology Corp.
Multi-angle laser light scattering detector: DAWN HELEOS manufactured by Wyatt Technology Corp.
Viscosity detector: VISCOSTAR manufactured by Wyatt Technology Corp.
Column: Shodex HFIP-806M (two columns)
Column temperature: 40° C.
Solvent: hexafluoroisopropanol (HFIP; supplemented with 5 mM sodium trifluoroacetate)
Flow rate: 0.5 mL/min
Injection volume: 0.200 mL
Data processing: data processing system ASTRA manufactured by Wyatt Technology Corp.

<Method for Calculating the Number of Branch Points on Basis of Trifunctional Random Branching Theory>

From signal intensity DP ($\Delta P$) of a VISCO curve and inlet pressure P, specific viscosity $\eta_{spi}$ is calculated according to following formula (1):

$$\eta_{spi} = 4\Delta P/(P_i - 2\Delta P) \quad \text{Formula (1):}$$

Subsequently, intrinsic viscosity $[\eta]_i$ at each elution time is determined according to following formula (2):

$$[\eta]_i = (2(0.5)/C_i)(\eta_{spi} - L_n(\eta_{spi}+1))(0.5) \quad \text{Formula (2):}$$

($C_i$: concentration at elution time $t_i$)

Next, the number of branch points ($k_m$) per molecule is calculated according to following formulae (3) and (4) based on the trifunctional random branching theory:

$$g = ((1+\lambda_M/7)(1/2) + 4\lambda_M/9)(-1/2) \quad \text{Formula (3):}$$

$$g(3/2) = ([\eta] \text{ of the polyamide resin composition})/([\eta] \text{ of the polyamide resin } (A)) \quad \text{Formula (4):}$$

The molecule having a molecular weight of 100,000 or more can be confirmed to contain a carboxylic anhydride functional group by a detection method mentioned later.

<Method for Detecting Carboxylic Anhydride Functional Group of Molecule having Molecular Weight of 100,000 or More in Polyamide Resin Composition>

First, the molecule having a molecular weight of 100,000 or more is separated using a gel permeation chromatograph apparatus (solvent: hexafluoroisopropanol (HFIP)).

Next, the fraction is dried and hardened in a rotary evaporator. Then, a carboxylic anhydride functional group, for example, a maleic anhydride functional group, is confirmed by use of $^1$H-NMR or IR.

For the polyamide resin composition of the present embodiment in which, in GPC-MALS-VISCO analysis, the molecule having a molecular weight of 100,000 or more has a structure with one or more branch points, and the molecule having a molecular weight of 100,000 or more contains a carboxylic anhydride functional group, it is effective to add the aforementioned "organic acid that comprises a carboxylic anhydride-containing unsaturated vinyl monomer as a component constituting the main chain and has a glass transition temperature Tg exceeding 0° C." as the acid (C4).

(Amount of Decrease in Mass when Polyamide Resin Composition is Left at 300° C. for 1 Hour)

The amount of decrease in mass is preferably 10% or less, more preferably 9% or less, further preferably 8% or less, when the polyamide resin composition of the present embodiment is left at 300° C. for 1 hour in an inert gas atmosphere using a thermogravimetric analysis (TGA) apparatus.

The thermogravimetric analysis (TGA) is not particularly limited and can be conducted using, for example, TGA-50 manufactured by Shimadzu Corp.

For adjusting the amount of decrease in mass to 10% or less when the polyamide resin composition of the present embodiment is left at 300° C. for 1 hour in an inert gas atmosphere using a thermogravimetric analysis (TGA) apparatus, it is effective to use the acid (C4) having high heat stability.

The high heat stability of the acid (C4) means that a temperature that decreases the mass by 5% for the acid (C4) used in the polyamide resin composition of the present embodiment is high in measurement using a thermogravimetric analysis (TGA) apparatus in an inert gas atmosphere. The temperature that decreases the mass by 5% is preferably 260° C. or more, more preferably 270° C. or more, further preferably 280° C. or more.

(Content of Reducing Phosphorus Compound)

The content of a reducing phosphorus compound in the polyamide resin composition of the present embodiment is preferably 200 ppm or less in terms of the content of a phosphorus element. When the content of the reducing phosphorus compound is 200 ppm or less in terms of the content of a phosphorus element, the obtained polyamide resin composition can have better heat aging resistance because the degeneration of the component (B) is suppressed.

From a similar viewpoint, the content of the reducing phosphorus compound is more preferably 100 ppm or less in terms of the content of a phosphorus element, further preferably 60 ppm or less in terms of the content of a phosphorus element.

The content of the reducing phosphorus compound based on a phosphorus element can be determined by a method described in Examples mentioned later.

[Method for Producing Polyamide Resin Composition]

The polyamide resin composition of the present embodiment can be produced by mixing the polyamide resin (A), the alkali metal compound and/or the alkaline earth metal compound (B) (except for an aluminic acid metal salt, a halide of an alkali metal, and a halide of an alkaline earth metal), the at least one or more compounds (C) selected from the group consisting of following (C1) to (C4):

(C1) a salt of one or more metal elements selected from the group consisting of groups 3, 4, 11, 13, and 14 of periodic table, (C2) at least one organic heat stabilizer selected from the group consisting of a hindered phenol compound, a hindered amine compound, and an organic phosphorus compound, (C3) a crystalline thermoplastic resin having a lower melting point than that of the component (A) and/or an amorphous thermoplastic resin having a lower Vicat softening point than that of the component (A), and (C4) an acid and, if necessary, the component (C1-2) (the halide of an alkali metal and/or the halide of an alkaline earth metal), (D) the inorganic filler except for an alkali metal compound and/or an alkaline earth metal compound, and the additional component.

In the production of the polyamide resin composition of the present embodiment, a method can be preferably used which involves kneading the alkali metal compound and/or the alkaline earth metal compound (B) (except for an aluminic acid metal salt, a halide of an alkali metal, and a halide of an alkaline earth metal) and the component (C) in a melted state of the polyamide resin (A) using a single-screw or multiple-screw extruder.

Alternatively, a method can be used which involves well stirring and mixing in advance an aqueous solution of the alkali metal compound and/or the alkaline earth metal compound (B) (except for an aluminic acid metal salt, a halide of an alkali metal, and a halide of an alkaline earth metal) and pellets of the polyamide resin (A), followed by dehydration, supplying the polyamide resin pellets prepared by this approach and the component (C) from a feed port of an extruder, and melt-kneading the mixture.

The addition of the alkali metal compound and/or the alkaline earth metal compound (B) is preferably carried out by a method which involves kneading the alkali metal compound and/or the alkaline earth metal compound (B) in a melted state of the polyamide resin (A) using a single-screw or multiple-screw extruder, from the viewpoint of the dispersibility of the alkali metal compound and/or the alkaline earth metal compound (B) (except for an aluminic acid metal salt, a halide of an alkali metal, and a halide of an alkaline earth metal). Specifically, the component (B) is preferably added to the polyamide resin (A) by melt kneading.

For the acid (C4), a method is preferred which involves kneading the acid (C4) in a melted state of the polyamide resin (A) using a single-screw or multiple-screw extruder, from the viewpoint of productivity. Specifically, the acid (C4) is preferably added to the polyamide resin (A) by melt kneading.

The method for producing the polyamide resin composition of the present embodiment preferably comprises the step of adding the alkali metal compound and/or the alkaline earth metal compound (B) (except for an aluminic acid metal salt, a halide of an alkali metal, and a halide of an alkaline earth metal) in the form of a master batch.

Specifically, it is more preferred that the alkali metal compound and/or the alkaline earth metal compound (B) (except for an aluminic acid metal salt, a halide of an alkali metal, and a halide of an alkaline earth metal) having a higher concentration than that of the alkali metal compound and/or the alkaline earth metal compound (B) (except for an aluminic acid metal salt, a halide of an alkali metal, and a halide of an alkaline earth metal) to be added into the end objective polyamide resin composition should be melt-kneaded with the polyamide resin (A) to prepare pellets, which are then melt-kneaded with other components to produce the end objective polyamide resin composition, from the viewpoint of heat aging resistance.

The method for producing the polyamide resin composition of the present embodiment also preferably comprises the step of adding the acid (C4) in the form of a master batch.

Specifically, it is more preferred that the acid (C4) having a higher concentration than that of the acid (C4) to be added into the end objective polyamide resin composition should be melt-kneaded with the polyamide resin (A) to prepare pellets, which are then melt-kneaded with other components to produce the end objective polyamide resin composition, from the viewpoint of productivity.

The method for producing the polyamide resin composition of the present embodiment preferably comprises the step of adding the alkali metal compound and/or the alkaline earth metal compound (B) (except for an aluminic acid metal salt, a halide of an alkali metal, and a halide of an alkaline earth metal) and the acid (C4) in the form of a master batch.

Specifically, it is more preferred that the alkali metal compound and/or the alkaline earth metal compound (B) (except for an aluminic acid metal salt, a halide of an alkali metal, and a halide of an alkaline earth metal) and the acid (C4) having higher concentrations than those of the alkali metal compound and/or the alkaline earth metal compound (B) (except for an aluminic acid metal salt, a halide of an alkali metal, and a halide of an alkaline earth metal) and the acid (C4) to be added into the end objective polyamide resin composition should be melt-kneaded with the polyamide resin (A) to prepare pellets, which are then melt-kneaded with other components to produce the end objective polyamide resin composition, from the viewpoint of improvement in physical properties during water absorption.

[Molded Article Comprising Polyamide Resin Composition]

The molded article of the present embodiment comprises the polyamide resin composition according to the aforementioned embodiment.

The molded article of the present embodiment is obtained, for example, by the injection molding of the polyamide resin composition, without particular limitations.

The molded article according to the present embodiment can be preferably used as material parts for various uses, for example, for automobiles, for machinery industry, for electric or electronic uses, for industrial materials, for engineering materials, and for daily necessities or domestic articles, without particular limitations. The molded article according to the present embodiment is particularly preferably used as a material part for automobiles.

The molded article of the present embodiment has excellent heat aging resistance.

[Use of Polyamide Resin Composition]

A molded article that is excellent in heat aging resistance and also excellent in mechanical physical properties during water absorption can be produced by use of the polyamide resin composition containing the polyamide resin (A), the alkali metal compound and/or the alkaline earth metal compound (B) (except for an aluminic acid metal salt, a halide of an alkali metal, and a halide of an alkaline earth metal), and the acid (C4).

Specifically, the alkali metal compound and/or the alkaline earth metal compound (B) (except for an aluminic acid metal salt, a halide of an alkali metal, and a halide of an alkaline earth metal), particularly, sodium carbonate or sodium bicarbonate, is added to the polyamide resin (A), and the acid (C4) is contained therein. As a result, the heat aging resistance and physical properties during water absorption of the polyamide resin composition can be improved to the extent that the polyamide resin composition can be preferably used in a material part for automobiles.

Specifically, the present embodiment can preferably provide a polyamide resin composition, a molded article, and a material part for automobiles in which sodium carbonate or sodium bicarbonate as the alkali metal compound and/or the alkaline earth metal compound (B) (except for an aluminic acid metal salt, a halide of an alkali metal, and a halide of an alkaline earth metal) has been used as an additive for improving heat aging resistance, and the acid (C4) has been contained.

The present inventors have found that the addition of the alkali metal compound and/or the alkaline earth metal compound (B) (except for an aluminic acid metal salt, a halide of an alkali metal, and a halide of an alkaline earth metal) to a polyamide resin composition improves the heat aging resistance of the polyamide resin composition to the extent that the polyamide resin composition can be preferably used in a material part for automobiles.

Specifically, the present embodiment provides a polyamide resin composition, a molded article, and a material part for automobiles in which an alkali metal compound and/or an alkaline earth metal compound (except for an aluminic acid metal salt, a halide of an alkali metal, and a halide of an alkaline earth metal) has been used as an additive for improving heat aging resistance, and a method for producing the polyamide resin composition.

EXAMPLES

Hereinafter, the present invention will be described in detail with reference to specific Examples and Comparative Examples. However, the present invention is not intended to be limited by Examples below.

Following measurement methods were used for evaluating samples according to Examples and Comparative Examples.

[Measurement Method]
(Relative Viscosity in 98% Sulfuric Acid ($\eta_r$))

In Examples and Comparative Examples (hereinafter, also simply referred to as "each example") mentioned later, the relative viscosity in 98% sulfuric acid ($\eta_r$) of the polyamide resin (A) was measured according to JIS K6920.

(Melting Point)

In Examples and Comparative Examples mentioned later, the melting point of the resin was measured as follows according to JIS-K7121 using Diamond-DSC manufactured by PerkinElmer Inc.

The measurement was carried out in a nitrogen atmosphere.

Approximately 10 mg of each sample was heated from 50° C. to 300° C. at a rate of temperature increase of 20° C./min. The endothermic peak temperature that appeared here was used as the melting point.

(Vicat Softening Point)

Each test specimen of 4 mm thick was used in measurement according to ISO 306 B50 to determine the Vicat softening point (° C.).

(Terminal Group Concentration)

In Examples and Comparative Examples mentioned later, the terminal group concentrations (terminal amino group concentration and terminal carboxyl group concentration) of the polyamide resin (A) were determined by $^1$H-NMR measurement at 60° C. using a bisulfate solvent.

The measurement apparatus used was ECA500 manufactured by JEOL Ltd. The terminal group concentrations were calculated from the integrated values of peaks corresponding to the terminal amino groups and the terminal carboxyl groups in the polyamide resin (A) to obtain (terminal amino group concentration/terminal carboxyl group concentration).

(Initial Tensile Strength and Initial Tensile Elongation)

Pellets of the polyamide resin composition produced in each of Examples and Comparative Examples were used and molded into a molded piece as a multipurpose test specimen (type A) according to ISO 3167 using an injection molding machine (PS-40E; manufactured by Nissei Plastic Industrial Co., Ltd.).

In this operation, the injection and pressure keeping time was set to 25 seconds, and the cooling time was set to 15 seconds.

The mold temperature and the cylinder temperature were set to the temperatures described in the production examples of the polyamide resin (A) mentioned later.

The obtained multipurpose test specimen (type A) was used in the tensile test at a rate of pulling of 5 mm/min according to ISO 527 to measure the initial tensile strength (MPa) and the initial tensile elongation (%).

(Heat Aging Resistance)

The multipurpose test specimen (type A) in the preceding paragraph (Initial tensile strength) was heat-aged by heating at 230° C. or 180° C. in a hot-air circulating oven.

After a predetermined time, the test specimen was taken out of the oven, cooled at 23° C. for 24 hours or longer, and then subjected to the tensile test in the same way as the aforementioned method at a rate of pulling of 5 ram/min according to ISO 527 to measure each tensile strength (MPa).

By this approach, the heating time in which the tensile strength was decreased by half (h: hour) was determined as "strength half-life in 230° C. aging" or "strength half-life in 180° C. aging".

(Retention of Tensile Strength After Water Absorption)

Pellets of the polyamide resin composition produced in each of Examples and Comparative Examples mentioned later were molded into a molded piece as a multipurpose test specimen (type A) according to ISO 3167 using an injection molding machine (PS-40E; manufactured by Nissei Plastic Industrial Co., Ltd.).

In this operation, the injection and pressure keeping time was set to 25 seconds, and the cooling time was set to 15 seconds.

The mold temperature and the cylinder temperature were set to the temperatures described in the production examples of the polyamide resin (A) mentioned later.

The multipurpose test specimen (type A) thus molded was completely dipped in distilled water and allowed to absorb water at 80° C. for 48 hours. Then, the test specimen was cooled at 23° C. for 24 hours or more, then taken out of distilled water, and subjected to the tensile test at a rate of pulling of 5 mm/min according to ISO 527 to measure the tensile strength (MPa). The tensile strength after water absorption was determined by this approach.

The retention of tensile strength after water absorption was calculated according to following formula:

Retention of tensile strength after water absorption= (Tensile strength after water absorption/Initial tensile strength)×100[%]

(120° C. Tensile Strength)

The multipurpose test specimen (type A) in the preceding paragraph (Initial tensile strength) was used in the tensile test at 120° C. at a rate of pulling of 5 mm/min according to ISO 527 to measure the 120° C. tensile strength (MPa).

(Notched Charpy Impact Strength)

The multipurpose test specimen (type A) in the preceding paragraph (Initial tensile strength) was cut to obtain a test specimen of 80 mm in length×10 mm in width×4 mm in thickness.

This test specimen was used to measure the notched Charpy impact strength ($kJ/m^2$) according to ISO 179.

(Extrudability)

Processing stability when an extruder was used in the production of the polyamide resin composition was evaluated.

Specifically, a smaller amplitude of resin temperatures, a smaller amplitude of torque values, and a more difficult-to-break extruded resin strand were evaluated in the order of results (◉>○).

A sample for which extrusion was impossible was indicated by "not extrudable".

(Copper Deposition)

The presence or absence of copper deposition when an extruder was used in the production of the polyamide resin composition was evaluated.

Specifically, the presence or absence of copper deposition on the parts of the extruder after use in the production was evaluated as ○ when the deposition was absent and as × when the deposition was present.

A sample for which extrusion was impossible was indicated by "not extrudable".

(Evaluation of Color After Molding (b Value After Molding))

The b value of the multipurpose test specimen (type A) in the preceding paragraph (Initial tensile strength) was measured by the reflection method using a colorimeter ZE-2000 manufactured by Nippon Denshoku Industries Co., Ltd.

(Evaluation of Color After Aging at 150° C. for 100 Hours (h) (b Value))

The multipurpose test specimen (type A) in the preceding paragraph (Initial tensile strength) was heat-aged under temperature conditions of 150° C. for 100 hours in a hot-air circulating oven.

Then, the test specimen was taken out of the hot-air circulating oven and cooled at 23° C. for 24 hours or longer. Then, the b value of the multipurpose test specimen (type A) corresponding to each example was measured by the reflection method using a colorimeter ZE-2000 manufactured by Nippon Denshoku Industries Co., Ltd.

(Δb Value)

The difference between the b value obtained in the preceding paragraph (Evaluation of color after aging at 150° C. for 100 hours and the b value obtained in the preceding paragraph (Evaluation of color after molding) was used as the Δb value.

(Measurement of Particle Size of Alkali Metal and/or Alkaline Earth Metal Compound (B), and Content (% by Mass) of Particle having Particle Size of 1 µm or More in Component (B))

10 g of the polyamide resin composition was dissolved in 10 mL of formic acid (manufactured by Wako Pure Chemical Industries, Ltd.).

This solution was used to measure the particle size of the alkali metal and/or the alkaline earth metal compound and the content of particles having a particle size of 1 µm or more in the component (B) using a laser diffraction particle size distribution measurement apparatus manufactured by Shimadzu Corp. (SALD-7000).

The optimum value for each metal compound was selected as a refractive index.

The refractive index was set to 1.60-1.00i for sodium carbonate.

The refractive index was set to 1.60-1.00i for sodium bicarbonate.

The particle size was determined by measuring the particle size distribution based on volume using software attached to the apparatus.

The content (% by mass) of particles having a particle size of 1 µm or more in the alkali metal and/or the alkaline earth metal compound (B) was calculated according to [Integrated value (%) of relative particle amounts of particles having a particle size of 1 µm or more×100/Integrated value (%) of relative particle amounts of the whole system].

(Calcium Chloride Resistance)

The multipurpose test specimen (type A) in the preceding paragraph (Initial tensile strength) was dipped in hot water of 80° C. for 60 minutes, then dipped in water of 23° C. for 15 minutes, and subsequently left at 23° C. in a 50% RH atmosphere for 30 minutes. This was used as a sample.

This sample was mounted with its center as a support on a stainless steel round bar having a diameter of 7 mm, and 500 g of lead was suspended from both ends of the sample.

Subsequently, gauze having a width of 3 cm was placed on this support portion and impregnated with 2 mL of a 30% aqueous calcium chloride solution. This sample was left for 2 hours in an oven kept at 100° C.

During this operation, the gauze was replenished with 2 mL of a 30% aqueous calcium chloride solution every 30 minutes.

Next, the loads were removed, and the sample was washed with water and then dried. The presence or absence of cracks was observed under a microscope and evaluated according to following criteria:

○: No cracks or two or less small cracks were found.

× 5 to 9 cracks were found.

(Measurement of Number-Average Molecular Weight (Mn) and Weight-Average Molecular Weight (Mw), and Calculation of Mw/Mn)

Mn and Mw were measured by GPC (gel permeation chromatography), and Mw/Mn was calculated.

The solvent used was hexafluoroisopropanol. A calibration curve was prepared with PMMA (polymethyl methacrylate) as standards to determine a value based on PMMA.

For the measurement of Mn and Mw after aging at 120° C. for 1000 hours, the multipurpose test specimen (type A) in the preceding paragraph (Initial tensile strength) was heat-aged by heating at 120° C. in a hot-air circulating oven. After 1000 hours, the test specimen was taken out of the oven, cooled at 23° C. for 24 hours or longer, and then subjected to the measurement by the aforementioned approach.

(Bleed Test)

The multipurpose test specimen (type A) was left standing for 72 hours in a high-temperature and humidity chamber set to a temperature of 70° C. and a humidity of 95%.

Then, the bleed was visually evaluated as ○ when the bleed was absent or negligible and as × when the bleed was conspicuous or heavy.

(Thermogravimetric Analysis (TGA) of Polyamide Resin Composition)

The thermogravimetric analysis (TGA) of the polyamide resin composition was conducted using TGA-50 manufactured by Shimadzu Corp.

The measurement conditions in Examples involved measuring the amount of decrease in mass when the polyamide resin composition was left at 300° C. for 1 hour in an inert gas atmosphere.

Specifically, the amount of decrease in mass (%) was calculated by dividing the difference between the mass before the polyamide resin composition was left and the mass after the polyamide resin composition was left under the aforementioned conditions, by the mass before the polyamide resin composition was left.

(Alkalinity Value of Alkali Metal Compound and/or Alkaline Earth Metal Compound)/Acid Value of Acid)

The alkalinity value of the alkali metal compound and/or the alkaline earth metal compound (B) (except for an aluminic acid metal salt, a halide of an alkali metal, and a halide of an alkaline earth metal) included in 100 parts by mass in total of the component (A) and the component (C3) was defined on the basis of JIS K0070.

Specifically, the alkalinity value was mg of potassium hydroxide necessary for neutralizing acetic acid bonded to a hydroxy group when 1 g of a sample was acetylated.

The acid value of the acid (C4) included in 100 parts by mass in total of the component (A) and the component (C3) was defined on the basis of JIS K0070.

Specifically, the acid value was mg of potassium hydroxide necessary for neutralizing free fatty acids, resin acids, and the like contained in 1 g of a sample.

The ratio between these values was calculated as ((alkalinity value of the alkali metal compound and/or the alkaline earth metal compound)/acid value of the acid).

((Alkalinity value of alkali metal compound and/or alkaline earth metal compound)/(acid value of acid+acid value of terminal carboxyl group of polyamide resin))

The acid value of the terminal carboxyl group of the polyamide resin was defined on the basis of JIS K0070. Specifically, the acid value was mg of potassium hydroxide necessary for neutralizing free fatty acids, resin acids, and the like contained in 1 g of a sample.

The acid value of the acid+acid value of the terminal carboxyl group was the sum of the acid value of the organic acid and the acid value of the terminal carboxyl group, the ratio between this sum and the alkalinity value of the alkali metal compound and/or the alkaline earth metal compound was defined as ((alkalinity value of the alkali metal compound and/or the alkaline earth metal compound)/(acid value of the acid+acid value of the terminal carboxyl group of the polyamide resin)).

(Presence or absence of structure with one or more branch points of molecule having molecular weight of 100,000 or more)

The presence or absence of a structure with one or more branch points of a molecule having a molecular weight of 100,000 or more was confirmed by assaying the polyamide resin composition under following conditions using following apparatus:

<Apparatus for GPC-MALS-VISCO Measurement>

Apparatus: gel permeation chromatograph-multi-angle laser light scattering photometer Configuration Pump: MODEL 1100 manufactured by Agilent Technologies, Inc Detector: differential refractometer Optilab rEX manufactured by Wyatt Technology Corp.

Multi-angle laser light scattering detector: DAWN HELEOS manufactured by Wyatt Technology Corp.

Viscosity detector: VISCOSTAR manufactured by Wyatt Technology Corp.

Column: Shodex HFIP-806M (two columns)

Column temperature: 40° C.

Solvent: hexafluoroisopropanol (HFIP; supplemented with 5 mM sodium trifluoroacetate)

Flow rate: 0.5 mL/min

Injection volume: 0.200 mL

Data processing: data processing system ASTRA manufactured by Wyatt Technology Corp.

<Method for Calculating the Number of Branch Points on Basis of Trifunctional Random Branching Theory>

From signal intensity DP ($\Delta P$) of a VISCO curve and inlet pressure P, specific viscosity $\eta_{spi}$ was calculated according to following formula (1):

$$\eta_{spi} = 4\Delta P/(P_i - 2\Delta P) \quad \text{Formula (1):}$$

Subsequently, intrinsic viscosity $[\eta]_i$ at each elution time was determined according to following formula (2):

$$[\eta]_i = (2(0.5)/C_i)(\eta_{spi} - L_n(\eta_{spi}+1))(0.5) \quad \text{Formula (2):}$$

($C_i$: concentration at elution time $t_i$)

Next, the number of branch points ($\lambda_M$) per molecule was calculated according to following formulae (3) and (4) based on the trifunctional random branching theory:

$$g = ((1 + \lambda_m/7)(1/2) + 4\lambda_M/9)(-1/2) \quad \text{Formula (3):}$$

$$g(3/2) = ([\eta] \text{ of the polyamide resin composition})/([\eta] \text{ of the polyamide resin } (A)) \quad \text{Formula (4):}$$

(Presence or Absence of Carboxylic Anhydride Functional Group of Molecule having Molecular Weight of 100,000 or More)

The molecule having a molecular weight of 100,000 or more was confirmed to contain or not contain a carboxylic anhydride functional group by a detection method mentioned later.

<Method for Detecting Carboxylic Anhydride Functional Group in Polyamide Resin Composition>

First, the molecule having a molecular weight of 100,000 or more was separated using a gel permeation chromatograph apparatus (solvent: hexafluoroisopropanol (HFIP)).

Next, the fraction was dried in a rotary evaporator. Then, a maleic anhydride functional group was confirmed by use of $^1$H-NMR or IR.

(Phosphorus Element-Based Concentration of Sodium Hypophosphite)

Specifically, the phosphorus element concentration of a reducing phosphorus compound based on the polyamide resin (A) could be measured by a method according to the procedures described below in (1) and (2). Since sodium hypophosphite was a compound containing one phosphorus element, the molar phosphorus element concentration of the sodium hypophosphite could be equated with the molar phosphorus element concentration of the reducing phosphorus compound.

<(1) Phosphorus Element Concentration>

The sample (polyamide resin composition) was weighed such that the content of the polyamide resin (A) was 0.5 g. 20 mL of concentrated sulfuric acid was added to the sample, followed by wet digestion on a heater.

After cooling, 5 mL of hydrogen peroxide was added thereto, and the mixture was heated on a heater and concentrated into a whole amount of 2 to 3 mL.

The mixture was cooled again and adjusted to 500 mL with pure water.

The apparatus used was IRIS/IP manufactured by Thermo Jarrell Ash Corp. The phosphorus element concentration was determined by inductively coupled plasma (ICP) atomic emission spectroscopy at a wavelength of 213.618 (Nm).

The phosphorus element concentration was indicated by phosphorus element concentration CP (mol) based on $10^6$ g of the polyamide resin using this determined value.

<(2) Concentration of Reducing Phosphorus Compound (Hypophosphite Ion, Phosphite Ion, and Phosphate Ion)>

The sample (polyamide resin composition) was weighed such that the content of the polyamide resin (A) was 50 g. 100 mL of water was added thereto, and the mixture was ultrasonicated at room temperature for 15 minutes and then filtered to obtain a filtrate. Then, the concentration (mol) ratios of hypophosphite ions, phosphite ions, and phosphate ions were measured using a capillary electrophoresis apparatus (HP3D) manufactured by Hewlett-Packard Company.

The concentration ratios were calculated by hypophosphite ion standard solutions, phosphite ion standard solutions, and phosphate ion standard solutions having known concentrations in the same way as above and preparing calibration curves.

The phosphorus element concentration X of the reducing phosphorus compound was determined in terms of a phosphorus element concentration (mol) based on $10^6$ g of the polyamide resin(A) contained in the polyamide resin composition according to following formula:

Concentration $X$ based on the phosphorus element of the reducing phosphorus compound$=CP \times (CP1+CP2)/(CP1+CP2+CP3)$ CP: phosphorus element concentration (mol) based on $10^6$ g of the polyamide resin (A) contained in the polyamide resin composition, determined in (1)

CP1: concentration (mol) ratio of hypophosphite ions determined in (2)

CP2: concentration (mol) ratio of phosphite ions determined in (2)

CP3: concentration (mol) ratio of phosphate ions determined in (2)

Tables 15 and 19 below show the molar phosphorus element concentration [mmol/kg] based on $10^6$ g of the polyamide resin (A) contained in the polyamide resin composition produced in each of Examples mentioned later.

Since sodium hypophosphite was a compound containing one phosphorus element, the molar phosphorus element concentration of the sodium hypophosphite could be equated with the molar phosphorus element concentration of the reducing phosphorus compound.

[Starting Material]

Following starting materials were used in Examples and Comparative Examples.

((A) Polyamide Resin)

<Polyamide Resin A-I (PA66)>

30 kg of an aqueous solution of equimolar salts of 50% by mass of hexamethylenediamine and adipic acid was prepared and sufficiently stirred.

The aqueous solution of the starting materials for polyamide 66 (hereinafter, also simply referred to as an aqueous solution of the starting materials) was charged into a 70 L autoclave having a stirring apparatus and a discharge nozzle in a lower area.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of <polyamide resin A-I> was 2.8.

The terminal amino group concentration was 46 μmol/g, and the terminal carboxyl group concentration was 72 μmol/g.

Specifically, terminal amino group concentration/terminal carboxyl group concentration was 0.64.

The melting point was 264° C., and the Vicat softening point was 238° C.

The mold temperature and the cylinder temperature were set to 80° C. and 290° C., respectively, for molding the polyamide resin composition using <polyamide resin A-I>.

<Polyamide Resin A-II (PA66)>

Additional 900 g of adipic acid was added to the aqueous solution of the starting materials.

Other conditions were set in the same way as in the method for producing <polyamide resin A-I> to produce <polyamide resin A-II>.

The relative viscosity in 98% sulfuric acid of <polyamide resin A-II> was 2.2.

The terminal amino group concentration was 33 μmol/g, and the terminal carboxyl group concentration was 107 μmol/g.

Specifically, terminal amino group concentration/terminal carboxyl group concentration was 0.3.

The melting point was 264° C., and the Vicat softening point was 238° C.

The mold temperature and the cylinder temperature were set to 80° C. and 290° C., respectively, for molding the polyamide resin composition using <polyamide resin A-II>.

<Polyamide Resin A-III (PA66)>

Additional 900 g of hexamethylenediamine was added to the aqueous solution of the starting materials.

Other conditions were set in the same way as in the method for producing <polyamide resin A-I> to produce <polyamide resin A-III>.

The relative viscosity in 98% sulfuric acid of <polyamide resin A-III> was 2.4.

The terminal amino group concentration was 78 µmol/g, and the terminal carboxyl group concentration was 52 µmol/g. Specifically, terminal amino group concentration/terminal carboxyl group concentration was 1.5.

The melting point was 264° C., and the Vicat softening point was 238° C.

The mold temperature and the cylinder temperature were set to 80° C. and 290° C., respectively, for molding the polyamide resin composition using <polyamide resin A-III>.

<Polyamide Resin A-IV (PA66/6T)>

<Polyamide resin A-IV (PA66/6T)> was produced according to the production example of National Publication of International Patent Application No. 2013-501094.

The relative viscosity in 98% sulfuric acid of <polyamide resin A-IV> was 2.9.

The terminal amino group concentration was 42 µmol/g, and the terminal carboxyl group concentration was 65 µmol/g. Specifically, terminal amino group concentration/terminal carboxyl group concentration was 0.6.

The mold temperature and the cylinder temperature were set to 80° C. and 290° C., respectively, for molding the polyamide resin composition using <polyamide resin A-IV>.

<Polyamide Resin A-V (PA9T)>

<Polyamide resin A-V (PA9T)> was produced according to the production example of National Publication of International Patent Application No. 2013-40346.

The relative viscosity in 98% sulfuric acid of <polyamide resin A-V> was 2.9, and the melting point was 304° C.

The terminal amino group concentration was 42 µmol/g, and the terminal carboxyl group concentration was 52 µmol/g. Specifically, terminal amino group concentration/terminal carboxyl group concentration was 0.8.

The mold temperature and the cylinder temperature were set to 120° C. and 330° C., respectively, for molding the polyamide resin composition using <polyamide resin A-V>.

<Polyamide Resin A-VI (PA46)>

Trade name: Stanyl® KS200 (manufactured by DSM N.V., melting point: 290° C.) was used as polyamide 46 (hereinafter, abbreviated to "PA46").

The mold temperature and the cylinder temperature were set to 120° C. and 300° C., respectively, for molding the polyamide resin composition using <polyamide resin A-VI>.

<Polyamide Resin A-VII (PAMXD6)>

Polyamide MXD6 resin (Reny 6002; manufactured by Mitsubishi Gas Chemical Co., Inc.) was used.

((B) Alkali Metal Compound and/or Alkaline Earth Metal Compound (Except for Aluminic Acid Metal Salt, Halide of Alkali Metal, and Halide of Alkaline Earth Metal)

<B-I Sodium Carbonate>

Sodium carbonate manufactured by Tokyo Chemical Industry Co., Ltd. was used.

<B-II Sodium Bicarbonate>

Sodium bicarbonate manufactured by Tokyo Chemical Industry Co., Ltd. was used.

<B-III Potassium Carbonate>

Potassium carbonate manufactured by Tokyo Chemical Industry Co., Ltd. was used.

<B-IV Sodium Hydroxide>

Sodium hydroxide manufactured by Tokyo Chemical Industry Co., Ltd. was used.

(Component (C1))

<C1-I: Copper Iodide>

A reagent manufactured by Wako Pure Chemical Industries, Ltd. was used.

<C1-II: Copper Acetate>

A reagent manufactured by Wako Pure Chemical Industries, Ltd. was used.

(Component (C1-2))

<C1-2-I: Potassium Iodide>

A reagent manufactured by Wako Pure Chemical Industries, Ltd. was used.

<C1-2-II: Potassium Bromide>

A reagent manufactured by Wako Pure Chemical Industries, Ltd. was used.

(Component (C2))

<C2-I: Hindered Phenol Compound>

IRGANOX 1098 manufactured by BASF Japan Ltd. was used.

<C2-II: Hindered Amine Compound>

NYLOSTAB S-EED manufactured by Clariant (Japan) K.K. was used.

<C2-III: Organic Phosphorus Compound>

IRGAFOS 168 manufactured by BASF Japan Ltd. was used.

((C3) Crystalline Thermoplastic Resin having Lower Melting Point than that of Polyamide Resin (A) and/or Amorphous Thermoplastic Resin having Lower Vicat Softening Point than that of Polyamide Resin (A))

<Thermoplastic Resin C3-I (PA66)>

The same as <polyamide resin A-I (PA66)> mentioned above was used.

The melting point was 264° C., and the Vicat softening point was 238° C.

<Thermoplastic Resin C3-II (PA6)>

SF1013A manufactured by Ube Industries, Ltd. was used. The melting point was 224° C.

<Thermoplastic Resin C3-III (PA610)>

<Thermoplastic resin C3-III (PA610)> was produced according to the production example of Japanese Patent Laid-Open No. 2011-148997.

The relative viscosity in 98% sulfuric acid of <thermoplastic resin C3-III> was 2.3, and the melting point was 215° C.

The terminal amino group concentration was 58 µmol/g, and the terminal carboxyl group concentration was 79 µmol/g. Specifically, terminal amino group concentration/terminal carboxyl group concentration was 0.7.

<Thermoplastic Resin C3-IV (PBT)>

"Toraycon" 1401 X06 manufactured by Toray Industries, Inc. was used. The melting point was 224° C.

<Thermoplastic Resin C3-V (PC)>

"Panlite" L-1225Y manufactured by Teijin Ltd. was used. The Vicat softening point was 148° C.

(Component (C4))

<C4-I>

Citric acid manufactured by Tokyo Chemical Industry Co., Ltd. was used.

The temperature that decreased the mass by 5% was 191° C. in measurement using a thermogravimetric analysis (TGA) apparatus in an inert gas atmosphere.

<C4-II>

Ethylenediaminetetraacetic acid manufactured by Tokyo Chemical Industry Co., Ltd. was used.

<C4-III>

Adipic acid manufactured by Tokyo Chemical Industry Co., Ltd. was used.

<C4-IV>

Dipentaerythritol manufactured by Alfa Aesar was used.

<C4-V>

Isophthalic acid manufactured by Tokyo Chemical Industry Co., Ltd. was used.

The temperature that decreased the mass by 5% was 281° C. in measurement using a thermogravimetric analysis (TGA) apparatus in an inert gas atmosphere.

<C4-VI>

Terephthalic acid manufactured by Tokyo Chemical Industry Co., Ltd. was used.

The temperature that decreased the mass by 5% was 293° C. in measurement using a thermogravimetric analysis (TGA) apparatus in an inert gas atmosphere.

<C4-VII>

Acetic acid manufactured by Tokyo Chemical Industry Co., Ltd. was used.

<C4-VIII>

1,3,5-Benzenetrycarboxylic acid manufactured by Tokyo Chemical Industry Co., Ltd. was used.

<C4-IX>

Benzoic acid manufactured by Tokyo Chemical Industry Co., Ltd. was used.

<C4-X>

Sebacic acid manufactured by Tokyo Chemical Industry Co., Ltd. was used.

The temperature that decreased the mass by 5% was 227° C. in measurement using a thermogravimetric analysis (TGA) apparatus in an inert gas atmosphere.

<C4-XI>

An ethylene-maleic anhydride copolymer having a weight-average molecular weight of 60,000, Tg of 150° C., and an acid value of 0.28 was used.

<C4-XII>

An ethylene-maleic anhydride copolymer having a weight-average molecular weight of 400,000, Tg of 150° C., and an acid value of 0.28 was used.

<C4-XIII>

A styrene-maleic anhydride copolymer having a weight-average molecular weight of 60,000, Tg of 250° C., and an acid value of 0.1 was used.

<C4-XIV>

Maleic anhydride-grafted polypropylene having a weight-average molecular weight of 100,000, Tg of 100° C., and an acid value of 0.01 was used.

<C4-XV>

Trimellitic acid manufactured by Tokyo Chemical Industry Co., Ltd. was used. The water solubility was 2.1 g/100 mL.

<C4-XVI>

Sodium dihydrogen phosphate manufactured by Wako Pure Chemical Industries, Ltd. was used. The water solubility was 7.7 g/100 mL.

<C4-XVII>

Potassium dihydrogen phosphate manufactured by Wako Pure Chemical Industries, Ltd. was used. The water solubility was 5.5 g/100 mL.

<C4-XVIII>

Boric acid manufactured by Tokyo Chemical Industry Co., Ltd. was used. The water solubility was 5.7 g/100 mL.

<C4-XIX>

Polyacrylic acid (Mn: 5,000) manufactured by Alfa Aesar was used. The water solubility was 3.7 g/100 mL.

<C4-XX>

Sodium acetate manufactured by Tokyo Chemical Industry Co., Ltd. was used.

((D) Inorganic Filler Except for Alkali Metal Compound and/or Alkaline Earth Metal Compound)

<Glass Fibers D-I>

The total mass was adjusted to 100% by mass by dilution with water such that, based on solid fractions, a polyurethane resin was 2% by mass (trade name: Bondic® 1050, manufactured by DIC Corp.)), an ethylene-maleic anhydride copolymer (manufactured by Wako Pure Chemical Industries, Ltd.) was 8% by mass, γ-aminopropyltriethoxysilane was 0.6% by mass (trade name: KBE-903, (manufactured by Shin-Etsu Chemical Co., Ltd.)), and a lubricant was 0.1% by mass (trade name: Carnauba wax (manufactured by S. Kato & Co.)) to obtain a glass fiber sizing agent.

The glass fiber sizing agent was attached to melt-spun glass fibers having a number-average fiber diameter of 10 μm.

Specifically, the glass fiber sizing agent was applied to the glass fibers on their way to be taken up on a rotating drum using an applicator located at a predetermined position. Subsequently, this was dried to obtain a roving of a glass fiber bundle surface-treated with the glass fiber sizing agent (glass roving). The bundle involved 1,000 glass fibers.

The amount of the glass fiber sizing agent attached was 0.6% by mass. This roving was cut into a length of 3 mm to obtain a chopped glass strand. This chopped strand was used as <glass fibers D-I>.

<Glass fibers D-II>

No ethylene-maleic anhydride copolymer was used. Other conditions were set in the same way as in the glass fibers (D-I). The prepared glass fibers were used as glass fibers (D-II).

(Reducing Phosphorus Compound)

Hypophosphorous acid manufactured by Taihei Chemical Industrial Co., Ltd. was used.

(Additional Component)

<Sodium Aluminate>

Sodium aluminate manufactured by Wako Pure Chemical Industries, Ltd. was used.

Example 1

The extruder used was a twin-screw extruder (ZSK-26MC; manufactured by Coperion GmbH (Germany)).

This twin-screw extruder had an upstream feed port in the first barrel on the upstream side and had a downstream feed port in the 9th barrel. Its L/D (Length of the cylinder of the extruder/Diameter of the cylinder of the extruder) was 48 (the number of barrels: 12).

In this twin-screw extruder, the temperature from the upstream feed port to the die was set to the cylinder temperature described in each item of ((A) Polyamide resin) described above.

The number of screw revolutions was set to 300 rpm, and the discharge rate was set to 25 kg/hr.

Under these conditions, the component (A), the component (B), and the component (C) were supplied from the upstream feed port, while the component (D) was supplied from the downstream feed port so as to attain the ratios described in the upper boxes of Table 1 below. The mixture was melt-kneaded to produce pellets of a polyamide resin composition.

The obtained polyamide resin composition was molded, and the molded piece was used to evaluate heat aging resistance, initial tensile strength, and notched Charpy impact strength.

These evaluation results, etc., are shown in Table 1 below.

Examples 2 to 35 and 39 to 87 and Comparative Examples 1 to 16

According to the composition described in Tables 1 to 10, other conditions were set in the same way as in Example 1 to produce each polyamide resin composition, which was then molded. The molded piece was used to carry out various measurements.

These measurement results, etc., are shown in Tables 1 to 10 below.

Example 36

The number of screw revolutions was set to 150 rpm.

Other conditions were set in the same way as in Example 1 to produce a polyamide resin composition, which was then molded. The molded piece was used to measure heat aging resistance, initial tensile elongation, b value after molding, b value after aging at 150° C. for 100 hours, notched Charpy impact strength, and the content of alkali metal compound and/or alkaline earth metal compound particles having a particle size of 1 μm or more in the alkali metal compound and/or the alkaline earth metal compound. These measurement results are shown in Table 5 below.

Example 37

30 kg of an aqueous solution of equimolar salts of 50% by mass of hexamethylenediamine and adipic acid was prepared and sufficiently stirred.

The aqueous solution of the starting materials for polyamide 66 was charged into a 70 L autoclave having a stirring apparatus and a discharge nozzle in a lower area.

Subsequently, sodium aluminate was added at 0.5 parts by mass based on 100 parts by mass of the polyamide resin.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of the resin was 2.8. The terminal amino group concentration was 46 μmol/g, and the terminal carboxyl group concentration was 72 μmol/g.

Specifically, terminal amino group concentration/terminal carboxyl group concentration was 0.64.

100 parts by mass of the polyamide resin, 0.5 parts by mass of the sodium carbonate (B-I), and 2 parts by mass of the IRGNOX 1098 (C2-I) were supplied from the upstream feed port, while 50 parts by mass of the glass fibers (D-I) were supplied from the downstream feed port. The mixture was melt-kneaded to produce pellets of a polyamide resin composition.

The obtained polyamide resin composition was molded, and its molded piece was used to measure heat aging resistance, initial tensile elongation, notched Charpy impact strength, and the content of alkali metal compound and/or alkaline earth metal compound particles having a particle size of 1 μm or more in the alkali metal compound and/or the alkaline earth metal compound.

These measurement results are shown in Table 5 below.

Example 38

30 kg of an aqueous solution of equimolar salts of 50% by mass of hexamethylenediamine and adipic acid was prepared and sufficiently stirred.

The aqueous solution of the starting materials for polyamide 66 was charged into a 70 L autoclave having a stirring apparatus and a discharge nozzle in a lower area.

Subsequently, sodium carbonate was added at 1 part by mass based on 100 parts by mass of the polyamide resin.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The temperature was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of the resin was 2.8. The terminal amino group concentration was 46 μmol/g, and the terminal carboxyl group concentration was 72 μmol/g. Specifically, terminal amino group concentration/terminal carboxyl group concentration was 0.64.

100 parts by mass of the polyamide resin and 2 parts by mass of the IRGNOX 1098 (C2-I) were supplied from the upstream feed port, while 50 parts by mass of the glass fibers (D-I) were supplied from the downstream feed port. The mixture was melt-kneaded to produce pellets of a polyamide resin composition.

The obtained polyamide resin composition was molded, and its molded piece was used to measure heat aging resistance, initial tensile elongation, notched Charpy impact strength, and the content of alkali metal compound and/or alkaline earth metal compound particles having a particle size of 1 μm or more in the alkali metal compound and/or the alkaline earth metal compound.

These measurement results are shown in Table 5 below.

Example 101

The extruder used was a twin-screw extruder (ZSK-26MC; manufactured by Coperion GmbH (Germany)).

This twin-screw extruder had an upstream feed port in the first barrel on the upstream side and had a downstream feed port in the 9th barrel. Its L/D (Length of the cylinder of the extruder/Diameter of the cylinder of the extruder) was 48 (the number of barrels: 12).

In this twin-screw extruder, the temperature from the upstream feed port to the die was set to the cylinder temperature described in each item of ((A) Polyamide resin) described above.

The number of screw revolutions was set to 300 rpm, and the discharge rate was set to 25 kg/hr.

Under these conditions, the component (A), the component (B), and the component (C) were supplied from the upstream feed port, while the component (D) was supplied from the downstream feed port so as to attain the ratios described in the upper boxes of Table 11 below. The mixture was melt-kneaded to produce pellets of a polyamide resin composition.

The obtained polyamide resin composition was molded, and the molded piece was used to carry out various evaluations.

These evaluation results, etc., are shown in Table 11 below.

Examples 99, 100, and 102 to 145 and Comparative Examples 103 to 106

According to the composition described in Tables 11 to 19, other conditions were set in the same way as in Example 101 to produce each polyamide resin composition, which was then molded. The molded piece was used to carry out various measurements.

Hypophosphorous acid was supplied from the upstream feed port.

These measurement results, etc., are shown in Tables 11 to 19 below.

Example 146

The component (B) and the component (C) were added in the form of a master batch. A specific approach will be described below.

The extruder used was a twin-screw extruder (ZSK-26MC; manufactured by Coperion GmbH (Germany)).

This twin-screw extruder had an upstream feed port in the first barrel on the upstream side and had a downstream feed port in the 9th barrel. Its L/D (Length of the cylinder of the extruder/Diameter of the cylinder of the extruder) was 48 (the number of barrels: 12).

In this twin-screw extruder, the temperature from the upstream feed port to the die was set to the cylinder temperature described in each item of ((A-I) Polyamide resin) described above.

The number of screw revolutions was set to 300 rpm, and the discharge rate was set to 25 kg/hr.

Under these conditions, 100 parts by mass of the polyamide 66 (A-I), 5 parts by mass of the sodium carbonate (B-I), and 5 parts by mass of the isophthalic acid (C4-V) were supplied from the upstream feed port. The mixture was melt-kneaded to produce pellets of a polyamide resin composition in the form of a master batch (MB).

According to the composition described in Table 20, the obtained mater batch was melt-kneaded with the polyamide 66 (A-I) and the glass fibers (D-I) in the same way as in Example 101 to produce a polyamide resin composition. Then, the polyamide resin composition was molded, and the molded piece was used to carry out various evaluations.

The measurement results, etc., are shown in Table 20 below.

Examples 147 and 148

The component (B) and the component (C) were added in the form of a master batch in the same way as in Example 146, and according to the composition described in Table 20, pellets of a polyamide resin composition were produced. Then, the polyamide resin composition was molded, and the molded piece was used to carry out various evaluations.

These measurement results are shown in Table 20 below.

Example 149

30 kg of an aqueous solution of equimolar salts of 50% by mass of hexamethylenediamine and adipic acid was prepared and sufficiently stirred.

The aqueous solution of the starting materials for polyamide 66 was charged into a 70 L autoclave having a stirring apparatus and a discharge nozzle in a lower area.

Subsequently, according to the composition described in Table 20, the component (B) and the component (C) were added thereto (specifically, 1.0 part by mass of the sodium aluminate (B-I) was added based on 100 parts by mass of the polyamide resin, and 1.0 part by mass of the isophthalic acid (C4-V) was added based on 100 parts by mass of the polyamide resin).

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of the resin was 2.8. The terminal amino group concentration was 46 µmol/g, and the terminal carboxyl group concentration was 72 µmol/g. Specifically, terminal amino group concentration/terminal carboxyl group concentration was 0.64.

The polyamide resin was supplied from the upstream feed port, while 50 parts by mass of the glass fibers (D-I) based on the component (A) were supplied from the downstream feed port. The mixture was melt-kneaded to produce pellets of a polyamide resin composition.

The obtained polyamide resin composition was molded, and its molded piece was used to carry out various evaluations.

The measurement results are shown in Table 20 below.

Examples 150 and 151

The component (B) and the component (C) were added in the same way as in Example 149, and according to the composition described in Table 20, pellets of a polyamide resin composition were produced. Then, the polyamide resin composition was molded, and the molded piece was used to carry out various evaluations.

These measurement results are shown in Table 20 below.

Example 152

30 kg of an aqueous solution of equimolar salts of 50% by mass of hexamethylenediamine and adipic acid was prepared and sufficiently stirred.

The aqueous solution of the starting materials for polyamide 66 was charged into a 70 L autoclave having a stirring apparatus and a discharge nozzle in a lower area.

Subsequently, according to the composition described in Table 20, the component (B) was added thereto.

Specifically, the sodium aluminate (B-I) was added at 1.0 part by mass based on 100 parts by mass of the polyamide resin.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The temperature was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of the resin was 2.8. The terminal amino group concentration was 46 µmol/g, and the terminal carboxyl group concentration was 72 µmol/g. Specifically, terminal amino group concentration/terminal carboxyl group concentration was 0.64.

The polyamide resin and 1 part by mass of the isophthalic acid (C4-V) based on the component (A) were supplied from the upstream feed port, while 50 parts by mass of the glass fibers (D-I) based on the component (A) were supplied from the downstream feed port. The mixture was melt-kneaded to produce pellets of a polyamide resin composition.

The obtained polyamide resin composition was molded, and its molded piece was used to carry out various evaluations.

The measurement results are shown in Table 20 below.

Examples 153 and 154

The component (B) and the component (C) were added in the same way as in Example 152, and according to the composition described in Table 20, pellets of a polyamide resin composition were produced. Then, the polyamide resin composition was molded, and the molded piece was used to carry out various evaluations.

These measurement results are shown in Table 20 below.

Example 155

30 kg of an aqueous solution of equimolar salts of 50% by mass of hexamethylenediamine and adipic acid was prepared and sufficiently stirred.

The aqueous solution of the starting materials for polyamide 66 was charged into a 70 L autoclave having a stirring apparatus and a discharge nozzle in a lower area.

Subsequently, according to the composition described in Table 20, the component (C) was added thereto. Specifically, the isophthalic acid (C4-V) was added at 1.0 part by mass based on 100 parts by mass of the polyamide resin.

Then, the aqueous solution was sufficiently stirred at a temperature of 50° C.

Subsequently, the atmosphere was replaced with nitrogen, and the temperature was then increased from 50° C. to approximately 270° C. with stirring. This heating was continued for approximately 1 hour while water was removed from the system such that the pressure in the autoclave was kept at approximately 1.77 MPa.

Then, the pressure was decreased to atmospheric pressure over approximately 1 hour. The reaction product was further kept at approximately 270° C. at atmospheric pressure for approximately 1 hour. Then, the stirring was stopped.

The polymer was discharged in a strand form from the lower nozzle and subjected to water cooling and cutting to obtain pellets.

The relative viscosity in 98% sulfuric acid of the resin was 2.8. The terminal amino group concentration was 46 µmol/g, and the terminal carboxyl group concentration was 72 µmol/g. Specifically, terminal amino group concentration/terminal carboxyl group concentration was 0.64.

The polyamide resin and 1.0 part by mass of the sodium aluminate (B-I) based on the component (A) were supplied from the upstream feed port, while 50 parts by mass of the glass fibers (D-I) based on the component (A) were supplied from the downstream feed port. The mixture was melt-kneaded to produce pellets of a polyamide resin composition.

The obtained polyamide resin composition was molded, and its molded piece was used to carry out various evaluations.

The measurement results are shown in Table 20 below.

Examples 156 and 157

The component (B) and the component (C) were added in the same way as in Example 155, and according to the composition described in Table 20, pellets of a polyamide resin composition were produced. Then, the polyamide resin composition was molded, and the molded piece was used to carry out various evaluations.

These measurement results are shown in Table 20 below.

Examples 158 to 182 and 184 and Comparative Example 107

According to the composition described in Tables 21 to 26, other conditions were set in the same way as in Example 146 to produce each polyamide resin composition, which was then molded. The molded piece was used to carry out various measurements.

These measurement results, etc., are shown in Tables 21 to 26 below.

Example 183

According to the composition described in Table 26, other conditions were set in the same way as in Example 101 to produce a polyamide resin composition, which was then molded. The molded piece was used to carry out various measurements.

The measurement results, etc., are shown in Table 26 below.

Examples 185 to 192

According to the composition described in Tables 27 and 28, other conditions were set in the same way as in Example 146 to produce each polyamide resin composition, which was then molded. The molded piece was used to carry out various measurements.

These measurement results, etc., are shown in Tables 27 and 28 below.

Examples 193 and 194 and Comparative Example 108

According to the composition described in Table 29, other conditions were set in the same way as in Example 146 to produce a polyamide resin composition, which was then molded. The molded piece was used to carry out various measurements.

Sodium aluminate was added in the same way as in the component (B).

These measurement results, etc., are shown in Table 29 below.

TABLE 1

|  |  | Example 1 | Example 2 | Example 3 | Example 4 | Example 5 | Example 6 | Example 7 | Example 8 | Comparative Example 1 | Comparative Example 2 |
|---|---|---|---|---|---|---|---|---|---|---|---|
| A-I | [part by mass] | 100 | 100 | 100 | 100 | 100 | 100 | 100 | 100 | 100 | 100 |
| B-I | [part by mass] | 0.06 | 0.3 | 0.6 | 0.9 | 0.9 | 0.9 | 1.2 | 1.5 | 0 | 0.015 |
| C1-I | [part by mass] | 0.03 | 0.03 | 0.03 | 0.03 | 0.03 | 0.03 | 0.03 | 0.03 | 0.03 | 0.03 |
| C1-2-I | [part by mass] | 1 | 1 | 1 | 1 | — | 1 | 1 | 1 | 1 | 1 |
| C1-2-II | [part by mass] | — | — | — | — | 1 | — | — | — | — | — |
| D-I | [part by mass] | 50 | 50 | 50 | 50 | 50 | — | 50 | 50 | 50 | 50 |
| D-II | [part by mass] | — | — | — | — | — | 50 | — | — | — | — |
| Heat aging resistance (strength half-life at 230° C.) | [h] | 800 | 1000 | 1400 | 1600 | 1500 | 1200 | 1700 | 1700 | 200 | 400 |
| Heat aging resistance (strength half-life at 180° C.) | [h] | 1700 | 1900 | 2100 | 2200 | 2200 | — | 2300 | 2400 | 1100 | 1400 |
| Initial tensile strength | [MPa] | 200 | 200 | 200 | 200 | 200 | — | 195 | 190 | 200 | 200 |
| Notched Charpy impact strength | [kJ/m$^2$] | — | — | — | 12 | 10 | — | — | — | — | — |

TABLE 2

|  |  | Example 9 | Example 10 | Example 11 | Example 12 | Example 13 | Example 14 | Example 15 | Comparative Example 3 | Comparative Example 4 | Example 16 | Example 17 |
|---|---|---|---|---|---|---|---|---|---|---|---|---|
| A-I | [part by mass] | 100 | 100 | 100 | 100 | 100 | 100 | 100 | 100 | 100 | 100 | 100 |
| B-I | [part by mass] | 0.06 | 0.3 | 0.6 | 0.9 | 0.9 | 1.2 | 1.5 | 0 | 0.015 | 0.9 | 0.9 |
| C1-I | [part by mass] | 0.03 | 0.03 | 0.03 | 0.03 | — | 0.03 | 0.03 | 0.03 | 0.03 | 0.03 | 0.03 |
| C1-II | [part by mass] | — | — | — | — | 0.03 | — | — | — | — | — | — |
| C1-2-I | [part by mass] | 0.3 | 0.3 | 0.3 | 0.3 | 0.3 | 0.3 | 0.3 | 0.3 | 0.3 | 0.3 | 0.3 |
| D-I | [part by mass] | 50 | 50 | 50 | 50 | 50 | 50 | 50 | 50 | 50 | 100 | 33 |
| Heat aging resistance (strength half-life at 230° C.) | [h] | 800 | 1050 | 1500 | 1700 | 1600 | 1800 | 1900 | 200 | 400 | 1800 | 1650 |
| Heat aging resistance (strength half-life at 180° C.) | [h] | 1800 | 2000 | 2200 | 2400 | 2400 | 2500 | 2600 | 1200 | 1450 | 2450 | 2300 |
| Initial tensile strength | [MPa] | 200 | 200 | 200 | 200 | 200 | 195 | 190 | 200 | 200 | 250 | 185 |

TABLE 3

|  |  | Example 18 | Example 19 | Example 20 | Comparative Example 5 | Comparative Example 6 |
|---|---|---|---|---|---|---|
| A-I | [part by mass] | 100 | 100 | 100 | 100 | 100 |
| B-I | [part by mass] | 3 | 6 | 10 | 50 | 1 |
| C1-I | [part by mass] | 0.03 | 0.03 | 0.03 | 0.03 | 0 |
| C1-2-I | [part by mass] | 0.3 | 0.3 | 0.3 | 0.3 | 0 |
| D-I | [part by mass] | 50 | 50 | 50 | 50 | 50 |
| Heat aging resistance (strength half-life at 230° C.) | [h] | 2400 | ≥3000 | 2800 | not extrudable | 1200 |
| Heat aging resistance (strength half-life at 180° C.) | [h] | 2400 | ≥3000 | ≥3000 | not extrudable | 800 |
| Extrudability |  | ⊚ | ○ | ○ | not extrudable | ○ |

TABLE 3-continued

| Copper deposition | ○ | ○ | ○ | not extrudable | ○ |
| --- | --- | --- | --- | --- | --- |

|  | Example 21 | Example 22 | Example 23 | Comparative Example 7 | Example 24 | Comparative Example 8 |
| --- | --- | --- | --- | --- | --- | --- |
| A-I | 100 | 100 | 100 | 100 | 100 | 100 |
| B-I | 1 | 1 | 1 | 1 | 0.06 | 0.017 |
| C1-I | 0.003 | 0.009 | 0.09 | 0.3 | 0.0057 | 0.0057 |
| C1-2-I | 0.03 | 0.3 | 0.9 | 3 | 0.057 | 0.057 |
| D-I | 50 | 50 | 50 | 50 | 50 | 50 |
| Heat aging resistance (strength half-life at 230° C.) | 1400 | 1700 | 1900 | 1000 | 800 | 500 |
| Heat aging resistance (strength half-life at 180° C.) | 1600 | 2000 | 2400 | 800 | 1600 | 1500 |
| Extrudability | ○ | ○ | ○ | ○ | ○ | ○ |
| Copper deposition | ○ | ○ | ○ | X | ○ | ○ |

TABLE 4

|  |  | Example 4 | Example 25 | Example 26 | Example 27 | Example 28 |
| --- | --- | --- | --- | --- | --- | --- |
| A-I |  | 100 | — | — | — | — |
| A-II | [part by mass] | — | 100 | — | — | — |
| A-III | [part by mass] | — | — | 100 | — | — |
| A-IV | [part by mass] | — | — | — | 100 | — |
| A-V | [part by mass] | — | — | — | — | 100 |
| B-I | [part by mass] | 0.9 | 0.9 | 0.9 | 0.9 | 0.9 |
| C1-I | [part by mass] | 0.03 | 0.03 | 0.03 | 0.03 | 0.03 |
| C1-2-I | [part by mass] | 1 | 1 | 1 | 1 | 1 |
| D-I | [part by mass] | 50 | 50 | 50 | 50 | 50 |
| Heat aging resistance (strength half-life at 230° C.) | [h] | 1600 | 1600 | 1600 | 1300 | 1500 |

TABLE 5

|  |  | Example 29 | Example 30 | Example 31 | Example 32 | Example 33 | Example 34 | Example 35 | Example 36 | Example 37 |
| --- | --- | --- | --- | --- | --- | --- | --- | --- | --- | --- |
| A-I | [part by mass] | 100 | 100 | 100 | 100 | 100 | 100 | 100 | 100 | 100 |
| B-I | [part by mass] | 0.05 | 0.2 | 0.4 | 0.6 | 1 | 1 | 1 | 1 | 1 |
| C2-I | [part by mass] | 2 | 2 | 2 | 2 | 0.8 | 1.2 | 2 | 2 | 2 |
| C2-II | [part by mass] | — | — | — | — | — | — | — | — | — |
| C2-III | [part by mass] | — | — | — | — | — | — | — | — | — |
| D-I | [part by mass] | 50 | 50 | 50 | 50 | 50 | 50 | 50 | 50 | 50 |
| D-II | [part by mass] | — | — | — | — | — | — | — | — | — |
| Heat aging resistance (strength half-life at 230° C.) | [h] | 900 | 1100 | 1100 | 1200 | 1300 | 1300 | 1300 | 1200 | 1100 |
| Heat aging resistance (strength half-life at 180° C.) | [h] | 1200 | 1300 | 1400 | 1500 | 1200 | 1200 | 1600 | — | — |
| Initial tensile elongation | [%] | — | — | — | — | — | — | 5 | 4 | 2 |
| b value after molding |  | 1 | 1 | −1 | −1 | −1 | −1 | −1 | — | — |
| b value after aging at 150° C. for 100 h |  | 6 | 5 | 3 | 3 | 5 | 3 | 2 | — | — |
| Δb |  | 5 | 4 | 4 | 4 | 6 | 4 | 3 | — | — |
| Notched Charpy impact strength | [kJ/m²] | — | — | — | — | — | — | 14 | 11 | 10 |
| Content of alkali metal compound and/or alkaline earth metal compound particles having particle size of 1 μm or more in total mass of alkali metal and/or alkaline earth metal compound | [% by mass] | — | — | — | — | — | — | 3 | 9 | 14 |

TABLE 5-continued

|  | Example 38 | Example 39 | Example 40 | Example 41 | Example 42 | Example 43 | Example 44 | Example 45 | Comparative Example 9 | Comparative Example 10 |
|---|---|---|---|---|---|---|---|---|---|---|
| A-I | 100 | 100 | 100 | 100 | 100 | 100 | 100 | 100 | 100 | 100 |
| B-I | 1 | 1 | 1 | 1 | 1 | 1 | 1 | 1 | 0 | 1 |
| C2-I | 2 | 3 | 5 | 7 | 2 | 2 | — | — | 2 | 0.5 |
| C2-II | — | — | — | — | — | — | 2 | — | — | — |
| C2-III | — | — | — | — | — | — | — | 2 | — | — |
| D-I | 50 | 50 | 50 | 50 | — | — | 50 | 50 | 50 | 50 |
| D-II | — | — | — | — | — | 50 | — | — | — | — |
| Heat aging resistance (strength half-life at 230° C.) | 800 | 1300 | 1300 | 1300 | 1000 | 1300 | 1200 | 1200 | 100 | 1200 |
| Heat aging resistance (strength half-life at 180° C.) | — | 1650 | 1700 | 1800 | — | — | — | — | 300 | 900 |
| Initial tensile elongation | 1 | — | — | — | — | — | — | — | — | — |
| b value after molding | — | 1 | 2 | 3 | −1 | −1 | — | — | 3 | −1 |
| b value after aging at 150° C. for 100 h | — | 4 | 4 | 4 | 2 | 2 | — | — | 10 | 5 |
| Δb | — | 3 | 2 | 1 | 3 | 3 | — | — | 7 | 6 |
| Notched Charpy impact strength | 9 | — | — | — | — | 11 | — | — | — | — |
| Content of alkali metal compound and/or alkaline earth metal compound particles having particle size of 1 μm or more in total mass of alkali metal and/or alkaline earth metal compound | 22 | — | — | — | — | — | — | — | — | — |

TABLE 6

|  |  | Example 46 | Example 47 | Example 48 | Example 49 | Comparative Example 11 | Example 50 | Comparative Example 12 | Comparative Example 13 |
|---|---|---|---|---|---|---|---|---|---|
| A-I | [part by mass] | 100 | 100 | 100 | 100 | 100 | 100 | 100 | 100 |
| B-I | [part by mass] | 2 | 3 | 5 | 10 | 50 | 1 | 1 | 0.02 |
| C2-I | [part by mass] | 2 | 2 | 2 | 2 | 2 | 10 | 30 | 2 |
| D-I | [part by mass] | 50 | 50 | 50 | 50 | 50 | 50 | 50 | 50 |
| Heat aging resistance (strength half-life at 230° C.) | [h] | 1500 | 1700 | 2000 | 2000 | not extrudable | 1300 | not extrudable | 400 |
| Heat aging resistance (strength half-life at 180° C.) | [h] | 1600 | 1700 | 1800 | 1800 | not extrudable | 1600 | not extrudable | 600 |
| Initial tensile elongation | [%] | 5 | 4 | 3 | 1 | — | — | — | — |
| b value after molding |  | −1 | −1 | −1 | −1 | — | 4 | — | — |
| b value after aging at 150° C. for 100 h |  | 2 | 2 | 1 | 1 | — | 5 | — | — |
| Δb |  | 4 | 4 | 3 | 3 | — | 1 | — | — |

TABLE 7

|  |  | Example 35 | Example 51 | Example 52 | Example 53 | Example 54 |
|---|---|---|---|---|---|---|
| A-I | [part by mass] | 100 | — | — | — | — |
| A-II | [part by mass] | — | 100 | — | — | — |
| A-III | [part by mass] | — | — | 100 | — | — |
| A-IV | [part by mass] | — | — | — | 100 | — |
| A-V | [part by mass] | — | — | — | — | 100 |
| B-I | [part by mass] | 1 | 1 | 1 | 1 | 1 |
| C2-I | [part by mass] | 2 | 2 | 2 | 2 | 2 |
| D-I | [part by mass] | 50 | 50 | 50 | 50 | 50 |
| Heat aging resistance (strength half-life at 230° C.) | [h] | 1300 | 1300 | 1300 | 1300 | 1300 |
| b value after molding |  | −1 | −1 | −1 | 2 | 3 |
| b value after aging at 150° C. for 100 h |  | 2 | 2 | 2 | 5 | 6 |
| Δb value |  | 3 | 3 | 3 | 3 | 3 |

TABLE 8

| | | Comparative Example 6 | Example 55 | Example 56 | Example 57 | Example 58 | Example 59 | Example 60 | Example 61 | Example 62 | Example 63 | Example 64 | Example 65 | Example 66 |
|---|---|---|---|---|---|---|---|---|---|---|---|---|---|---|
| A-I | [part by mass] | 100 | 95 | 90 | 80 | 60 | 50 | 95 | 90 | 80 | 60 | 50 | 80 | 90 |
| A-VI | [part by mass] | — | — | — | — | — | — | — | — | — | — | — | — | — |
| C3-I | [part by mass] | — | — | — | — | — | — | — | — | — | — | — | — | — |
| C3-II | [part by mass] | — | 5 | 10 | 20 | 40 | 50 | — | — | — | — | — | — | — |
| C3-III | [part by mass] | — | — | — | — | — | — | 5 | 10 | 20 | 40 | 50 | — | — |
| C3-IV | [part by mass] | — | — | — | — | — | — | — | — | — | — | — | 20 | — |
| C3-V | [part by mass] | — | — | — | — | — | — | — | — | — | — | — | — | 10 |
| B-I | [part by mass] | 1 | 1 | 1 | 1 | 1 | 1 | 1 | 1 | 1 | 1 | 1 | 1 | 1 |
| D-I | [part by mass] | 50 | 50 | 50 | 50 | 50 | 50 | 50 | 50 | 50 | 50 | 50 | 50 | 50 |
| Initial tensile strength | [MPa] | — | 210 | 210 | 200 | — | — | 210 | 200 | 195 | — | — | — | 170 |
| Heat aging resistance (strength half-life at 230° C.) | [h] | 1200 | 1500 | 1700 | 2000 | 2000 | 1900 | 1500 | 1700 | 2000 | 2000 | 1900 | 1900 | 1600 |
| Heat aging resistance (strength half-life at 180° C.) | [h] | 800 | 1300 | 1600 | 1800 | 1800 | 1800 | 1300 | 1600 | 1800 | 1800 | 1800 | 1700 | 1400 |

| | Example 67 | Comparative Example 14 | Comparative Example 15 | Example 68 | Example 69 | Example 70 | Example 71 | Example 72 | Example 73 | Example 74 | Example 75 | Example 76 | Comparative Example 16 |
|---|---|---|---|---|---|---|---|---|---|---|---|---|---|
| A-I | — | 100 | 80 | 80 | 80 | 80 | 80 | 80 | 80 | 80 | 80 | 80 | 80 |
| A-VI | 80 | — | — | — | — | — | — | — | — | — | — | — | — |
| C3-I | 20 | — | — | — | — | — | — | — | — | — | — | — | — |
| C3-II | — | — | 20 | 20 | 20 | 20 | 20 | 20 | 20 | 20 | 20 | 20 | 20 |
| C3-III | — | — | — | — | — | — | — | — | — | — | — | — | — |
| C3-IV | — | — | — | — | — | — | — | — | — | — | — | — | — |
| C3-V | — | — | — | — | — | — | — | — | — | — | — | — | — |
| B-I | 1 | 1 | 0.02 | 0.06 | 0.3 | 0.6 | 0.8 | 1 | 1.2 | 1.5 | 3 | 5 | 50 |
| D-I | 50 | 50 | 50 | 50 | 50 | 50 | 50 | 50 | 50 | 50 | 50 | 50 | 50 |
| Initial tensile strength | — | — | — | — | — | — | — | — | — | — | — | — | — |
| Heat aging resistance (strength half-life at 230° C.) | 2200 | 1200 | 400 | 900 | 1300 | 1600 | 1800 | 2000 | 2100 | 2200 | 2300 | 2000 | not extrudable |
| Heat aging resistance (strength half-life at 180° C.) | 1600 | 800 | 1000 | 1200 | 1300 | 1500 | 1700 | 1800 | 1900 | 2000 | 2100 | 1800 | not extrudable |

TABLE 9

| | | Example 77 | Example 78 | Example 79 | Example 80 | Example 81 | Example 82 | Example 83 | Example 84 |
|---|---|---|---|---|---|---|---|---|---|
| A-I | [part by mass] | 95 | 90 | 80 | 80 | 100 | 100 | 90 | 80 |
| B-I | [part by mass] | 1 | 1 | 1 | 1 | 1 | 1 | 1 | 1 |
| C1-I | [part by mass] | 0.03 | 0.03 | 0.03 | 0.03 | 0.03 | 0.03 | — | — |
| C1-2-I | [part by mass] | 0.3 | 0.3 | 0.3 | 0.3 | 0.3 | 0.3 | — | — |
| C2-I | [part by mass] | — | — | — | 1 | 3 | 1 | 1 | |
| C3-II | [part by mass] | 5 | 10 | 20 | — | — | — | 10 | 20 |

TABLE 9-continued

|  |  | Example 77 | Example 78 | Example 79 | Example 80 | Example 81 | Example 82 | Example 83 | Example 84 |
|---|---|---|---|---|---|---|---|---|---|
| C3-III | [part by mass] | — | — | — | 20 | — | — | — | — |
| D-I | [part by mass] | 50 | 50 | 50 | 50 | 50 | 50 | 50 | 50 |
| Heat aging resistance (strength half-life at 230° C.) | [h] | 2000 | 2500 | 3000 | 3000 | 1700 | 1750 | 1800 | 2000 |
| Heat aging resistance (strength half-life at 180° C.) | [h] | 2200 | 2300 | 3000 | 3000 | 2600 | 2650 | 1800 | 1900 |
| Initial tensile strength | [MPa] | — | — | 200 | 195 | — | — | — | — |
| b value after molding |  | — | — | — | — | 2 | 1 | — | — |
| b value after aging at 150° C. for 100 h |  | — | — | — | — | 4 | 3 | — | — |
| Δb |  | — | — | — | — | 2 | 2 | — | — |
| Calcium chloride resistance |  | — | — | X | ○ | — | — | — | — |

TABLE 10

|  |  | Example 79 | Example 85 | Example 86 | Example 87 |
|---|---|---|---|---|---|
| A-I | [part by mass] | 80 | 80 | 80 | 80 |
| B-I | [part by mass] | 1 | — | — | — |
| B-II | [part by mass] | — | 1 | — | — |
| B-III | [part by mass] | — | — | 1 | — |
| B-IV | [part by mass] | — | — | — | 1 |
| C1-I | [part by mass] | 0.03 | 0.03 | 0.03 | 0.03 |
| C1-2-I | [part by mass] | 0.3 | 0.3 | 0.3 | 0.3 |
| C2-I | [part by mass] | — | — | — | — |
| C3-II | [part by mass] | 20 | 20 | 20 | 20 |
| C3-III | [part by mass] | — | — | — | — |
| D-I | [part by mass] | 50 | 50 | 50 | 50 |
| Heat aging resistance (strength half-life at 230° C.) | [h] | 3000 | 2800 | 3000 | 2200 |
| Heat aging resistance (strength half-life at 180° C.) | [h] | 3000 | 2800 | 3000 | 2200 |
| Initial tensile strength | [MPa] | 200 | 200 | 200 | 200 |

TABLE 11

| Component | Unit | Example 99 | Example 100 | Example 101 | Example 102 | Example 103 | Example 104 | Example 105 |
|---|---|---|---|---|---|---|---|---|
| A-I | [part by mass] | 100 | 100 | 100 | 100 | 100 | 100 | 100 |
| B-I | [part by mass] | 0.1 | 0.3 | 0.6 | 0.8 | 1 | 1.2 | 1.4 |
| C4-II | [part by mass] | 0.5 | 0.5 | 0.5 | 0.5 | 0.5 | 0.5 | 0.5 |
| D-I | [part by mass] | 50 | 50 | 50 | 50 | 50 | 50 | 50 |
| Heat aging resistance (strength half-life at 230° C.) | [h] | 200 | 300 | 1050 | 1150 | 1200 | 1250 | 1300 |
| Initial tensile strength | [MPa] | 200 | 200 | 200 | 200 | 200 | 200 | 200 |
| Tensile strength at 120° C. | [MPa] | 107 | 107 | 107 | 107 | 107 | 107 | 107 |
| Retention of tensile strength after water absorption | [%] | 45 | 45 | 45 | 45 | 45 | 44 | 43 |
| Number-average molecular weight (Mn) |  | 28000 | 24000 | 22000 | 21000 | 20000 | 19000 | 18000 |

TABLE 12

| Component | Unit | Example 103 | Example 106 | Example 107 | Example 108 | Example 109 |
|---|---|---|---|---|---|---|
| A-I | [part by mass] | 100 | 100 | 100 | 100 | 100 |
| B-I | [part by mass] | 1 | 1 | 1 | 1 | 1 |
| C4-II | [part by mass] | 0.5 | 0.15 | 0.2 | 0.35 | 1 |
| D-I | [part by mass] | 50 | 50 | 50 | 50 | 50 |
| Heat aging resistance (strength half-life at 230° C.) | [h] | 1200 | 1200 | 1200 | 1200 | 1200 |

TABLE 12-continued

| Component | Unit | Example 103 | Example 106 | Example 107 | Example 108 | Example 109 |
|---|---|---|---|---|---|---|
| Initial tensile strength | [MPa] | 200 | 200 | 200 | 200 | 190 |
| Tensile strength at 120° C. | [MPa] | 107 | 107 | 107 | 107 | 107 |
| Retention of tensile strength after water absorption | [%] | 45 | 32 | 39 | 42 | 46 |
| Number-average molecular weight (Mn) | | 20000 | 20000 | 20000 | 20000 | 20000 |

TABLE 13

| Component | Unit | Example 103 | Example 110 | Example 111 | Example 112 | Example 113 | Example 114 |
|---|---|---|---|---|---|---|---|
| A-I | [part by mass] | 100 | 100 | 100 | 100 | 100 | 100 |
| B-I | [part by mass] | 1 | 1 | 1 | 1 | 1 | 1 |
| C4-I | [part by mass] | — | — | — | 0.33 | — | — |
| C4-II | [part by mass] | 0.5 | 0.5 | 0.5 | — | — | — |
| C4-III | [part by mass] | — | — | — | — | 0.5 | — |
| C4-IV | [part by mass] | — | — | — | — | — | 0.29 |
| D-1 | [part by mass] | 50 | — | — | 50 | 50 | 50 |
| D-2 | [part by mass] | — | — | 50 | — | — | — |
| Heat aging resistance (strength half-life at 230° C.) | [h] | 1200 | 900 | 1200 | 1300 | 1300 | 1300 |
| Initial tensile strength | [MPa] | 200 | 100 | 200 | 200 | 200 | 200 |
| Tensile strength at 120° C. | [MPa] | 107 | — | 107 | 107 | 107 | 107 |
| Retention of tensile strength after water absorption | [%] | 45 | 45 | 45 | 39 | 42 | 39 |
| Notched Charpy impact strength | [kJ/m$^2$] | 14 | 14 | 11 | 14 | 14 | 14 |
| Number-average molecular weight (Mn) | | 20000 | 20000 | 20000 | 20000 | 20000 | 20000 |

TABLE 14

| Component | Unit | Example 103 | Example 115 | Example 116 | Example 117 | Example 119 | Example 120 | Example 121 |
|---|---|---|---|---|---|---|---|---|
| A-I | [part by mass] | 100 | — | — | — | — | — | 80 |
| A-II | [part by mass] | — | 100 | — | — | — | — | — |
| A-III | [part by mass] | — | — | 100 | — | — | — | — |
| A-IV | [part by mass] | — | — | — | 100 | — | — | — |
| A-V | [part by mass] | — | — | — | — | 100 | — | — |
| A-VI | [part by mass] | — | — | — | — | — | 100 | — |
| C3-II | [part by mass] | — | — | — | — | — | — | 20 |
| B-I | [part by mass] | 1 | 1 | 1 | 1 | 1 | 1 | 1 |
| C4-II | [part by mass] | 0.5 | 0.5 | 0.5 | 0.5 | 0.5 | 0.5 | 0.5 |
| D-I | [part by mass] | 50 | 50 | 50 | 50 | 50 | 50 | 50 |
| Heat aging resistance (strength half-life at 230° C.) | [h] | 1200 | 1200 | 1200 | 1200 | 1200 | 1200 | 1400 |
| Retention of tensile strength after water absorption | [%] | 45 | 45 | 45 | 45 | 45 | 45 | 45 |
| Number-average molecular weight (Mn) | | 20000 | 20000 | 20000 | 15000 | 12000 | 20000 | 20000 |

TABLE 15

| Component | Unit | Example 103 | Comparative Example 103 | Comparative Example 104 | Comparative Example 105 | Example 122 | Example 123 |
|---|---|---|---|---|---|---|---|
| A-I | [part by mass] | 100 | 100 | 100 | 100 | 100 | 100 |
| B-I | [part by mass] | 1 | 1 | — | — | 1 | 1 |
| C4-II | [part by mass] | 0.5 | — | 0.5 | — | 0.5 | 0.5 |
| D-I | [part by mass] | 50 | 50 | 50 | 50 | 50 | 50 |
| Phosphorus element-based concentration of sodium | [mmol/kg] | 0 | 0 | 0 | 0 | 1.20 | 0.50 |

TABLE 15-continued

| Component | Unit | Example 103 | Comparative Example 103 | Comparative Example 104 | Comparative Example 105 | Example 122 | Example 123 |
|---|---|---|---|---|---|---|---|
| hypophosphite | | | | | | | |
| Heat aging resistance (strength half-life at 230° C.) | [h] | 1200 | 1200 | 100 | 100 | 1100 | 1120 |
| Retention of tensile strength after water absorption | [%] | 45 | 20 | 48 | 50 | 45 | 45 |
| Number-average molecular weight (Mn) | | 20000 | 20000 | 30000 | 30000 | 20000 | 20000 |

TABLE 16

| Component | Unit | Example 124 | Example 125 | Example 126 | Example 127 | Example 128 | Example 129 | Example 130 |
|---|---|---|---|---|---|---|---|---|
| A-I | [part by mass] | 100 | 100 | 100 | 100 | 100 | 100 | 100 |
| B-I | [part by mass] | 0.1 | 0.3 | 0.6 | 0.8 | 1 | 1.2 | 1.4 |
| C-XI | [part by mass] | 0.15 | 0.15 | 0.15 | 0.15 | 0.15 | 0.15 | 0.15 |
| D-I | [part by mass] | 50 | 50 | 50 | 50 | 50 | 50 | 50 |
| Heat aging resistance (strength half-life at 230° C.) | [h] | 300 | 600 | 1050 | 1150 | 1200 | 1250 | 1300 |
| Initial tensile strength | [MPa] | 200 | 200 | 200 | 200 | 200 | 200 | 200 |
| Tensile strength at 120° C. | [MPa] | 115 | 115 | 115 | 115 | 115 | 115 | 115 |
| Retention of tensile strength after water absorption | [%] | 45 | 45 | 45 | 45 | 45 | 44 | 42 |
| Presence or absence of structure with one or more branch points of molecule having molecular weight of 100,000 or more | | Present | Present | Present | Present | Present | Present | Present |
| Presence or absence of carboxylic anhydride functional group of molecule having molecular weight of 100,000 or more | | Present | Present | Present | Present | Present | Present | Present |
| Weight-average molecular weight/number-average molecular weight (Mw/Mn) | | 3.6 | 3.5 | 3.4 | 3.3 | 3.3 | 3.3 | 3.3 |
| Mw/Mn after aging at 120° C. for 1000 hours | | 3.9 | 3.7 | 3.5 | 3.3 | 3.3 | 3.3 | 3.3 |
| Number-average molecular weight (Mn) | | 25000 | 25000 | 25000 | 25000 | 25000 | 25000 | 25000 |

TABLE 17

| Component | Unit | Example 128 | Example 131 | Example 132 | Example 133 | Example 134 | Example 135 | Example 136 |
|---|---|---|---|---|---|---|---|---|
| A-I | [part by mass] | 100 | 100 | 100 | 100 | 100 | 100 | 100 |
| B-I | [part by mass] | 1 | 1 | 1 | 1 | 1 | 1 | 1 |
| C4-XI | [part by mass] | 0.15 | 0.05 | 0.1 | 0.2 | 0.3 | 0.45 | 0.15 |
| D-I | [part by mass] | 50 | 50 | 50 | 50 | 50 | 50 | — |
| D-II | [part by mass] | — | — | — | — | — | — | 50 |
| Heat aging resistance (strength half-life at 230° C.) | [h] | 1200 | 1200 | 1200 | 1150 | 1100 | 1050 | 1200 |
| Initial tensile strength | [MPa] | 200 | 200 | 200 | 200 | 200 | 190 | 200 |
| Retention of tensile strength after water absorption | [%] | 45 | 38 | 42 | 45 | 45 | 45 | 45 |
| Notched Charpy impact strength | [kJ/m²] | 14 | 14 | 14 | 14 | 14 | 14 | 11 |
| Presence or absence of structure with one or more branch points of molecule having molecular weight of 100,000 or more | | Present | Present | Present | Present | Present | Present | Present |
| Presence or absence of carboxylic anhydride functional group of molecule having molecular weight of 100,000 or more | | Present | Present | Present | Present | Present | Present | Present |
| Weight-average molecular weight/number-average molecular weight (Mw/Mn) | | 3.3 | 3.1 | 3.2 | 3.3 | 3.5 | 3.6 | 3.3 |

TABLE 17-continued

| Component | Unit | Example 128 | Example 131 | Example 132 | Example 133 | Example 134 | Example 135 | Example 136 |
|---|---|---|---|---|---|---|---|---|
| Mw/Mn after aging at 120° C. for 1000 hours | | 3.3 | 3.1 | 3.2 | 3.3 | 3.5 | 3.6 | 3.3 |
| Number-average molecular weight (Mn) | | 25000 | 21000 | 23000 | 26000 | 28000 | 32000 | 25000 |

TABLE 18

| Component | Unit | Example 128 | Example 137 | Example 138 | Example 139 |
|---|---|---|---|---|---|
| A-I | [part by mass] | 100 | 100 | 100 | 100 |
| B-I | [part by mass] | 1 | 1 | 1 | 1 |
| C4-XI | [part by mass] | 0.15 | — | — | — |
| C4-XII | [part by mass] | — | 0.15 | — | — |
| C4-XIII | [part by mass] | — | — | 0.15 | — |
| C4-XIV | [part by mass] | — | — | — | 0.15 |
| D-I | [part by mass] | 50 | 50 | 50 | 50 |
| Heat aging resistance (strength half-life at 230° C.) | [h] | 1200 | 1300 | 1300 | 1300 |
| Tensile strength at 120° C. | [MPa] | 115 | 114 | 111 | 109 |
| Retention of tensile strength after water absorption | [%] | 45 | 44 | 42 | 39 |
| Presence or absence of structure with one or more branch points of molecule having molecular weight of 100,000 or more | | Present | Present | Present | Present |
| Presence or absence of carboxylic anhydride functional group of molecule having molecular weight of 100,000 or more | | Present | Present | Present | Present |
| Weight-average molecular weight/number-average molecular weight (Mw/Mn) | | 3.3 | 3.3 | 3.2 | 3.1 |
| Mw/Mn after aging at 120° C. for 1000 hours | | 3.3 | 3.3 | 3.2 | 3.1 |
| Number-average molecular weight (Mn) | | 25000 | 25000 | 25000 | 25000 |

TABLE 19

| Component | Unit | Example 128 | Example 140 | Example 141 | Example 142 | Example 143 | Comparative Example 106 | Example 144 | Example 145 |
|---|---|---|---|---|---|---|---|---|---|
| A-I | [part by mass] | 100 | — | — | — | — | 100 | 100 | 100 |
| A-II | [part by mass] | — | 100 | — | — | — | — | — | — |
| A-III | [part by mass] | — | — | 100 | — | — | — | — | — |
| A-IV | [part by mass] | — | — | — | 100 | — | — | — | — |
| A-V | [part by mass] | — | — | — | — | 100 | — | — | — |
| B-I | [part by mass] | 1 | 1 | 1 | 1 | 1 | — | 1 | 1 |
| C4-XI | [part by mass] | 0.15 | 0.15 | 0.15 | 0.15 | 0.15 | — | 0.15 | 0.15 |
| D-I | [part by mass] | 50 | 50 | 50 | 50 | 50 | 50 | 50 | 50 |
| Phosphorus element-based concentration of sodium hypophosphite [mmol/kg] | | — | — | — | — | — | — | 1.20 | 0.50 |
| Heat aging resistance (strength half-life at 230° C.) | [h] | 1200 | 1200 | 1200 | 1200 | 1200 | 100 | 1100 | 1120 |
| Retention of tensile strength after water absorption | [%] | 45 | 45 | 45 | 45 | 45 | 50 | 45 | 45 |
| Presence or absence of structure with one or more branch points of molecule having molecular weight of 100,000 or more | | Present | Present | Present | Present | Present | Absent | Present | Present |
| Presence or absence of carboxylic anhydride functional group of molecule having molecular weight of 100,000 or more | | Present | Present | Present | Present | Present | Absent | Present | Present |

TABLE 19-continued

| Component | Unit | Example 128 | Example 140 | Example 141 | Example 142 | Example 143 | Comparative Example 106 | Example 144 | Example 145 |
|---|---|---|---|---|---|---|---|---|---|
| Weight-average molecular weight/number-average molecular weight (Mw/Mn) | | 3.3 | 3.3 | 3.3 | 3.3 | 3.3 | 2.1 | 3.3 | 3.3 |
| Mw/Mn after aging at 120° C. for 1000 hours | | 3.3 | 3.3 | 3.3 | 3.3 | 3.3 | 2.3 | 3.3 | 3.3 |
| Number-average molecular weight (Mn) | | 25000 | 25000 | 25000 | 25000 | 25000 | 20000 | 25000 | 25000 |

TABLE 20

| Component | Unit | Example 146 | Example 147 | Example 148 | Example 149 | Example 150 | Example 151 | Example 152 | Example 153 | Example 154 | Example 155 | Example 156 | Example 157 |
|---|---|---|---|---|---|---|---|---|---|---|---|---|---|
| A-I | [part by mass] | 100 | 100 | 100 | 100 | 100 | 100 | 100 | 100 | 100 | 100 | 100 | 100 |
| B-I | [part by mass] | 1 | 1 | 1 | 1 | 1 | 1 | 1 | 1 | 1 | 1 | 1 | 1 |
| C4-V | [part by mass] | 1 | — | — | 1 | — | — | 1 | — | — | 1 | — | — |
| C4-I | [part by mass] | — | 1 | — | — | 1 | — | — | 1 | — | — | 1 | — |
| C4-VII | [part by mass] | — | — | — | — | — | 1 | — | — | 1 | — | — | 1 |
| C4-X | [part by mass] | — | — | 1 | — | — | — | — | — | — | — | — | — |
| D-I | [part by mass] | 50 | 50 | 50 | 50 | 50 | 50 | 50 | 50 | 50 | 50 | 50 | 50 |
| Number-average molecular weight (Mn) | | 20000 | 20000 | 20000 | 8000 | 8000 | 8000 | 6000 | 6000 | 6000 | 8000 | 8000 | 8000 |
| Heat aging resistance (strength half-life at 230° C.) | [h] | 1500 | 1500 | 1400 | 600 | 600 | 600 | 600 | 600 | 600 | 700 | 700 | 700 |
| Initial tensile strength | [MPa] | 200 | 200 | 200 | 180 | 180 | 180 | 170 | 170 | 170 | 175 | 175 | 175 |
| Retention of tensile strength after water absorption | [%] | 50 | 40 | 40 | 20 | 20 | 20 | 50 | 45 | 37 | 30 | 20 | 20 |

TABLE 21

| Component | Unit | Example 146 | Example 158 | Example 159 | Example 160 | Comparative Example 107 |
|---|---|---|---|---|---|---|
| A-I | [part by mass] | 100 | 100 | 100 | 100 | 100 |
| B-I | [part by mass] | 1 | 1 | 1 | 1 | 1 |
| C4-I | [part by mass] | — | — | — | 1 | — |
| C4-V | [part by mass] | 1 | 0.8 | 0.5 | — | — |
| D-I | [part by mass] | 50 | 50 | 50 | 50 | 50 |
| Heat aging resistance (strength half-life at 230° C.) | [h] | 1500 | 1530 | 1540 | 1400 | 1500 |
| Initial tensile strength | [MPa] | 200 | 200 | 200 | 200 | 200 |
| Retention of tensile strength after water absorption | [%] | 45 | 43 | 40 | 45 | 20 |

TABLE 22

| Component | Unit | Example 146 | Example 158 | Example 159 | Example 161 | Example 162 | Example 160 | Example 163 | Example 164 | Example 165 | Example 166 |
|---|---|---|---|---|---|---|---|---|---|---|---|
| A-I | [part by mass] | 100 | 100 | 100 | — | — | 100 | 100 | 100 | — | — |
| A-II | [part by mass] | — | — | — | 100 | — | — | — | — | 100 | — |

TABLE 22-continued

| Component | Unit | Example 146 | Example 158 | Example 159 | Example 161 | Example 162 | Example 160 | Example 163 | Example 164 | Example 165 | Example 166 |
|---|---|---|---|---|---|---|---|---|---|---|---|
| A-III | [part by mass] | — | — | — | — | 100 | — | — | — | — | 100 |
| B-I | [part by mass] | 1 | 1 | 1 | 1 | 1 | 1 | 1 | 1 | 1 | 1 |
| D4-V | [part by mass] | 1 | 0.8 | 0.5 | 0.8 | 0.8 | — | — | — | 0.8 | 0.8 |
| C4-I | [part by mass] | — | — | — | — | — | 1 | 0.8 | 0.5 | — | — |
| D-I | [part by mass] | 50 | 50 | 50 | 50 | 50 | 50 | 50 | 50 | 50 | 50 |
| (Alkalinity value of alkali metal compound and/or alkaline earth metal compound)/acid value of acid | | 2.0 | 2.5 | 4.1 | 2.5 | 2.5 | 2.3 | 2.9 | 4.7 | 2.9 | 2.9 |
| (Alkalinity value of alkali metal compound and/or alkaline earth metal compound)/(acid value of acid + acid value of terminal carboxyl group) | | 1.0 | 1.1 | 1.4 | 1.6 | 0.9 | 1.1 | 1.2 | 1.4 | 1.6 | 0.8 |
| Heat aging resistance (strength half-life at 230° C.) | [h] | 1500 | 1530 | 1540 | 1530 | 1530 | 1400 | 1450 | 1480 | 1530 | 1530 |
| Initial tensile strength | [MPa] | 200 | 200 | 200 | 200 | 200 | 200 | 200 | 200 | 200 | 200 |
| Retention of tensile strength after water absorption | [%] | 45 | 43 | 40 | 43 | 44 | 45 | 45 | 45 | 40 | 45 |
| Number-average molecular weight (Mn) | | 20000 | 20000 | 20000 | 20000 | 20000 | 20000 | 20000 | 20000 | 20000 | 20000 |

TABLE 23

| Component | Unit | Example 146 | Example 158 | Example 159 | Example 167 | Example 168 | Example 169 | Example 170 | Example 171 | Example 172 | Example 173 | Example 174 |
|---|---|---|---|---|---|---|---|---|---|---|---|---|
| A-I | [part by mass] | 100 | 100 | 100 | 100 | 100 | 100 | 100 | 100 | 100 | 100 | 100 |
| B-I | [part by mass] | 1 | 1 | 1 | 1 | 1 | 1 | 1 | 1 | 1 | 1 | 1 |
| C4-V | [part by mass] | 1 | 0.8 | 0.5 | — | — | — | — | — | — | — | — |
| C4-VI | [part by mass] | — | — | — | 1 | 0.8 | 0.5 | — | — | — | — | — |
| C4-VIII | [part by mass] | — | — | — | — | — | — | 1 | 0.8 | 0.5 | — | — |
| C4-IX | [part by mass] | — | — | — | — | — | — | — | — | — | 2 | 1 |
| D-I | [part by mass] | 50 | 50 | 50 | 50 | 50 | 50 | 50 | 50 | 50 | 50 | 50 |
| Heat aging resistance (strength half-life at 230° C.) | [h] | 1500 | 1530 | 1540 | 1500 | 1530 | 1540 | 1500 | 1530 | 1540 | 1450 | 1460 |
| Initial tensile strength | [MPa] | 200 | 200 | 200 | 200 | 200 | 200 | 190 | 195 | 195 | 200 | 200 |
| Retention of tensile strength after water absorption | [%] | 45 | 43 | 40 | 45 | 43 | 40 | 45 | 43 | 41 | 45 | 39 |
| Amount of decrease in mass at 300° C. for 1 hour | [%] | 8 | 6 | 4 | 8 | 6 | 4 | 8 | 6 | 4 | 13 | 11 |
| Number-average molecular weight (Mn) | | 20000 | 20000 | 20000 | 20000 | 20000 | 20000 | 20000 | 20000 | 20000 | 20000 | 20000 |

TABLE 24

| Component | Unit | Example 175 | Example 176 | Comparative Example 107 |
|---|---|---|---|---|
| A-I | [part by mass] | 100 | 100 | 100 |
| B-I | [part by mass] | 1 | 1 | 1 |
| C4-XI | [part by mass] | 0.4 | — | — |

TABLE 24-continued

| Component | Unit | Example 175 | Example 176 | Comparative Example 107 |
|---|---|---|---|---|
| C4-XII | [part by mass] | — | 0.4 | — |
| D-I | [part by mass] | 50 | 50 | 50 |
| Weight-average molecular weight/number-average molecular weight (Mw/Mn) | | 3.5 | 3.5 | 1.8 |
| Mw/Mn after aging at 120° C. for 1000 h | | 3.5 | 3.5 | 2.8 |
| Heat aging resistance (strength half-life at 230° C.) | [h] | 1400 | 1400 | 1500 |
| Initial tensile strength | [MPa] | 200 | 200 | 200 |
| Retention of tensile strength after water absorption | [%] | 45 | 45 | 20 |
| Number-average molecular weight (Mn) | | 30000 | 30000 | 20000 |

TABLE 25

| Component | Unit | Example 146 | Example 177 | Example 178 | Example 179 | Example 180 | Example 181 | Example 182 |
|---|---|---|---|---|---|---|---|---|
| A-I | [part by mass] | 100 | — | — | — | — | — | 80 |
| A-II | [part by mass] | — | 100 | — | — | — | — | — |
| A-III | [part by mass] | — | — | 100 | — | — | — | — |
| A-IV | [part by mass] | — | — | — | 100 | — | — | — |
| A-V | [part by mass] | — | — | — | — | 100 | — | — |
| A-VI | [part by mass] | — | — | — | — | — | 100 | — |
| C3-II | [part by mass] | — | — | — | — | — | — | 20 |
| B-I | [part by mass] | 1 | 1 | 1 | 1 | 1 | 1 | 1 |
| C4-V | [part by mass] | 1 | 1 | 1 | 1 | 1 | 1 | 1 |
| D-I | [part by mass] | 50 | 50 | 50 | 50 | 50 | 50 | 50 |
| Heat aging resistance (strength half-life at 230° C.) | [h] | 1500 | 1500 | 1500 | 1500 | 1500 | 1500 | 1600 |
| Retention of tensile strength after water absorption | [%] | 45 | 45 | 45 | 45 | 45 | 45 | 45 |
| Number-average molecular weight (Mn) | | 20000 | 20000 | 20000 | 15000 | 12000 | 20000 | 20000 |

TABLE 26

| Component | Unit | Example 183 | Example 182 | Example 184 | Example 146 |
|---|---|---|---|---|---|
| A-I | [part by mass] | 100 | 80 | 80 | 100 |
| C3-II | [part by mass] | — | 20 | — | — |
| C3-III | [part by mass] | — | — | 20 | — |
| B-I | [part by mass] | 1 | 1 | 1 | 1 |
| C4-V | [part by mass] | 1 | 1 | 1 | 1 |
| D-I | [part by mass] | 50 | 50 | 50 | 50 |
| Heat aging resistance (strength half-life at 230° C.) | [h] | 1000 | 1600 | 1600 | 1500 |
| Number-average molecular weight (Mn) | | 20000 | 20000 | 20000 | 20000 |
| Retention of tensile strength after water absorption | [%] | 45 | 45 | 45 | 45 |

TABLE 27

| Component | Unit | Example 146 | Example 185 | Example 186 | Example 187 |
|---|---|---|---|---|---|
| A-I | [part by mass] | 100 | 100 | 100 | 100 |
| B-I | [part by mass] | 1 | — | — | — |
| B-II | [part by mass] | — | 1 | — | — |
| B-III | [part by mass] | — | — | 1 | — |

TABLE 27-continued

| Component | Unit | Example 146 | Example 185 | Example 186 | Example 187 |
|---|---|---|---|---|---|
| B-IV | [part by mass] | — | — | — | 1 |
| C4-V | [part by mass] | 1 | 1 | 1 | 1 |
| C4-XV | [part by mass] | | | | |
| D-I | [part by mass] | 50 | 50 | 50 | 50 |
| Heat aging resistance (strength half-life at 230° C.) | [h] | 1500 | 1500 | 1500 | 1500 |
| Initial tensile strength | [MPa] | 200 | 200 | 200 | 200 |
| Retention of tensile strength after water absorption | [%] | 45 | 45 | 45 | 45 |

TABLE 28

| Component | Unit | Example 146 | Example 188 | Example 189 | Example 190 | Example 191 | Example 192 |
|---|---|---|---|---|---|---|---|
| A-I | [part by mass] | 100 | 100 | 100 | 100 | 100 | 100 |
| B-I | [part by mass] | 1 | 1 | 1 | 1 | 1 | 1 |
| C4-V | [part by mass] | 1 | — | — | — | — | — |
| C4-XV | [part by mass] | — | 1 | — | — | — | — |
| C4-XVI | [part by mass] | — | — | 1 | — | — | — |
| C4-XVII | [part by mass] | — | — | — | 1 | — | — |
| C4-XVIII | [part by mass] | — | — | — | — | 1 | — |
| C4-XIX | [part by mass] | — | — | — | — | — | 1 |
| D-I | [part by mass] | 50 | 50 | 50 | 50 | 50 | 50 |
| Heat aging resistance (strength half-life at 230° C.) | [h] | 1500 | 1550 | 1500 | 1500 | 1500 | 1500 |
| Initial tensile strength | [MPa] | 200 | 200 | 195 | 195 | 195 | 200 |
| Retention of tensile strength after water absorption | [%] | 45 | 45 | 45 | 45 | 45 | 42 |
| Bleed test | | X | ○ | ○ | ○ | ○ | ○ |

TABLE 29

| Component | Unit | Example 146 | Example 193 | Comparative Example 108 | Example 194 |
|---|---|---|---|---|---|
| A-I | [part by mass] | 100 | 100 | 100 | — |
| A-VII | [part by mass] | — | — | — | 100 |
| B-I | [part by mass] | 1 | 0.6 | 1 | 1 |
| C4-V | [part by mass] | 1 | 1 | — | — |
| C4-XX | [part by mass] | — | — | 1 | — |
| D-I | [part by mass] | 50 | 50 | 50 | 50 |
| Sodium aluminate | [part by mass] | — | 0.4 | — | — |
| Heat aging resistance (strength half-life at 230° C.) | [h] | 1500 | 1400 | 1500 | 200 |
| Initial tensile strength | [MPa] | 200 | 200 | 200 | 210 |
| Retention of tensile strength after water absorption | [%] | 45 | 45 | 15 | 43 |
| Notched Charpy impact strength | [kJ/m$^2$] | 14 | 15 | 13 | — |

In Tables 1 to 29, "-" meant that the measurement was not carried out, or the component was not contained.

Tables 1 to 10 demonstrated that the polyamide resin compositions of Examples 1 to 87 exhibited excellent heat aging resistance.

On the other hand, Comparative Examples 1 to 16 were inferior in heat aging resistance to Examples.

Tables 11 to 29 demonstrated that the polyamide resin compositions of Examples 99 to 194 exhibited excellent heat aging resistance and physical properties during water absorption.

On the other hand, Comparative Examples 103 to 108 were inferior in heat aging resistance or physical properties during water absorption to Examples.

The present application is based on Japanese Patent Application No. 2015-032126 filed on Feb. 20, 2015 to the Japanese Patent Office, the content of which is incorporated herein by reference in its entirety.

INDUSTRIAL APPLICABILITY

The polyamide resin composition of the present invention is industrially applicable as materials for various parts, for example, for automobiles, for machinery industry, for electric or electronic uses, for industrial materials, for engineering materials, and for daily necessities or domestic articles.

The invention claimed is:
1. A polyamide resin composition comprising:
(A) a polyamide resin in which an amount of meta-xylylenediamine (MXD) as monomer diamine is less than 30% by mol;
(B) a carbonate or a bicarbonate of an alkali metal; and

(C) at least one selected from cyclohexanedicarboxylic acid, isophthalic acid, terephthalic acid, trimellitic acid, trimellitic anhydride, 1,3,5-tetrabenzenetetracarboxylic acid, 1,2,4-cyclohexanetricarboxylic acid, adipic acid, dodecanedioic acid, citric acid, tartaric acid, ethylenediaminetetraacetic acid, and ethylenediaminetetraacetic acid disodium salt, and optionally one or more compounds selected from the group consisting of following (C1) to (C3):
- (C1) a salt of one or more metal elements selected from the group consisting of groups 3, 4, 11, 13, and 14 of the periodic table,
- (C2) at least one organic heat stabilizer selected from the group consisting of a hindered phenol compound, a hindered amine compound, and an organic phosphorus compound,
- (C3) a crystalline thermoplastic resin having a lower melting point than that of the component (A) and/or an amorphous thermoplastic resin having a lower Vicat softening point than that of the component (A),
- wherein a content of the component (B) is 0.03 to 20 parts by mass based on parts by mass in total of the component (A) and the component (C3), and
- the components (C1) to (C3) have following respective contents when selected as a component contained therein:
- component (C1): 0.001 to 0.05 parts by mass in terms of an amount of a metal element based on 100 parts by mass in total of the component (A) and the component (C3),
- component (C2): 0.8 to 20 parts by mass based on 100 parts by mass in total of the component (A) and the component (C3),
- component (C3): 1 to 50 parts by mass based on 100 parts by mass in total of the component (A) and the component (C3), and
- wherein an alkalinity value of the carbonate or the bicarbonate of the alkali metal (B) and a sum of an acid value of the component (C) and an acid value of a terminal carboxyl group of the polyamide resin (A) included in 100 parts by mass in total of the component (A) and the component (C3) satisfy a condition of following (formula 2):

$$0 < Y \leq 3 \quad \text{(Formula 2)}$$

wherein Y=(alkalinity value of the carbonate or the bicarbonate of the alkali metal (B) included in 100 parts by mass in total of the component (A) and the component (C3))/(acid value of the component (C)+ acid value of the terminal carboxyl group of the polyamide resin (A) included in 100 parts by mass in total of the component (A) and the component (C3)).

2. The polyamide resin composition according to claim 1, wherein the polyamide resin composition has a number-average molecular weight (Mn) of 10,000 or more.

3. The polyamide resin composition according to claim 1, further comprising (D) an inorganic filler except for an alkali metal compound and/or an alkaline earth metal compound.

4. The polyamide resin composition according to claim 3, wherein the inorganic filler (D) except for an alkali metal compound and/or an alkaline earth metal compound is a glass fiber, and the glass fiber comprises a copolymer containing a carboxylic anhydride-containing unsaturated vinyl monomer and an unsaturated vinyl monomer other than the carboxylic anhydride-containing unsaturated vinyl monomer as constitutional units, as a portion of a component that is applied to a surface of the glass fiber.

5. The polyamide resin composition according to claim 1, wherein the component (C) further comprises component (C1).

6. The polyamide resin composition according to claim 5, wherein the component (C1) is a copper salt.

7. The polyamide resin composition according to claim 5, wherein a content of the component (C1) is 0.003 to 0.05 parts by mass in terms of an amount of a metal element based on 100 parts by mass in total of the component (A) and the component (C3).

8. The polyamide resin composition according to claim 5, wherein a mass ratio (B)/(C1) of the component (B) to the component (C1) is 1 or more.

9. The polyamide resin composition according to claim 5, further comprising (C1-2) a halide of an alkali metal and/or a halide of an alkaline earth metal.

10. The polyamide resin composition according to claim 9, wherein a molar ratio of a halogen element of the component (C1-2) to a metal element of the component (C1) (halogen element/metal element) is 2 to 50.

11. The polyamide resin composition according to claim 1, wherein the component (C) further comprises component (C2).

12. The polyamide resin composition according to claim 11, wherein the component (C2) is a hindered phenol compound.

13. The polyamide resin composition according to claim 1, wherein a component (C) further comprises component (C3).

14. The polyamide resin composition according to claim 13, wherein a content of the component (C3) is 5 to 50 parts by mass based on 100 parts by mass in total of the component (A) and the component (C3).

15. The polyamide resin composition according to claim 13, wherein the component (C3) is a polyamide resin having a melting point of lower than 240° C.

16. The polyamide resin composition according to claim 13, wherein the component (C3) is polyamide 6.

17. The polyamide resin composition according to claim 13, wherein the component (C3) is a polyamide resin in which a ratio of number of carbon atoms to number of nitrogen atoms (C/N) contained in the component (C3) is 7 or more and 20 or less.

18. The polyamide resin composition according to claim 1, wherein an alkalinity value of the carbonate or the bicarbonate of the alkali metal (B) and an acid value of the component (C) included in 100 parts by mass in total of the component (A) and the component (C3) satisfy a condition of following (formula 1):

$$0 < X \leq 5 \quad \text{(Formula 1)}$$

wherein X=(alkalinity value of the alkali metal compound and/or the alkaline earth metal compound (B) (except for an aluminic acid metal salt, a halide of an alkali metal, and a halide of an alkaline earth metal) included in 100 parts by mass in total of the component (A) and the component (C3))/(acid value of the component (C) included in 100 parts by mass in total of the component (A) and the component (C3)).

19. The polyamide resin composition according to claim 1, wherein the polyamide resin composition has weight-average molecular weight/number-average molecular weight (Mw/Mn) of 2.0 or more, and has Mw/Mn of 3.0 or more after aging at 120° C. for 1000 hours.

20. The polyamide resin composition according to claim 1, wherein in GPC-MALS-VISCO analysis, a molecule having a molecular weight of 100,000 or more has a structure with one or more branch points, and the molecule having a molecular weight of 100,000 or more contains a carboxylic anhydride functional group.

21. The polyamide resin composition according to claim 1, wherein the component (C) has been added to the polyamide resin (A) by melt kneading.

22. The polyamide resin composition according to claim 1, wherein an amount of decrease in mass is 10% or less when the polyamide resin composition is left at 300° C. for 1 hour in an inert gas atmosphere.

23. A method for producing the polyamide resin composition according to claim 1, comprising adding the component (C) to the polyamide resin (A) by melt kneading.

24. The method for producing the polyamide resin composition according to claim 23, wherein the method comprises adding the component (C) in a form of a master batch.

25. The polyamide resin composition according to claim 1, wherein the carbonate or the bicarbonate of the alkali metal (B) has been added to the polyamide resin (A) by melt kneading.

26. A molded article comprising the polyamide resin composition according to claim 1.

27. A method for producing the polyamide resin composition according to claim 1, comprising:
adding the carbonate or the bicarbonate of the alkali metal (B) to the polyamide resin (A) by melt kneading.

28. The method for producing the polyamide resin composition according to claim 23, wherein the method comprises adding the carbonate or the bicarbonate of the alkali metal (B) in a form of a master batch.

29. The method for producing the polyamide resin composition according to claim 23, wherein the method comprises adding the carbonate or the bicarbonate of the alkali metal (B) and the component (C) in a form of a same master batch.

* * * * *